(12) United States Patent
Ofek et al.

(10) Patent No.: US 7,509,687 B2
(45) Date of Patent: Mar. 24, 2009

(54) REMOTELY AUTHENTICATED OPERATION METHOD

(75) Inventors: Yoram Ofek, Riverdale, NY (US); Mario Baldi, Cuneo (IT)

(73) Assignee: TrustedFlow Systems, Inc., Skokie, IL (US)

(*) Notice: Subject to any disclaimer, the term of this patent is extended or adjusted under 35 U.S.C. 154(b) by 744 days.

(21) Appl. No.: 10/691,277

(22) Filed: Oct. 22, 2003

(65) Prior Publication Data
US 2004/0230797 A1 Nov. 18, 2004

Related U.S. Application Data

(63) Continuation-in-part of application No. 10/218,830, filed on Aug. 14, 2002, and a continuation-in-part of application No. 10/219,379, filed on Aug. 14, 2002, and a continuation-in-part of application No. 10/219,378, filed on Aug. 14, 2002.

(60) Provisional application No. 60/365,148, filed on Mar. 16, 2002.

(51) Int. Cl.
G06F 7/04 (2006.01)
G06F 17/30 (2006.01)
G06F 15/16 (2006.01)
G06K 9/00 (2006.01)
H03M 1/68 (2006.01)
H04K 1/00 (2006.01)
H04L 9/00 (2006.01)
H04L 9/32 (2006.01)
H04N 7/16 (2006.01)

(52) U.S. Cl. ............... 726/30; 726/26; 726/27; 726/28; 726/29; 709/227; 709/230; 709/231; 709/238

(58) Field of Classification Search ............... 726/26, 726/29, 30; 709/227, 230, 231, 238
See application file for complete search history.

(56) References Cited

U.S. PATENT DOCUMENTS
6,006,328 A * 12/1999 Drake ................. 726/23

(Continued)

OTHER PUBLICATIONS

Christian Collberg et al., "Watermarking, Tamper-Proofing, and Obfuscation—Tools for Software Protection," University of Arizona Computer Science Technical Report, Feb. 10, 2000, vol.-issue: 03, University of Arizona, Tucson, AZ, USA.

(Continued)

*Primary Examiner*—Kimyen Vu
*Assistant Examiner*—Randal D Moran
(74) *Attorney, Agent, or Firm*—Sitrick & Sitrick

(57) ABSTRACT

The objective of this invention is to provide continuous remote authenticated operations for ensuring proper content processing and management in remote untrusted computing environment. The method is based on using a program that was hidden within the content protection program at the remote untrusted computing environment, e.g., an end station. The hidden program can be updated dynamically and it includes an inseparable and interlocked functionality for generating a pseudo random sequence of security signals. Only the media server that sends the content knows how the pseudo-random sequence of security signals were generated; therefore, the media server is able to check the validity of the security signals, and thereby, verify the authenticity of the programs used to process content at the remote untrusted computing environment. If the verification operation fails, the media server will stop the transmission of content to the remote untrusted computing environment.

101 Claims, 30 Drawing Sheets

U.S. PATENT DOCUMENTS

| | | | |
|---|---|---|---|
| 6,182,146 B1* | 1/2001 | Graham-Cumming, Jr. | 709/238 |
| 6,418,478 B1* | 7/2002 | Ignatius et al. | 709/240 |
| 6,574,736 B1* | 6/2003 | Andrews | 726/21 |
| 6,990,528 B1* | 1/2006 | Neal et al. | 709/232 |
| 2002/0124169 A1* | 9/2002 | Agrawal et al. | 713/168 |
| 2003/0078890 A1* | 4/2003 | Schmidt et al. | 705/51 |
| 2003/0078891 A1* | 4/2003 | Capitant | 705/57 |

OTHER PUBLICATIONS

Christian Collberg et al., "Manufacturing Cheap, Resilient and Stealthy Opaque Constructs," Principles of Programming Languages (POPL), 1998, pp. 184-196, Association for Computing Machinery (ACM), USA.

Christian Collberg et al., "A Taxonomy of Obfuscating Transformations," Technical Report, 1997, vol.-issue: 148, University of Auckland Department of Computer Science, Auckland, New Zealand.

Enriquillo Valdez et al., "Software DisEngineering: Program Hiding Architecture and Experiments," Information Hiding 1999, 1999, pp. 379-394, Springer Verlag Lectures in Computer Science, Heidelberg, Germany.

Enriquillo Valdez et al., "DISSECT: DIStribution for SECurity Tool," ISC 2001, 2001, pp. 125-143, Springer Verlag Lectures in Computer Science LNCS2200, Heidelberg, Germany.

Paul England et al., "A Trusted Open Platform," Computer, Jul. 2003, pp. 55-62, IEEE Computer Society.

Trusted Computer Platform Alliance (TCPA), "TCPA PC Specific Implementation Specification," Sep. 9, 2001, version 1.00, TCPA.

Content Guard, "XrML: Extensible rights Markup Language," 2000, XrML Organization (www.xrml.org).

Bruce Schneier, "Applied Cryptography: Protocols, Algorithms, and Source Code in C," Second Edition, Oct. 18, 1995, ISBN: 0471117099, John Wiley & Sons, New York, NY, USA.

Alfred J. Menezes et al., "Handbook of Applied Cryptography," Oct. 1996, ISBN: 0849385237, CRC Press, USA.

Enriquillo Valdez et al., "DISSECT: DIStribution for SECurity Tool," ISC 2001, 2001, pp. 125-143, Springer Verlag Lectures in Computer Science LNCS2200, Heldelberg, Germany.

William Rosenblatt et al., "Digital Rights Management Business and Technology," Nov. 2001, ISBN: 0764548891, John Wiley & Sons, New York, NY, USA.

\* cited by examiner

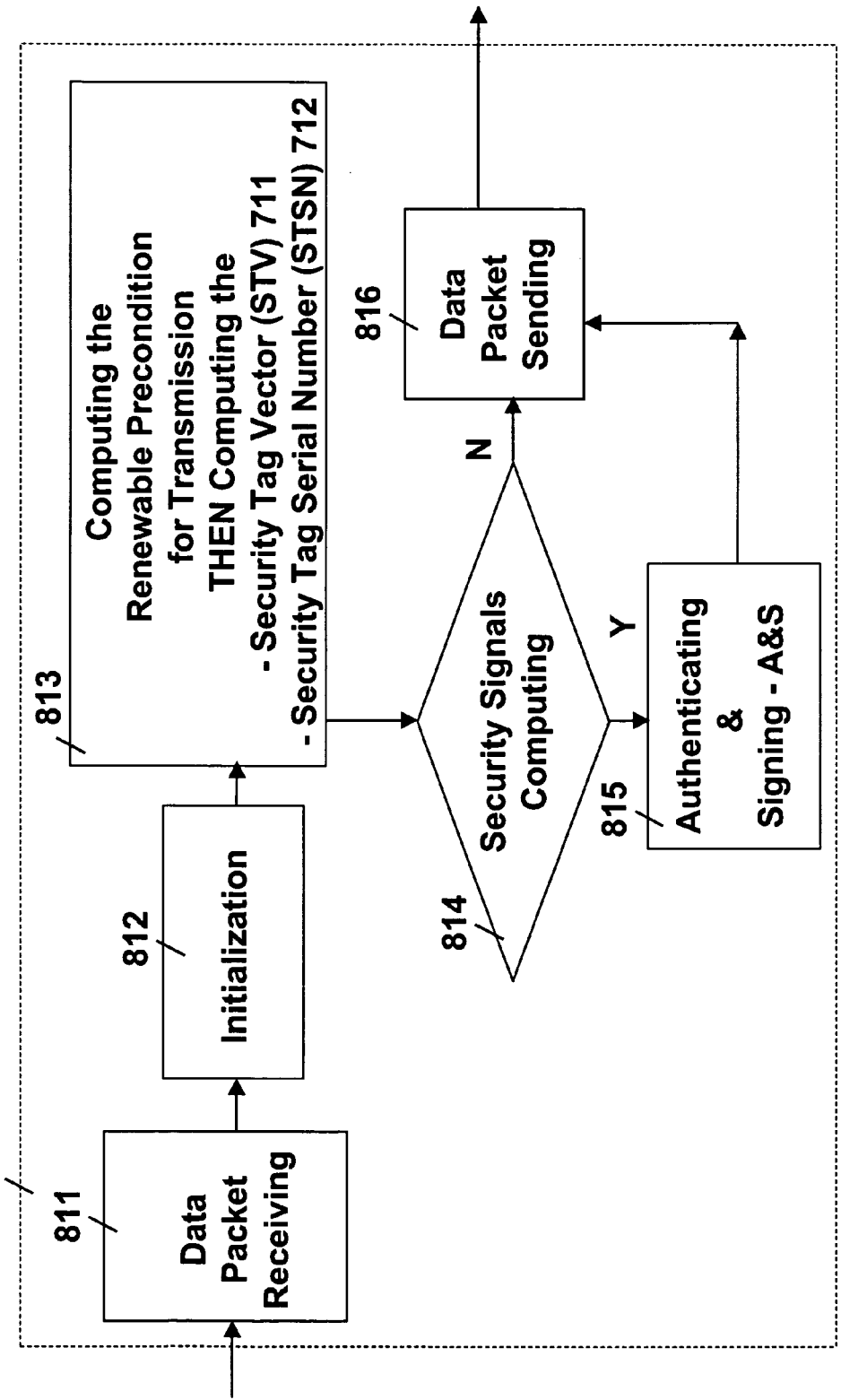
FIG. 8 Trusted Flow Generator (TFG) Software (functional description): as part of the hidden program portion (first computing element)

FIG. 11 Trusted Tag Checker (TTC) - 120TTC (second computing element)

FIG. 14

1212 - Plain Program components

1. Well-behaved operational program (e.g., TCP) with defined rules of transmission 2. Cryptographic program (e.g., security tag vector (STV) generator)

3. Parameter table (e.g., pseudo random seed)

4. Control program (e.g., for automatic refresh parameters)

FIG. 20 Operation of the transmission controller 1858 of a subsystem (e.g., a Media Server with Trusted Tag Checker (TTC) – 1850) regulating the Transmission of Streaming Data Packets FIG. 22 Operation of the forwarding controller 1958 of a subsystem (e.g., a Network Interface with Trusted Tag Checker (TTC) – 1955) regulating the forwarding of Streaming Data Packets

REMOTELY AUTHENTICATED OPERATION METHOD

RELATED APPLICATIONS

This application is a continuation-in-part of three [3] applications: Ser. No. 10/218,830, entitled, "Authenticated and Metered Flow Control Method," filed Aug. 14, 2002; Ser. No. 10/219,379, entitled, "Trusted Flow and Operation Control Method," filed Aug. 14, 2002; Ser. No. 10/219,378, entitled, "Secure Logic Interlocking," filed Aug. 14, 2002; and all applications claim priority from provisional application Ser. No. 60/365,148, entitled, "Best Effort Linearization of TCP Packet Flows," filed Mar. 16, 2002.

FEDERALLY SPONSORED RESEARCH OR DEVELOPMENT

Not Applicable.

BACKGROUND OF THE INVENTION

The Internet's successful performance is due to the IP architecture's robustness, flexibility and ability to scale. This success is not based upon on the Internet's efficiency, optimization, security, content protection, fine-grained control or performance guarantees. Furthermore, IP data networks enabling the delivery of content (e.g., audio, video, e-books) everywhere around the globe were not designed to protect content from illegal and unintended use.

1. Field and Context of the Invention

The field of the invention involves assuring that trusted operation is guaranteed and validated by the underlying methods and systems. In particular, communications are assured of trusted flow; specifically, making sure that the end stations and users of a computer network operate correctly under given and known rules of transmission—even though protocols, methods and software logic are typically available to users of such networks. A trusted operation is one by which performance complies with its allowed and defined specifications.

A trusted operation will assure network elements that stations perform their task as known and as determined by a service agreement. It will assure servers in networks that users are behaving properly and are not over using content beyond the agreed upon license.

The trusted operation involves mechanisms for signaling of various purposes, e.g., authentication of stations and users. Additionally, these mechanisms involve communication network software, communication network operation, control and management. They further involve cryptographic systems, functions, and software transformation e.g. obfuscation operation. Computing hardware and software systems are intrinsic elements of the Internet; therefore, they lie within the field of the invention.

In general, the underlying mechanisms assure that a "combined functionality" takes place within a computing system. Part of this "combined functionality" is a crucial function of the underlying computing system, whereas another part of the "combined functionality" is a method to generate an unpredictable signal. The mechanisms assure interlocking of the parts into the combined functionality, whereas, locking is defined by the combined performance of all parts. The operation part, factored into the "combined functionality," is trusted (and is typically associated with limitations, e.g., rate of operation or number of times before renewal of precondition for next sub-operation). The checking is accomplished by verifying a signal's performance. If the signal passes the check, it means that the other (operation) part was performed subject to the associated limitation—namely, a trusted one.

The operation involves a trusted flow of packets (or other units of measurement as defined by communication fields), associated with rules of transmission. E.g., a TCP connection is associated with a window size that allows a maximum number of transmissions. A trusted flow implies that the end station conforms to the allocated window size. However, there is no way to impose compliance with the assumed parameters on users and end stations to be "trusted," since parameters can typically be easily changed.

One aspect of the present invention involves the "interlocking" of parts and insistence that one part will "signal," and its checking will assure compliance by adding a checking function to validate signals. Thus, if a TCP program with the currently correct performance parameters (e.g., rules of transmission) is interlocked with a cryptographic pseudo-random generator (with a random seed) by which output cannot be predicted; if further, the checker has a copy of the pseudo-random generator; if further, the output of the pseudo-random generator is put on data packet headers; if further, the headers are checked and their content matches the expected value from the generator, then the checker concludes that the packet flow is "trusted."

The basic mechanisms involve a system where the "combined functionality" is performed and one where it is checked. It also involves a communication system; a software transformation module to assure the interlocking of the separate functions into a combined functionality; and finally, a management system assuming plurality of elements implementing the combined functionality is in the network.

One of the main applications of the disclosed invention is in Digital Right Management (DRM)—or Content Management (CM). DRM is a set of technologies that content owners can use to protect their copyrights while providing it to customers. In most cases, DRM/CM is a system that encrypts digital media content and limits access to only those people who have acquired a proper license/permission to play/use the content. Specifically, DRM/CM is a technology that enables the secure distribution, promotion and sale of digital media content on the Internet. A DRM/CM proper license/permission to play/use the content may include restrictions on use after delivery, e.g., no copying and printing, limited number of plays, time limits, no forwarding and so on.

An example of a DRM/CM issue—an e-book—can be delivered over the Internet using standard cryptographic techniques. However, if the recipient can save the e-book in an unrestricted form, he can then freely redistribute copies everywhere. This fear has led publishers to largely forego the potentially lucrative sale of digital books and has had a similar chilling effect on the legitimate distribution of other types of digital content.

Consequently, DRM/CM deals with how to project Policy Expressions with Confidence into Remote Environments. In addition to authoring and evaluating policy expressions, a DRM system operating across multiple nodes in a network must be able to accomplish a third important task: projecting policy to remote nodes with confidence that the policy will be respected. Fear about platform behavior is an anathema to the distribution of information, and such fear is rampant today across all segments of potential DRM users. Owners of digital content will not distribute their works to platforms they consider to be "hostile" (or potentially so), and the same is true of individual users who are requested to reveal private information to remote systems. Every content owner needs some way to be convinced that the remote system receiving his or her valuable information will behave as the owner expects—ultimately meaning that the remote system will implement the policy that the content owner has defined and associated with his content.

A DRM/CM system on the (remote) PC will integrate with a broad range of hardware devices. Additionally, some special hardware device may be able to take part in the DRM content chain. However, in this present invention the use of special hardware may not be necessary.

Hardware devices have to implement DRM/CM functionalities, e.g.: tamper resistance (obfuscation, anti-debugging measures), authentication ensuring only trusted components in the process (components must be signed), and authentication periodically checking for signed components. However, hardware solutions have limitations, e.g.: (1) incompatibility with installed base of PCs, players, (2) time and expense to build an installed base, (3) long lifecycles requiring devices to remain secure for years, and (4) field Upgrades which are difficult and costly to replace when hardware is compromised.

Dynamic DRM/CM systems are used to manage and authorized a wide range of operation on content, e.g.: copy, delete, modify, embed, execute, export, extract, annotate, aggregate, install, backup, loan, sell, give, lease, play, print, display, read, restore, transfer, uninstall, verify, save, obtain, issue, and possess and revoke content. Furthermore, dynamic DRM/CM systems are used to manage and authorized: restrict grant of rights to certain time periods, locations, devices, users, purposes, qualities of the content and so on.

Another aspect of DRM/CM is to ensure secure distribution of the content and enforce conditional access to it. In particular, the system should prevent pirates from obtaining free versions of the original master copy or copies received by end-users. More precisely, the very high value of the content and the possible financial impact of even a single act of piracy require the system to keep piracy rates significantly below the levels of traditional content protection systems. (Piracy rates for most broadcast TV systems lie between 3% and 10%.) The goal of DRM/CM is to increase the robustness of the system by making use of other properties of the environment: (1) raising the cost of the initial attack by means of tamper-resistant hardware, (2) making pirates identifiable and (3) enabling cheap and easy renewal of the system. After a compromise has been detected, the system must prevent the compromised projectors from receiving new content. Generally, even in the absence of a compromise, the security components of the projectors should be renewed (changed) periodically, in order to present a moving target to potential attackers.

2. Background of the: Prior Art

One of the ways to specify the requirements of Digital Right Management (DRM) or Content Management (CM) is to use XrML rights language ['XrML: Extensible Rights Markup Language,' http://www.xrml.org]. XrML provides the rights—specification language for implementing DRM/CM owned by some content guard mechanism. XrML allows the specification of various rights and licenses on to use/consume various content. The XrML rights language has the following guiding principles: (1) Enable rapid growth of the eContent industry for all media, (2) Enable XrML to meet the needs of all stakeholders in the eContent industry, (3) Establish a community of practice that is committed to develop a common rights language for use by trusted systems, (4) Enable interoperability across multiple platforms and content types, (5) Encourage interested parties to submit and share XrML Modifications with the community of practice that will extend and enhance the XrML Specifications, (6) Enable future XrML enhancements and modifications to meet the needs of the DRM community, and that the standard does not become fragmented or create commercial advantage for any single party, (7) Establish a XrML Panel of knowledgeable and interested parties, to review the XrML Modifications and make recommendations concerning incorporation of XrML Modifications in the XrML Specifications and (8) This License Agreement does not apply to, dictate or restrict General-purpose APIs (Application Program Interfaces), operating system functions and specifications, or other software that incorporate XrML Specifications.

In the context of XrML, "Digital Rights Management" or "DRM" means techniques, processes, procedures and algorithms related to establishing an environment that utilizes syntactically expressed declarative statements having an environment-wide meaning for the management of digital rights; includes computer hardware and software which enable or implement: trusted licensing, secure rights and permissions specification, rights and permissions enforcement, establishment of a trusted computing environment, and trusted infrastructure, each for: (i) the secure preparation, transmission, prevention of misuse and/or consumption of protected digital works by authorized licensees (e.g., watermarking and fingerprinting and software obfuscation) and (ii) secure digital commerce transactions occurring over internal and external computer networks, including the automated and persistent enforcement of policies for consumption of digital goods, usage tracking, budget management, fraud detection, account management, key management and similar functions.

XrML provides for describing specifications of rights, fees and conditions for using digital contents (or properties), together with message integrity and entity authentication within these specifications. It is intended to support commerce in digital contents, e.g., publishing and selling electronic books, digital movies, digital music, interactive games, computer software and other creations distributed in digital form. It is also intended to support specification of access and use controls for secure digital documents in cases where financial exchange is not part of the terms of use. XrML documents are XML conforming—they are readily viewed, edited, and validated with standard XML tools. The use of XrML for usage rights on digital contents is to ensure that trusted systems are able to exchange digital contents and interoperate. Trusted systems (or repositories) are systems that can hold digital contents and which can be trusted to honor the rights, conditions and fees specified for digital contents. In document commerce, trusted systems are for authoring, playing, and selling digital works. They include personal systems, on-line storefront systems, library systems, and others.

An extensive discussion on DRM can be found in "Digital Rights Management: Business and Technology," William Rosenblatt, William Trippe and Stephen Mooney, 300 pp., ISBN: 0-7645-4889-1. Hungry Minds, Inc., Indianapolis, Ind., November 2001. Discussion on trusted computing in general and its relevance to DRM can be found in (1) "A Trusted Open Platform," Paul England, Butler Lampson, John Manferdelli, Marcus Peinado, and Bryan Willman, IEEE Computer, July 2003, pp. 55-62; and (2) "TCPA PC Specific Implementation Specification," Version 1.00, Sep. 9, 2001—is The Trusted Computing Platform Alliance Specification, V1.1 (http://www.trustedpc.org) has been written as a platform independent document to enhance trust on computing platforms (as such, the TCPA Specification is general in specifying both hardware and software requirements).

Our methods use cryptographic functions, e.g., pseudo-random generation, random bits generation, authentication, signature and encryption. Such methods of varied level of security and efficiency are known in the art, in software packages and in hardware devices. We can employ them as needed in our mechanisms. A security professional who is familiar with the art will be able to use the cryptographic functions and tools and embed them in our invention. Such mechanism are described in "Applied Cryptography: Protocols, Algorithms, and Source Code in C," 2nd Edition by Bruce Schneier; Publisher: John Wiley & Sons; ISBN: 0471117099; 2 edition (Oct. 18, 1995) and in "Handbook of Applied Cryptography" (CRC Press Series on Discrete Mathematics and Its Applications) by Alfred J. Menezes, Paul C. Van Oorschot, Scott A. Vanstone (Editor); Publisher: CRC Press; ISBN: 0849385237; (October 1996).

The same is true for underlying devices: we can employ such devices as smart cards and other portable devices (e.g., USB connection based, wireless devices with radio frequency, laser connection, etc.). A security engineer who is familiar with the art and the common practice will be able to employ these elements and embed them in our invention.

The method uses hidden programs. Software obfuscation transformation is one method to hide programs. Methods and techniques for obfuscation are also known in the art. They modify the "look" of the software logic, but maintain its "semantics" (or meaning). They are analogous to compiling a program in high-level language code to a program in "object code" or "machine code" which performs the same task but is not readable to most users. They make the software "unreadable" and "non-modifiable." In fact, there are various methods in the art applied to the currently most useful programming languages. The methods take a software program (e.g., written in the Java language) and return another program (in Java as well) which performs the same task and approximately with the same performance. Yet, the second program is hard to read and understand. The art of program obfuscation, including all transformations on data, variables, names, control structure, etc. are given in a number of papers considered the state of the art by C. Collberg C. Thomborson and D. Low: 'Manufacturing Cheap, Resilient and Stealthy Opaque Constructs," ACM's POPL 1998, pages 184-196; and "Watermarking, Tamper-Proofing, and Obfuscation—Tools for Software Protection," by Collberg, Thomberson and Low, technical report University of Arizona to be published in IEEE Transactions on Software Engineering 2002; and "A Taxonomy of Obfuscation Transformation," by C. Collberg, technical report number 148, University of Arizona.

Additionally, Valdez and Yung describe how to add encryption operation and program distribution to obfuscation in: "Software DisEngineering: Program Hiding Architecture and Experiments," by E. Valdez and M. Yung, Information Hiding 1999, pages 379-394, Springer Verlag Lectures in Computer Science; and "SISSECT: DIStribution for SECurity Tool," by E. Valdez and M. Yung, ISC 2001, pages 125-143, 2001 Springer Verlag Lectures in Computer Science LNCS2200, respectively. Note that the embedding of programs inside tamper-proof devices and hiding encrypted programs are also known in the art (e.g., as part of cryptographic co-processors). In our mechanisms we use a combination of the above techniques.

Note that hidden programs have been traditionally employed to hide the logic of the software. They have been used in hiding cryptographic programs (e.g., in a tamper-proof device) so that the operation is not observable or modifiable. They have been further used to enforce certain operations associated with content distribution and electronic commerce in order to assure that such operations (e.g., digital payment and protecting of content) are run in environments which are not modifiable by the user. Again, the notion of use is against modification of the working environment.

Unlike the use of hiding and obfuscation of programs for the sake of software protection, the present invention does not hide the "semantics of the program" from the user. In fact, the specification and performance parameters can be publicly known. The goal is, in turn, an integrity function, where the goal is for users not to be able to change the operation software (that performs data packet transmission) while retaining correct signaling.

What is needed is a mechanism that combines many programs together so that they are inseparable. In this sense, hidden programs are merely a means to get a method of "interlocking mechanism" where known (rather than unknown) programs and perhaps parameters (hidden) are combined into a unique functionality and are inseparable. The interlocking involves putting together a set of "well behaved" programs with correct and agreed upon parameters by a continuous mechanism for signaling, and associating the signaling checker with a method that assures good behavior of the continuous flow. One aspect of the present invention involves system programs, which are commonly known, programs that perform packet generation and performance parameters and even known cryptographic programs with hidden parameters. A method is provided in accordance with the present invention, where it is impossible via hidden programs to execute parts of the combined functionality separately with a malicious non-trusted part replacing another part of the combined functionality.

Also in accordance with the present invention, a mechanism for checking compliance for the signals, as well as a combined communication system mechanism for handling the trusted flow coming from stations that use the combined functionality. This will give network elements that can assure trusted traffic is generated in a trusted fashion and further is validated. In addition, required methods and systems employing the above elements in a combined network and that will manage, renew and tune the elements in the invention. A method for dynamically changing hidden programs and parameters and for renewing preconditions is also required. Also in accordance with the present invention, a method is provided for generating and distributing the combined functionality logic modules, a mechanism for safe integration of separate known logic modules to the combined functionality logic.

SUMMARY OF THE INVENTION

The present invention relates to assuring that an ongoing operation within computing systems is performed according to a specification. In particular, it relates to a method and system for ensuring that sources sending data packets will do so according to a well-defined, specified and expected behavior. Specifically, an aspect of the disclosed method and system ensures that the various programs used in sending data packets from various sources into and across the various networks, are operating according to predefined rules; in accordance with those data packets and traffic patterns which the various networks expect to receive, forward and support.

In accordance with the present invention, a unique method and system is provided for remotely performing Digital Right Management (DRM)—or Content Management (CM). As discussed hereinabove, DRM is a set of technologies content owners can use to protect their copyrights while providing it to customers. In most cases, DRM/CM is a system that encrypts digital media content and limits access to only those people who have acquired a proper license/permission to play/use the content. That is, DRM/CM is a technology that enables the secure distribution, promotion, and sale of digital media content on the Internet. DRM/CM proper license/permission to play/use the content may include restrictions on use after delivery, e.g.: no copying and printing, limited number of plays, time limits, no forwarding and so on. The method disclosed herein achieve the above DRM/CM required operational properties by using only software—no special hardware components are required, while enabling/empowering the media server (e.g., the content owner) with the unique capability to ensure from remote the proper use of content.

In the remote monitoring of programs, e.g., DRM/CM, typically a measure is inserted inside an obfuscated version of the program (the program sends signal which indicate its usage, namely number of times it runs, and other issues of compliance with metering of usage). However, what we teach here is a mechanism by which a program signals the firewall or media server in such a way that the local user cannot modify it (due to obfuscation, encryption and other hiding methods which create interlocking of the program sub-tasks in a manner difficult to reverse engineer).

Several circumstances can, in principal, lead to the compromise of the DRM/CM system or of a protected video/audio/e-book content, even though they are not attacks in the classical sense. Such attacks include:

A cryptographic algorithm or protocol is discovered to be not secure. This is very unlikely if standard, field-tested cryptographic algorithms and protocols are used.

An attack against the fingerprinting algorithm is discovered. The system anticipates this possibility by allowing easy field upgrades of the fingerprinting components.

Social engineering: The content is stolen outside the content protection system (e.g., in the producing studio). This type of attack does not affect the digital cinema system and has to be addressed by other means.

A flaw in the production of a certain projector model makes it possible to compromise any projector of the given model without substantial hardware tampering. All affected projectors have to be revoked.

The "subliminal" or "invisible" messages sent from the correct program are not necessarily visible to or easily interpreted by the user, but are well suited for interpretation at the firewall. If the interpretation of signals is valid, it means that indeed the user employs the right software (program) when running the packet generation (TCP) protocol. This integrity of software via the produced signals and their interpretation at the firewall assure the integrity of the software running the protocol remotely. Then according to the result of the validity check, the firewall can decide to serve or to drop service or to classify class of service to the messages coming from this version of the protocol at the end-point.

The firewall is in the middle of the transmission and can act based on the signaling from the originating software. This constitutes a secondary channel for control of software usage within an installation. One aspect of the present invention involves usage of metering and signaling methods. It is based on a hidden program part of an obfuscated program that is difficult to reverse engineer; this part may involve hidden parameters (a seed for a cryptographic pseudo-random generator) that generates part of the signal. This mechanism for monitoring remotely actual usage of software which produces unpredictable signals, can be applied to communication protocols, operating systems procedures, and many other software system where a remote function (the firewall) checks the integrity of software usage remotely, and where the firewall can further act based on its finding and react or control the system based on the validity of the checking of the signal.

Furthermore, in general, an objective of this invention is to ensure that programs and other units running software logic that generate and send data packets, are well behaved.

In accordance with another aspect of the present invention, a method and system is further provided that consist of an end station and a network interface, such that the network interface is capable of determining the authenticity of the program used by the end station to generate and send data packets. The method is based on using a hidden program that was obfuscated within the program that is used to generate and send data packets from the end station.

In accordance with another aspect of the present invention, the hidden program is being updated dynamically and it may include the functionality for generating a pseudo-random sequence of security signals. Only the network interface knows how the pseudo-random sequence of security signals were generated, and therefore, the network interface is able to check the validity of the pseudo-random sequence of security signals, and thereby, verify the authenticity of the programs used to generate and send data packets.

This method is based on using a hidden program that was obfuscated and encrypted within the program that is used to generate and send data packets from the end station. The hidden program is being updated dynamically and it includes the functionality for generating a pseudo-random sequence of security signals. The method further comprises a means for coordinating the initialization of the end station and network interface.

Another aspect of the present invention provides for the secure integration of separate software modules into a combined functionality. A method and system provide for processing logic modules, each having a separate functionality, into a unique functionality that is to be executed in an interlocked mode as a unique functionality. The method is based upon taking logic modules (programs and data) with known functionality and transforming them into a hidden program by integrating modules to execute together into a logic which is partially obfuscated and/or encrypted and/or physically hidden. The hidden program is updated dynamically to strengthen it against reverse engineering efforts. The program includes the functionality for generating security signals, which are unpredictable by observers, e.g. a pseudo-random sequence of security signals. Only elements that share the means for producing the security signals can check their validity. The modules include operational tasks and performance parameters for this operation. The operation can be the transmission of data packets within given parameters of performance that the hidden program contains. The generated security signals thus assure that the correct operation was taken place and can be used to signal various cryptographic parameters as well.

In accordance with another aspect of the present invention, a method and system is provided for detecting and reacting to unexpected communications patterns. The system consists of a plurality of end stations and a plurality of network interfaces, such that, the network interface is capable of determining the authenticity of the program used by the end station to generate and send data packets. The system further consists of a plurality of secure management servers, which continuously exchange management messages with the network interfaces. Consequently, the secure management servers have the information for detecting unexpected communications patterns. The method allows the control of end stations—when an unexpected communication pattern is detected then selectively, only packets from authenticated programs are allowed transmission.

BRIEF DESCRIPTION OF THE DRAWINGS

FIG. 8 is a schematic description of the trusted flow generator (TFG) operation that is used to generate and send data packets with security tags.

FIG. 14 is a description of plain program components with well-behaved operational program with defined rules of transmission, security tag vector (STV) generator, parameter table, and control program.

DETAILED DESCRIPTION OF THE PREFERRED EMBODIMENT

Figure 1:
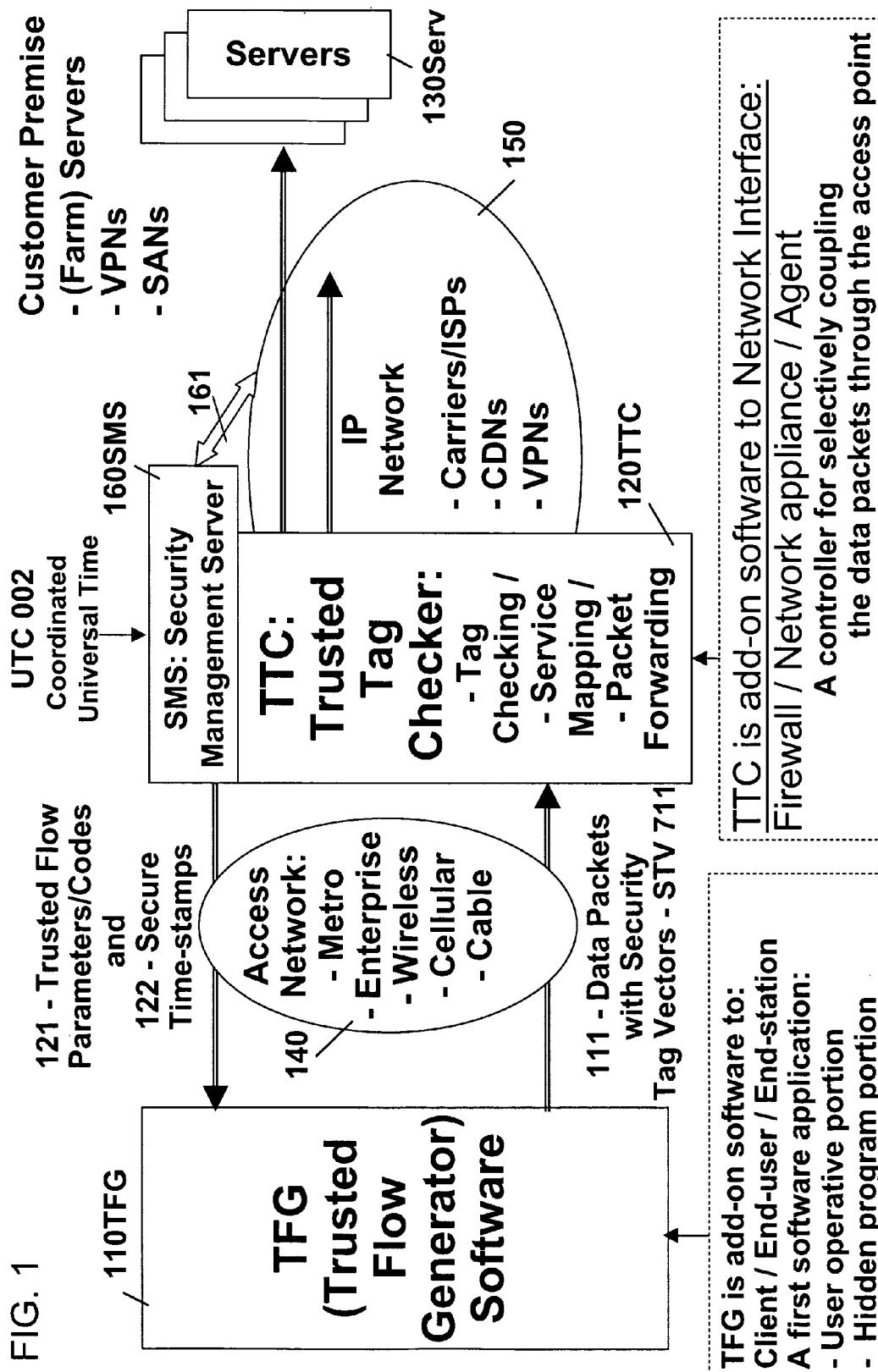
FIG. 1 is a functional illustration of a system that consists of an end station with a trusted flow generator (TFG) that sends data packets with security tags through a network interface (NI) with a trusted tag checker (TTC), such that the TTC is capable of determining the authenticity of the program used by the end station to generate and send the data packets.

While this invention is susceptible to embodiment in many different forms, there are shown in the drawings and herein described in detail, specific embodiments thereof with the understanding that the present disclosure is to be considered as an exemplification of the principles of the invention and is not intended to limit the invention to the specific embodiments as herein illustrated.

The present invention relates to a system and methodology for ensuring that sources sending data packets will send according to a well-defined and expected behavior. Specifically, the disclosed system and methodology ensure that the various programs used to send data packets from various sources (into and across the various networks) are operating according predefined rules in accordance with data packets and traffic patterns which the various networks expect to receive, forward and support.

In order to achieve the objective in the system and methodology, a general protocol is defined between the sources and a network interface as shown in FIG. 1. The source contains a program for generating and sending data packets called the Trusted Flow Generator or the TFG 110TFG, and the network interface contains a program called Security Tag Checker or TTC 120TTC for receiving and checking data packets. The data packet is sent by the TFG 110TFG containing Security Tag 111—which is part of the data packet header or part of the data packet payload. In general, the TFG 110TFG does not have to attach the Security Tag 111 to every data packet, but only to predefine selected ones. The data packets that are sent between the source and the network are sent across an access network 140, e.g., a metro network, an enterprise network, a wireless network and a cellular network.

In one embodiment, the network interfaces have the capability of sending to the TFG 110TFG certain operation and performance information, e.g., Trusted Flow Parameters and Codes 121 and Secure Time-stamps 122 as shown in FIG. 1. In an alternate embodiment, the source of the Secure Time-stamps sent to 110TFG is UTC (Coordinated Universal Time a.k.a. GMT) 002. Additionally, the TFG 110TFG for the generation of the Security Tag 111 can be responsive to at least one of the Trusted Flow Parameters and Codes 121 and Secure Time-stamps 122. Consequently, the control of the TFG 110TFG operation resides within the network interface.

The network interface with its TTC 120TTC can be located in various places in the system, e.g., at the boundary of the carrier/ISP network 150, between different carrier/ISP networks, across the carrier/ISP networks 150 next to servers 130Serv and across the carrier/ISP networks 150 next to: enterprise networks, virtual private networks (VPNs), storage area networks (SANs) and content delivery networks (CDNs).

The data packets are sent with Security Tags 111—each has a size of at least one bit of information. The sequence of values of the Security Tags 111 that are generated by the TFG 110TFG is hidden in the TFG 110TFG program in a manner by which the user of the program does not know in advance. Only the TTC 120TTC knows how to generate the sequence of values of the Security Tags 111 in order to check and verify that the received sequence of data packets are to be trusted.

In one embodiment the system further comprises of a Security Management Server or SMS 160SMS, which is used for managing the operations of TFG 120TFG and TTC 120TTC. The SMS is connected to TFG and TTC via bi-directional communications link 161 as shown in FIG. 1.

Figure 2:
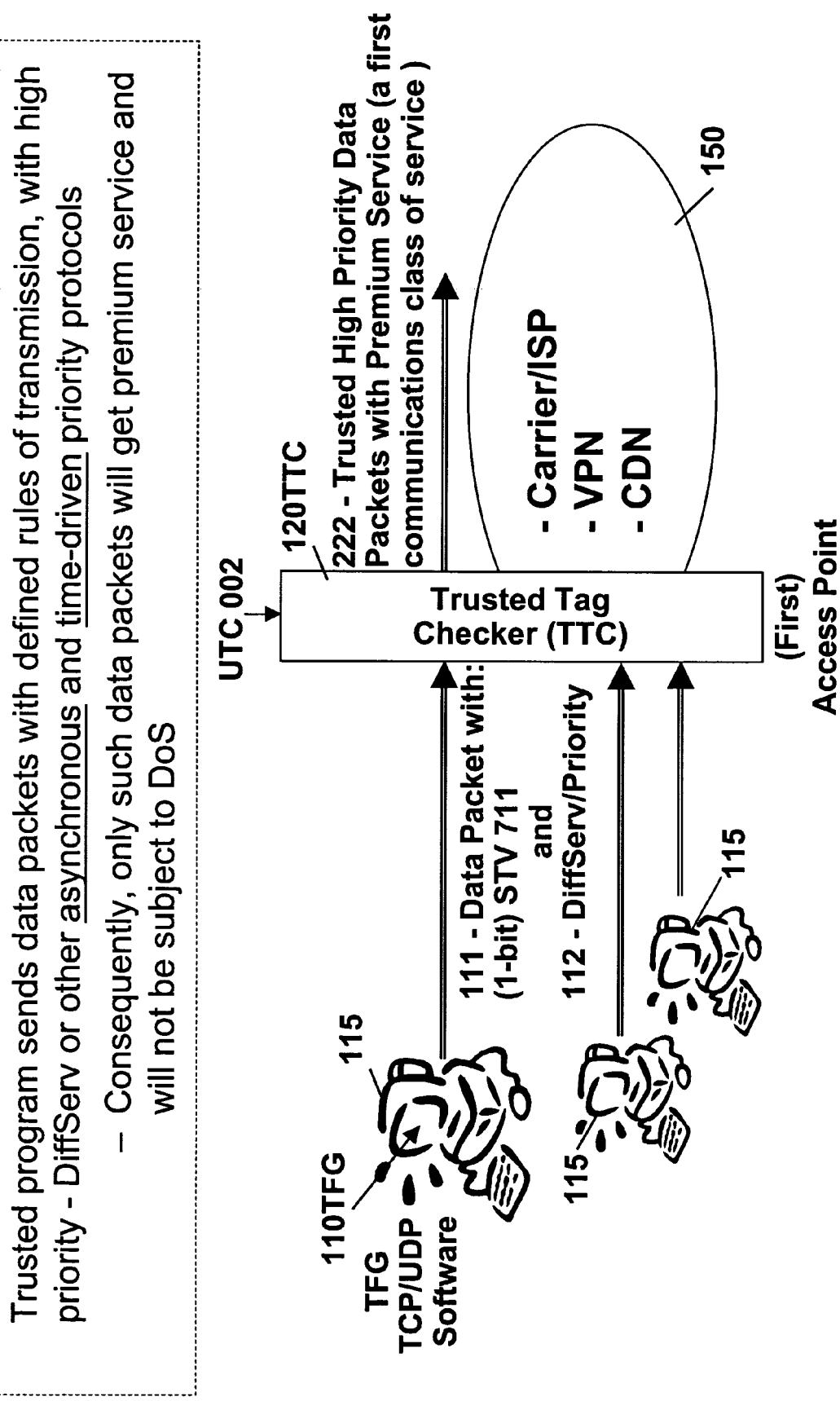
FIG. 2 is a functional illustration of a system that consists of an end station with a trusted flow generator (TFG) that is part of the TCP/IP and UDP programs used for sending data packets with security tags through a network interface (NI) with a trusted tag checker (TTC), such that the TTC is capable of determining the authenticity of the TCP/IP and UDP programs used by the end station to generate and send the data packets.

FIG. 2 shows a specific setting of the TFG 120TFG inside an end-user computer 115. This computer 115 can be located in a plurality of places, e.g., a desktop, a workstation, a mobile device and a cell phone. FIG. 1 and FIG. 2 further specify another functionality for the TTC 120TTC program: ensuring that data the packets that were successfully checked by TTC will be sent into the network or to the server with high priority data packets with premium service 222. High priority data packets with premium service 222 will not be adversely affected by lower priority traffic. This will enable networks and servers to differentiate, e.g., among data packets that were sent from trusted TCP/UDP program, from TFG 110TFG and from data packets that were sent from untrusted TCP/UDP program. Trusted data packets will receive high priority by using various priority protocols, e.g., DiffServ and time-driven priority. Consequently, data packet flows associated with trusted data packets will not be subject to denial-of-service (DoS) attacks.

FIG. 2 further shows static operation of TFG 120TFG, namely without receiving any Trusted Flow Parameters/Codes 121 and Secure Time-stamps 122 from the network interface. This mode of operation is suitable, e.g., when TFG 120TFG is running TCP/IP where its execution parameters are predetermined. However, within different execution scenarios TCP/IP will require the receiving of at least one of the Trusted Flow Parameters/Codes 121 and Secure Time-stamps 122.

Figure 3:
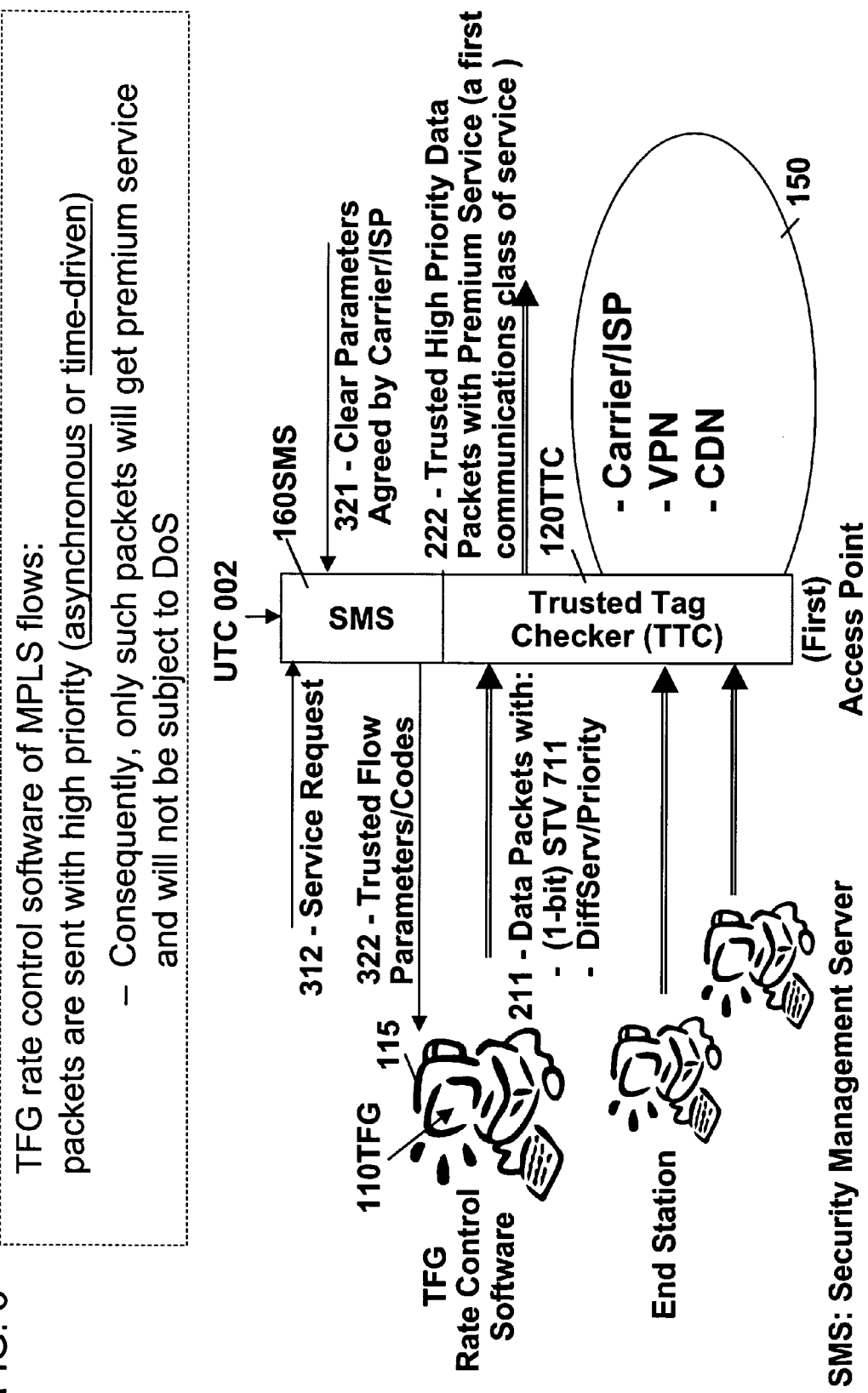
FIG. 3 is a functional illustration of a system that consists of an end station with a trusted flow generator (TFG) that is part of rate control software with predefined parameters used for sending data packets with security tags through a network interface (NI) with a trusted tag checker (TTC), such that the TTC is capable of determining the authenticity of the rate control software used by the end station to generate and send the data packets.

FIG. 3 shows a specific setting where the TFG 120TFG program is dynamic and responsive to some connection-oriented settings. In one embodiment, this mode of operation corresponds to using MPLS (Multi protocol Label Switching) and GMPLS (Generalized Multi protocol Label Switching). Within this scenario of operation, the end-user sends a Service Request 312 to the network interface which then sends back Trusted Flow Parameters/Codes 322 to the TFG 120TFG program specifying the kind of service that the user has received, e.g., one with rate control parameters—maximum transmission rate and average transmission rate. The Trusted Flow Parameters/Codes 322 can be provided to the network interface as Clear Parameters Agreed by Carrier/ISP 321.

In the preferred embodiment, each controller, generator, checker and other devices that are used to send and receive data packets and messages can be realized in various ways, e.g.: (1) software code, (2) dedicated hardware, (3) Java applet, and (4) utilizing a combined: (i) central processing unit (CPU), (ii) memory for storing data packets and messages and (iii) memory for storing various processing and control programs.

Figure 4:
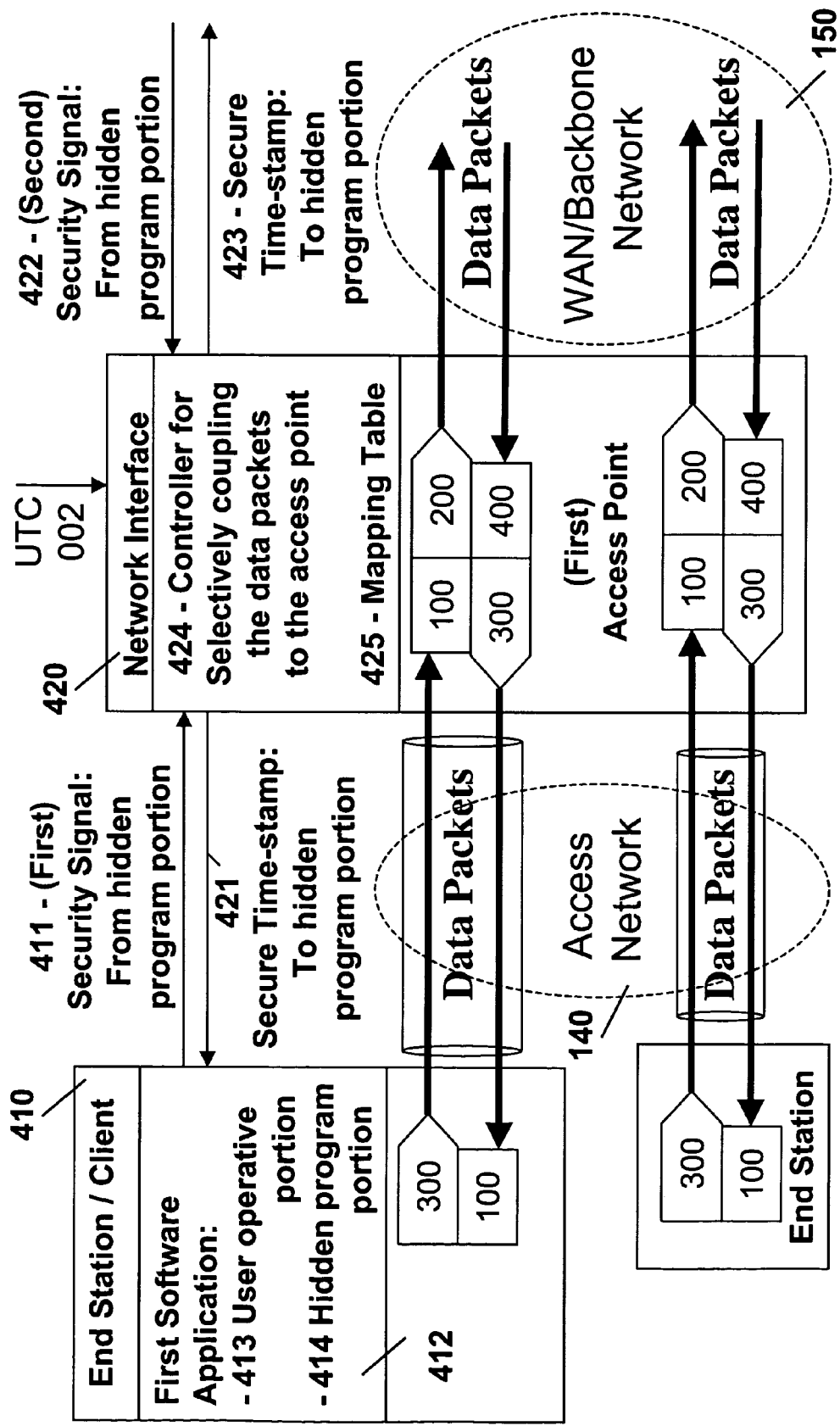
FIG. 4 is a schematic illustration of a security system that authenticates the window flow control protocol. The system includes a controller for selectively coupling the data packets to the data network through an access point.

Hidden Program:

In an alternate embodiment of the present invention as shown in FIG. 4, the client software at the end station 410 consists of a first software application 412 with two parts:

(1) a user operative portion 413 and (2) a hidden program portion 414.

Wherein the hidden program portion 414 sends (first) a security signal 411 to the controller for selectively coupling the data packets 424 to the network interface 420. The network interface functions as an access point to the WAN/Backbone Network 150. The coupling operation is performed responsive to the security signal 411 that is part of the data packet. The data packets are sent by the user operative portion 413 in the first software application 412. The data packets that are sent from/to end station 410 to/from the network interface 420 are transferred through an access network 140 as shown in FIG. 4.

In FIG. 4, the controller for selectively coupling the data packets 424 verifies that only data packets with the right security signals 411 are forwarded to the WAN/Backbone Network 150.

In an alternate embodiment of the present invention, the controller for selectively coupling the data packets 424 sends secure time-stamps 421 to hidden program portion 414. The secure time-stamps 421 are uniquely used by the hidden program portion 414 in order to uniquely generate the security signals 411 as shown in FIG. 4. Only the data packets with the correct security signals 411 generated responsive to the secure time-stamps 421 are forwarded by the controller for selectively coupling the data packets 424 to the WAN/Backbone network 150. The secure time-stamps 421 may be derived from UTC (coordinated universal time) 002; alternately, the secure time-stamps 421 are locally generated.

The controller for selectively coupling the data packets 424 has the optional capability to send a (second) Secure Time-stamp 423 to a (second) controller for selectively coupling the data packets 424 across the WAN/Backbone Network 150 in order to coordinate the operation of the two controllers for selectively coupling the data packets 424. Consequently, the data packets generated by the first software application 412 may be checked by the (second) controller in order to selectively couple the data packets 424.

In another embodiment as shown in FIG. 4, the controller for selectively coupling the data packets 424 can receive a (second) security signal: from a hidden program portion 422 of a second software application 412 in order to enable the controller to selectively couple data packets 424 and to forward data packets generated by the first software application 412.

Figure 5:
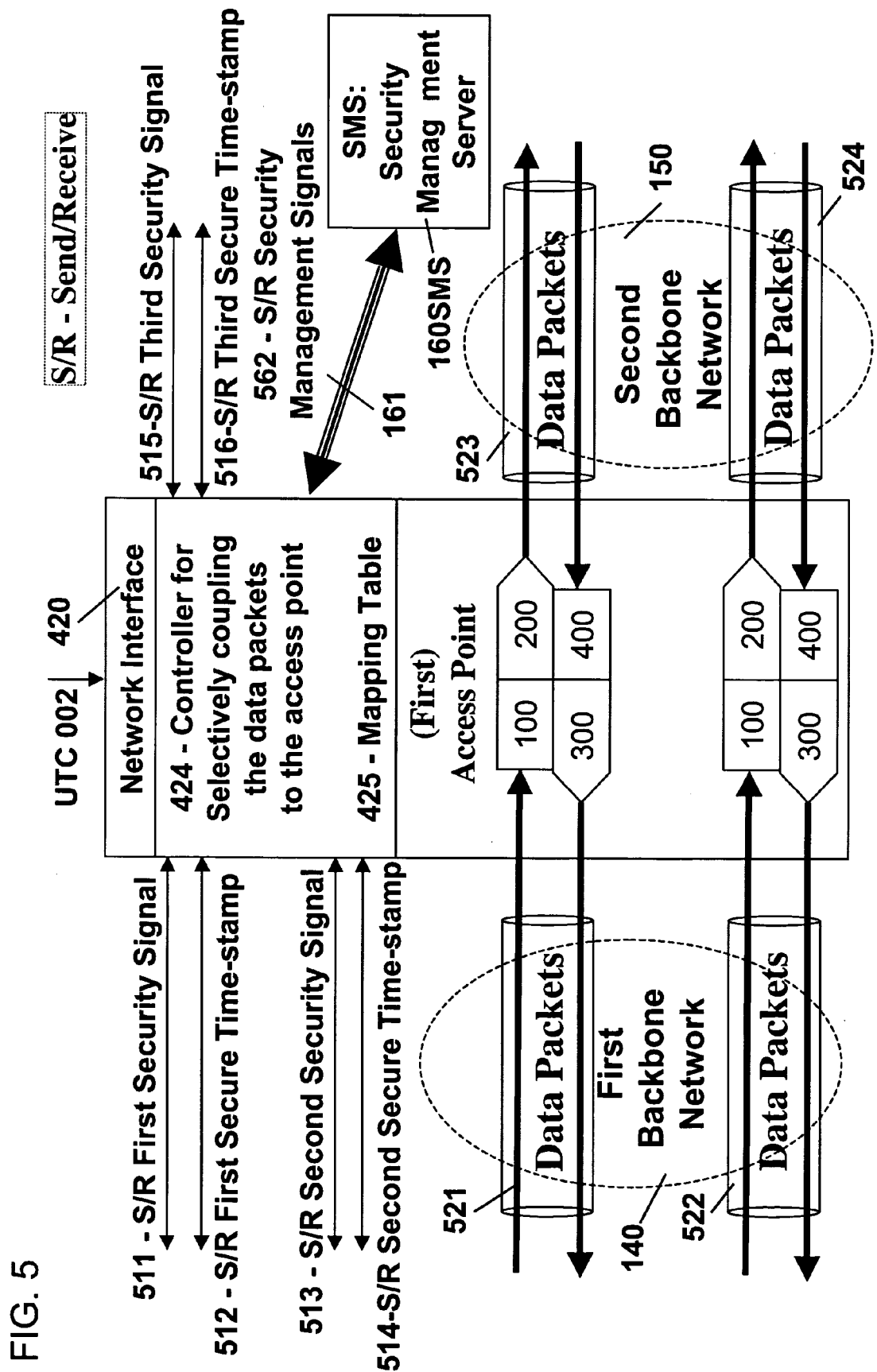
FIG. 5 is a schematic illustration of a bi-directional security system that authenticates the window flow control protocol, wherein data packets are flowing in one direction and acknowledgement signals are flowing in the other direction. The system includes a controller for selectively coupling the data packets to the data network through an access point.

FIG. 5 shows a general operation of the controller for selectively coupling the data packets 424 that can send and receive (S/R) security signals and S/R secure time-stamps. Specifically, to S/R: First Security Signal 511, S/R Second Security Signal 513 and Third Security Signal 515, and to S/R: First Secure Time-stamp 512, Second Secure Time-stamp 514 and Third Secure Time-stamp 516. The data packets forwarding operations over multiple communications links: 521, 522, 523, and 524 (done by the controller for selectively coupling the data packets 424) are responsive to the received security signals and received secure time-stamps.

In one embodiment illustrated by FIG. 5, the method comprises a Security Management Server (SMS) 160SMS, which is used for managing the operations of the controller for selectively coupling the data packets 424. The information exchanged via the, S/R (send and receive) Security Management Signals 562 is used by the controller for selectively coupling the data packets 424; sending operations of the security signals and secure time-stamps; and the data packets forwarding operations over multiple bi-directional communications links: 521, 522, 523, and 524.

The communications control system that is shown in FIG. 4 and FIG. 5 is comprised of plurality of access points 420 that function as a network interface for coupling data packets to a WAN/Backbone network 150. The end station/client 410 includes a first software application comprising a user operative portion 413 and a hidden program portion 414, for selectively sending data packets for transmission through the access point 420. The access point 420 includes a controller for selectively coupling the data packets to the access point 424 responsive to the hidden program portions 414. The secure coupling of the data packets to the access point 424 is performed by attaching a security signal 411 to each data packet by the hidden program portion 414 of the first software application at the end station.

The security signal 411 representative of the hidden program portion is coupled to the controller 424 for enabling the coupling of associated ones of the data packets after the controller 424 verifies the correctness and integrity of said security signal 411. Consequently, the security signal 411 authenticates the first software application. The security signal 411 can have one of a plurality of functional representations, e.g., a digital signature derived from at least one of the associated ones of the data packets and representative of the hidden program portion 414.

The access point as shown in FIG. 4, couples a secure time-stamp 421 to the hidden program portion 414. The secure time-stamp 421 is used in the generation procedure in order to generate the security signal by the hidden program portion 414 of the first software application. The secure time-stamp 421 is generated at the network interface 420 responsive to the UTC (Universal Coordinated Time) signal. The UTC signal can be used for the generation of a digital signature in the hidden program portion 414 that is then used for the generation of the security signal 411.

The network interface also includes a mapping table 425 that is used by the controller for selectively coupling 424 for associating the data packets with a priority class responsive to the security signal. Data packets, as shown in FIG. 7, are comprised of a header portion 700 and a payload portion 701PL. The security signal 411 and the secure time-stamp 421 are part of at least one of the header portion and the payload portion. The data packet header portion further comprises of a priority class. The priority class is defined in accordance with at least one of the following: differentiated services, DiffServ, IEEE 802.1p, class of service (CoS) and time-driven priority.

The data packet header 700 further comprises a flow identification (ID) as part of the data packet header address and port fields 704AdrPrt. The flow ID is associated with at least one entry in the mapping table 425, wherein the content of the selected entry of the mapping table 425 determines a priority class. The controller for selectively coupling 424 is responsive to the priority class and the security signal 411 for determining how to forward the data packet, e.g.: forwarded with high priority, forwarded with premium service, forwarded with low priority, and the data packet can be discarded.

As shown in FIG. 5, the network interface 420, which is the first access, is used for coupling data packets between first backbone network 140 and second backbone network 150. The network interface sends and receives data packets over the first backbone network 140 over two data channels 521 and 522, and the network interface send and receive data packets over the second backbone network 150 over two data channels 523 and 524.

There are first software and second software applications, each comprising a user operative portion 413 and a hidden program portion 414 for selectively sending bi-directional transmissions of data packets through the network interface 420 across first backbone network 140 and second backbone network 150; and over multiple data channels: 521, 522, 523 and 524. The data channels exchange data packets between the first software application and the second software application. The network interface 420 includes a controller for selectively coupling the data packets to the access point 420 responsive to the hidden program portions 414 of the first software application and the second software application that were transferred across the first backbone network 140 and second backbone network 150.

Each of the data channels: 521, 522, 523 and 524 as shown in FIG. 5, is associated with sending and receiving (S/R) security signals: 511 S/R first security signal, 513 S/R second security signal, and 515 S/R third security signal. Each of the data channels: 521, 522, 523 and 524 as shown in FIG. 5, is associated with S/R secure time-stamps: 512 S/R first secure time-stamp, 514 S/R second secure time-stamp, and 516 S/R third secure time-stamp.

The S/R first security signal 511 (representative of the hidden program portion of the first software application) and the S/R second security signal 513 (representative of the hidden program portion of the second software application) are selectively coupled to the controller for selectively coupling 424 of associated ones of the data packets to be transferred across the first backbone network 140 and second backbone network 150.

The S/R first security signal 511 authenticates the first software application. The S/R second security signal 513 authenticates the second software application. Additionally, a third security signal 513 authenticates a third software application (not shown in FIG. 5). In an alternate embodiment of this invention, the S/R first security signal 511 and the S/R second security signal 513 are digital signatures derived from the data packet headers and are respectively representative of the hidden program portion 414 first software application and the second software application.

The access point 420 respectively couples secure time-stamps: 512, 514 and 516, to the hidden program portions of the first software application; the hidden program portion of the second software application; and the hidden program portion of a third software application. Then, the security signals: 511, 513 and 515, are selectively generated responsive to the respective secure time-stamps: 512, 514 and 516, and the hidden program portions. The secure time-stamps: 512, 514 and 516, are generated responsive to the UTC (Universal Coordinated Time) signal.

Figure 6:
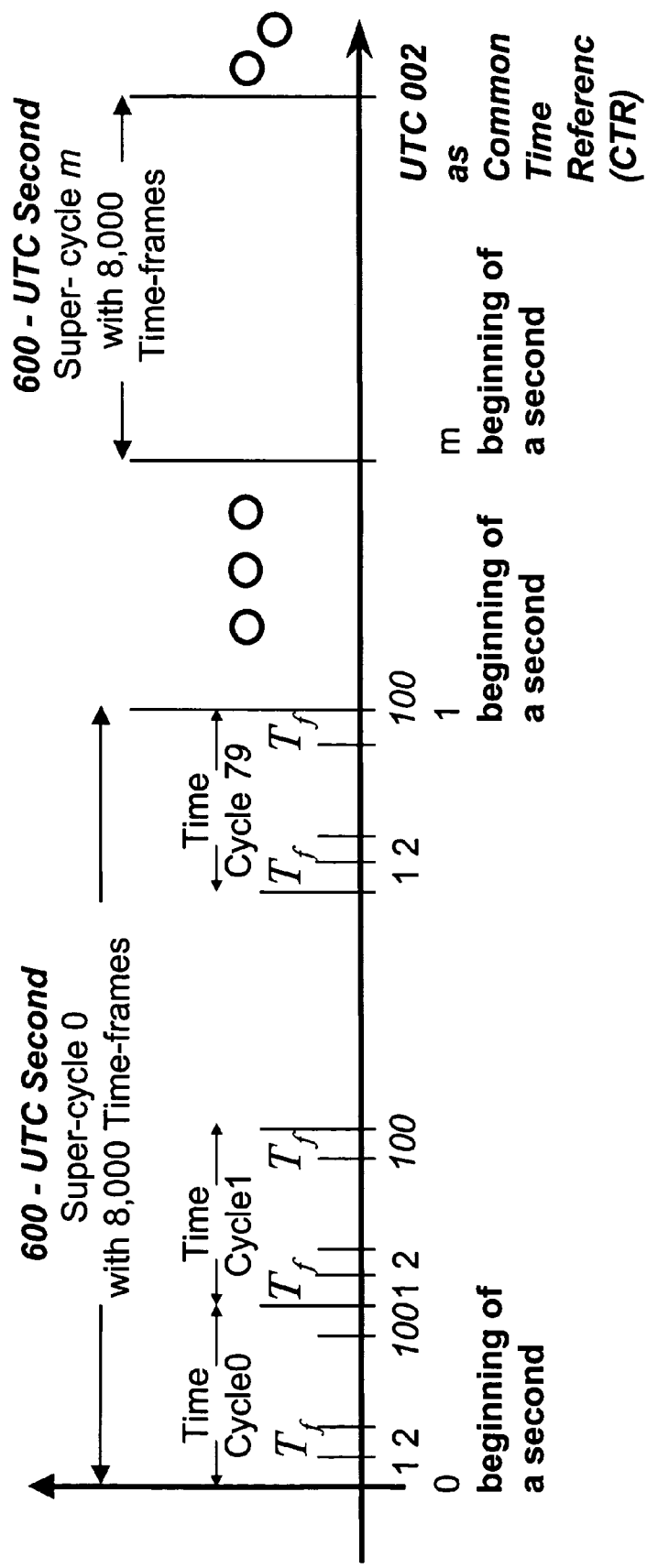
FIG. 6 is a timing diagram of a common time reference (CTR) that is aligned to the coordinated universal time (UTC) standard; as utilized by the present invention: the UTC is divided into a plurality of contiguous periodic super-cycles, each comprised of at least one contiguous time cycle and each comprised of at least one contiguous time frame, wherein the super-cycle is equal to and aligned with the UTC second.

UTC Time Structure:

In one embodiment, the secure time-stamps are derived from UTC (coordinated universal time) 002 as shown in FIG. 6. In this embodiment, each of the successive UTC seconds 600 is divided into consecutive time frames that are grouped into time cycles. As illustrated in FIG. 6, there are, e.g., 100 time frames in each time cycle. For the purpose of illustration, the time frames within a time cycle are numbered 1 through 100. Consecutive time cycles are grouped together into super-cycles. As shown in FIG. 6, there are 80 time cycles in each super-cycle. For the purpose of illustration, time cycles within a super-cycle are numbered 0 through 79. Super-cycles 0 and m are shown in FIG. 6.

FIG. 6 is illustrative of the relationship of time frames, time cycles, and super-cycles; in an alternate embodiment, the number of time frames within a time cycle may be different than 100, and the number of time cycles within a super-cycle may be different than 80. In this embodiment, e.g., the duration of every super-cycle is exactly one second as measured by the UTC standard. Moreover, as shown in FIG. 6, the beginning of each super-cycle coincides with the beginning of a UTC second. Consequently, when leap seconds are inserted or deleted for UTC corrections (due to changes in the earth rotation period), the cycle and super-cycle periodic scheduling will not be affected. The time frames, time cycles, and super-cycles are associated in the same manner with all respective network interfaces 420 and all respective Security Tag Checkers 120TTC.

In the embodiment illustrated in FIG. 6, the super-cycle duration is equal to one second as measured using the UTC (Coordinated Universal Time) standard. In an alternate embodiment the super-cycle duration spans multiple UTC seconds. In another alternate embodiment the super-cycle duration is a fraction of a UTC second. In another embodiment, the super-cycle duration is a small integer number of UTC seconds. A time frame may also be further divided into time slots in the preferred embodiment (not illustrated in FIG. 6).

UTC can be obtained by the network interface 420 from various sources, e.g., global positioning system (GPS), Global Navigation Satellite System (GLONASS), Galileo, and Two-Way Satellite Time and frequency Transfer (TWTFT).

Figure 7A:
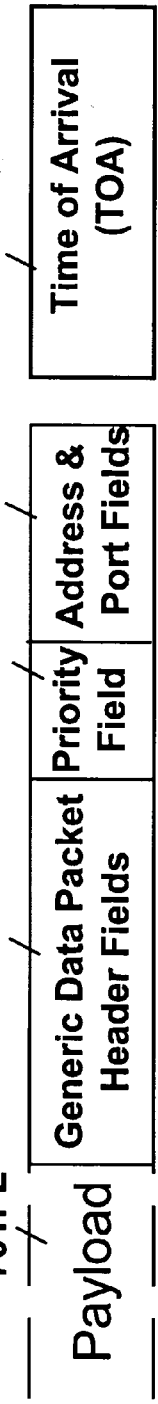
FIG. 7A is a description of a data packet structure that consists of a header and payload portions, such that the header portion consists of priority field, address and port fields, and various generic data packet header fields.

The Generic Structure of Data Packets:

FIG. 7A is a descriptive diagram of a data packet structure that consists of a header portion 700 and a payload portion 701PL, such that the header portion consists of priority field 703Pri, address and port fields 704AdrPrt, and various generic data packet header fields 702Gen (described in more detail below). In one embodiment, the priority field 703Pri is used for associating data packets with class of service, e.g., premium service. The address and port fields 704AdrPrt are used both for routing and association with various applications, e.g., streaming media. In another embodiment, when a data packet is received for processing an additional time of arrival (ToA) 705ToA is attached to it. ToA can be derived from the UTC second 600—as shown in FIG. 6. ToA 705ToA can have a plurality of numerical formats. One example is the format of the Internet's Network Time, which is in seconds relative to 0 h UTC on 1 Jan. 1900. The full resolution NTP time-stamp is a 64-bit unsigned fixed point number with the integer part in the first 32 bits and the fractional part in the last 32 bits. In some fields where a more compact representation is appropriate, only the middle 32 bits are used; whereas, the low 16 bits represent the integer part, and the high 16 bits represent the fractional part. The high 16 bits of the integer part must be determined independently.

Figure 7B:
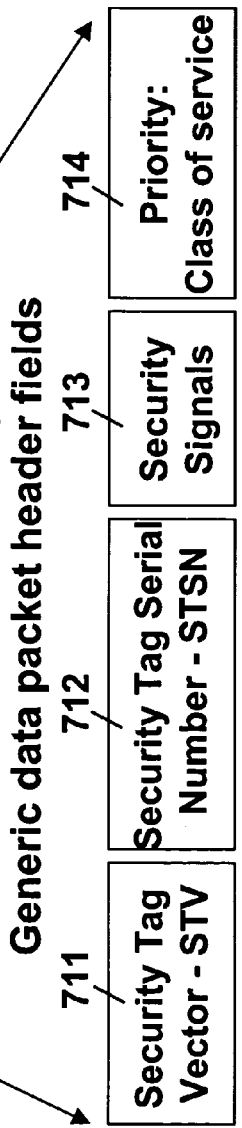
FIG. 7B is a description of the generic data packet header fields used by the end station with its trusted flow generator (TFG).
Figure 7C:
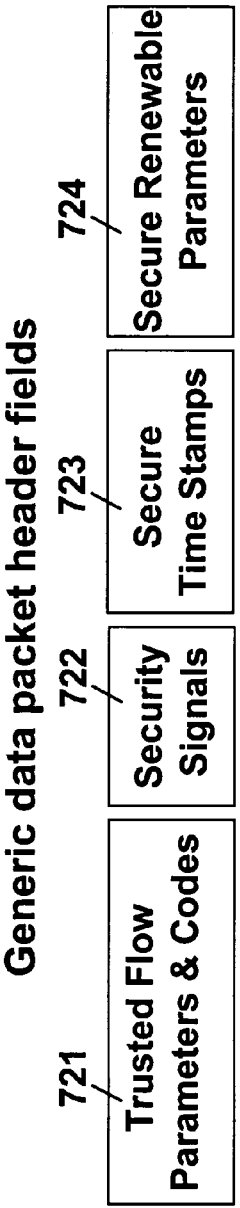
FIG. 7C is a description of the generic data packet header fields used by the network interface with trusted tag checker (TTC) and security management system (SMS).

There are two variants of the generic data packet header fields 702Gen. One variant is associated with end station 115 and the trusted flow generator (TFG) as shown in FIG. 7B, and the other variant is associated with network interface (NI) and the trusted tag checker (TTC) as shown in FIG. 7C. The two variants of the generic data packet header fields 702Gen are used in the various protocols and algorithms disclosed in various methods and implementations of the present invention.

FIG. 7B is a descriptive diagram of the generic data packet header fields 702Gen used by the end station 115 with its trusted flow generator (TFG). These fields contain information to be used, e.g., by the trusted tag checker (TTC) at the network interface (see FIG. 1). The generic fields that are related to TFG are:
(1) Security Tag Vector—STV 711, which is used to signal to the TTC that a certain program was used to generate and send data packets;
(2) Security Tag Serial Number—STSN 712, which is used for initializing the operation of TFG and TTC;
(3) Security Signals 713, which used to send various security information from TFG to TTC; and
(4) Priority: Class of service 714, which is used as priority field mapping data packets to their respective class of service.

FIG. 7C is a descriptive diagram of the generic data packet header fields 702Gen used by the network interface with trusted tag checker (TTC) and security management system (SMS). These fields contain information to be used, e.g., by the trusted flow generator (TFG) at the end station 115 (see FIG. 1). The generic fields that are related to TFG are:
(1) Trusted Flow Parameters & Codes 721,
(2) Security Signals 722, used to send various security information from TTC to TFG;
(3) Secure Time-stamps 723, used to provide the time derived from UTC 002 (see FIG. 6); and
(4) Secure Renewable Parameters 724, used for securely sending renewable parameters from TTC to TFG, which are used, e.g., for determining how often certain programs for generating and sending data packets can be used.

The Operation, Structure of TFG and TTC, and Communications System:

FIG. 8 is a schematic flow-chart of the trusted flow generator (TFG) 110TFG operation that is used to generate and send data packets with security tags. The TFG operation is based upon taking logic modules (programs and data) with known functionality and transforming them into a hidden program by integrating modules to execute together into a logic which is partially obfuscated and/or encrypted and/or physically hidden—as shown in FIG. 12A, FIG. 12B, FIG. 12C, FIG. 12D, and FIG. 14.

Figure 13:
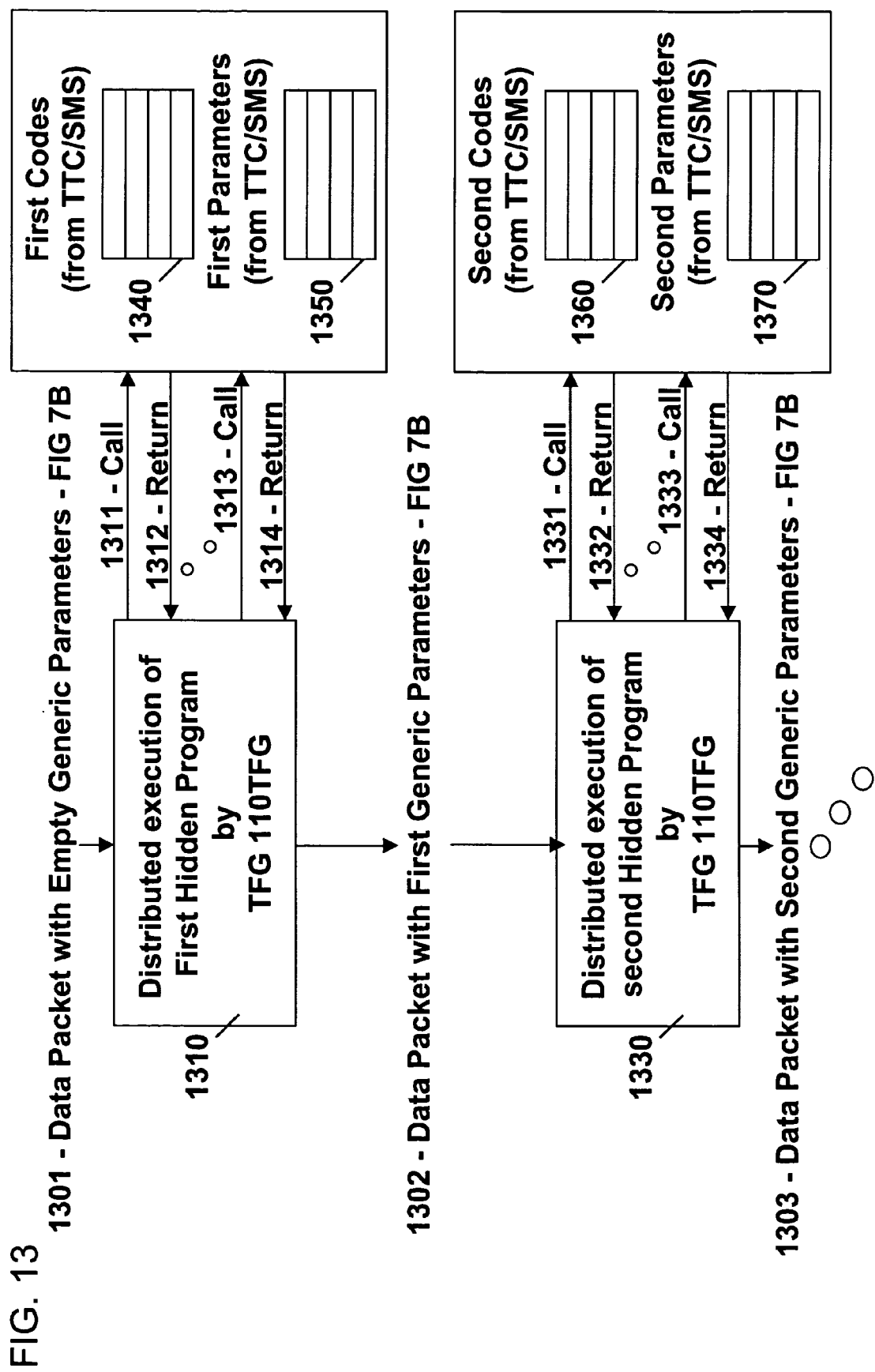
FIG. 13 is a schematic description of execution of a hidden program by TFG with codes and parameters that were received from the TTC.

As shown in FIG. 13, the hidden program part of TFG 110TFG is updated dynamically in order to strengthen it against reverse engineering efforts. The program includes the functionality for generating security signals, e.g., Security Tag Vector (STV) 711, Security Tag Serial Number (STSN) 712, and Security Signals 713—unpredictable by observers, e.g., a pseudo-random sequence of security signals. Only elements that share the means for producing the security signals can check their validity. The modules include operational tasks and performance parameters for this operation. The operation can be transmission of data packets within given parameters of performance that the hidden program contains. The generated security signals thus assure that the correct operation has taken place and can be used to signal various cryptographic parameters as well, e.g., Security Signals 713.

In FIG. 8, data packets are received for processing by operation module 811 and transferred to the initialization module 812, which is used for coordinating the operation of the TFG and the TTC by appropriately setting the Security Tag Serial Number (STSN) 712—used for initializing the operation of the TFG and the TTC. The operation module 813 is responsible for Computing the Renewable Precondition for Transmission (as shown in FIG. 13), then this operation module computes two fields for the generic part of the data packet header 700Gen: (1) the Security Tag Vector (STV) 711 and (2) the Security Tag Serial Number (STSN) 712. Following this step there are two options 814: (1) computing additional security signals, e.g., authenticating and signing the data packet 815 before its transmission 816, and (2) proceeding to data packet sending 815 without additional security operations.

Figure 9:
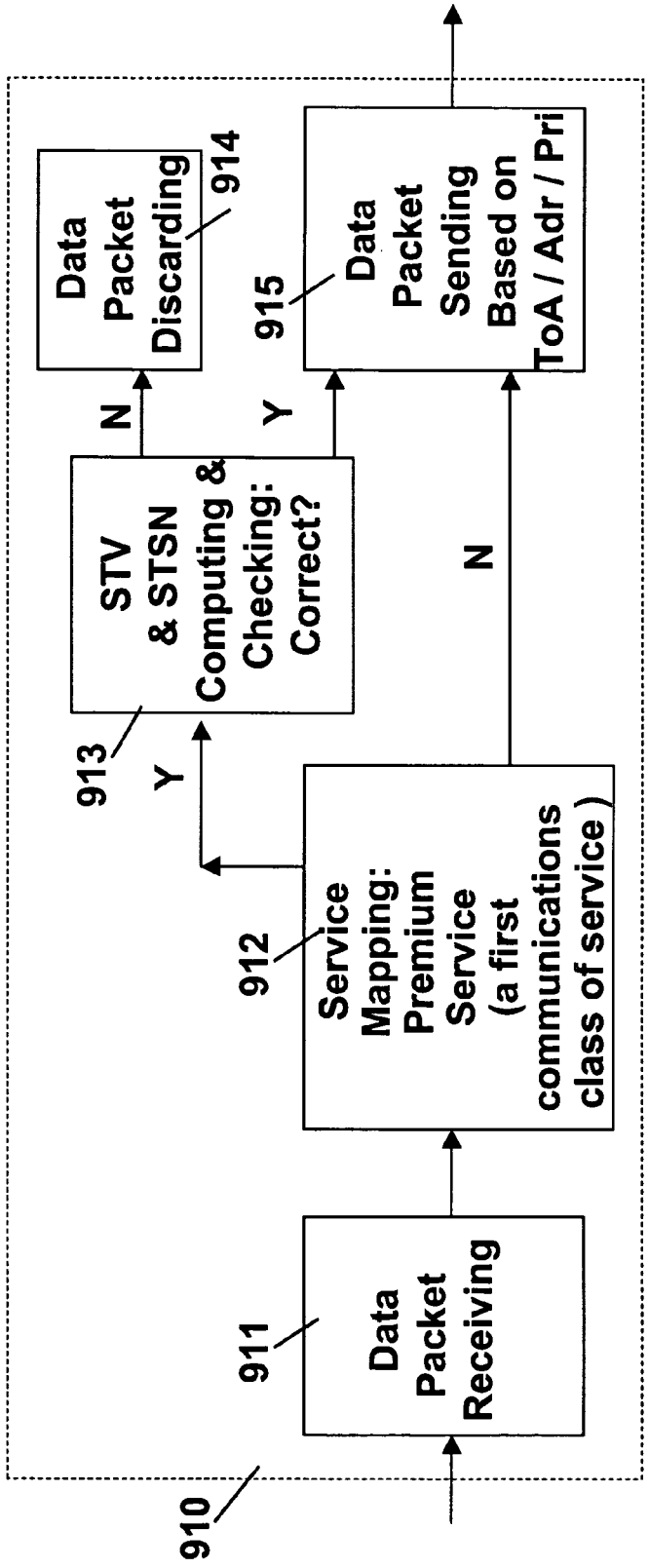
FIG. 9 is a schematic description of the trusted tag checker (TTC) operation that is used to check the authenticity of the program used to generate and send data packets with security tags.

FIG. 9 is a schematic description of the trusted tag checker (TTC) 120TTC operation that is used to check the authenticity of the program used to generate and send data packets with security tags. The data packet is received by operation module 911 and then transferred to operation module 912 that performs the service mapping function. The service mapping can be achieved by various methods, e.g., by decoding the priority field 703Pri in the packet header and by decoding the address and port fields 704AdrPrt in the data packet header. The service mapping can be performed by decoding the class of service 714 in the generic data packet header fields. When the incoming data packet is identified as being generated by a trusted flow generator (TFG) the data packet can receive premium service after further authenticity checks by operation module 913. Module operation 913 checks two fields in the generic header of the data packet received from the end station 115: (1) Security Tag Vector (STV) 711, which is used to signal to the TTC that a certain program was used to generate and send data packets; and (2) Security Tag Serial Number (STSN) 712, which is used for initializing the operation of the TFG and the TTC. If the checking by operation module 913 is correct, the data packet will be sent by operation module 915 as a premium service data packet. Otherwise, when the checking is not correct, the data packet is discarded by operation module 914. The sending of data packets from operation module 915 can be based on various parameters, e.g., time of arrival 705ToA, address 704AdrPrt, and priority 703Pri. Those data packets that do not receive premium service are transferred from operation module 912 to operation module 915 for sending out of the TTC 120TTC.

Figure 10:
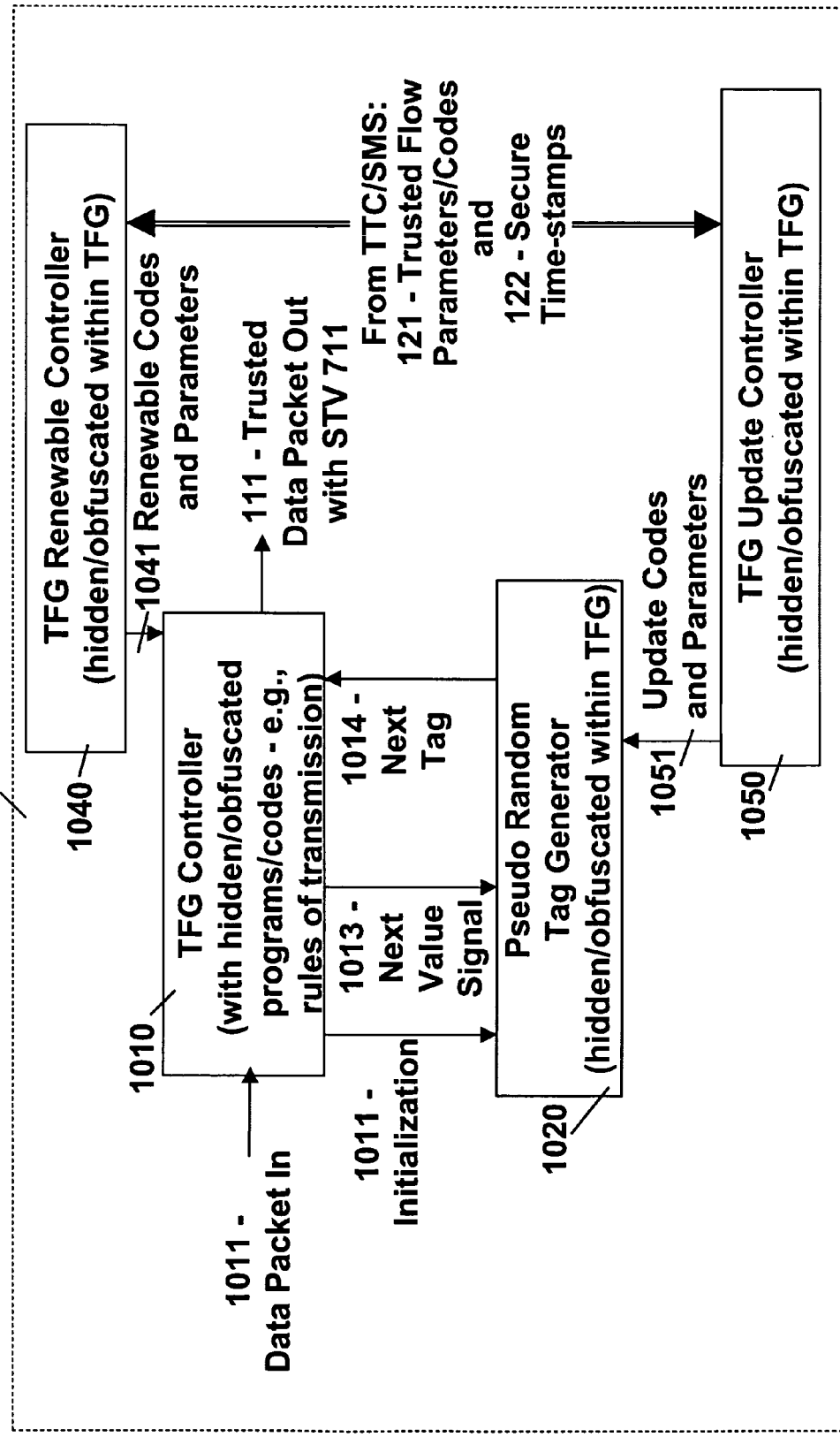
FIG. 10 is a functional structure of the trusted flow generator (TFG) that is used to generate and send data packets with security tags.

FIG. 10 is a functional structure of the trusted flow generator (TFG) 110TFG that is used to generate and send data packets with security tags. In one embodiment of the present invention, the TFG is done in software; as part of the first computing element, wherein the second computing element is the TTC 120TTC. The TFG basic operations are performed by the TFG controller 1010, which receives data packet (in) 1011. The TFG controller 1010 sends initialization parameters 1012 to the pseudo-random tag generator 1020 prior to sending the next value signal 1013 to the pseudo-random tag generator 1020 requesting a security tag vector (STV) 711 for the generic header of the incoming data packet. The pseudo-random tag generator 1020 returns the next tag 1014 to the TFG controller 1010 with the next security tag vector (STV) 711. The data packet with the next security tag vector (STV) 711 is then sent out as data packet 111.

As shown in FIG. 10, the operation of the TFG controller 1010 is further controlled by the TFG renewable controller 1040, which sends renewable codes and parameters 1041 to the TFG controller 1010. The renewable codes and parameters 1041 determine renewable characteristics of the TFG controller 1010. The renewable characteristics include parameters, e.g., the number of data packets that can be processed by the TFG controller 1010 before receiving another renewable parameter, and the number of data packets that can be processed per unit time by the TFG controller 1010. In one embodiment of the present invention, the operation of the TFG renewable controller 1040 is further controlled through the network by at least one of: the security management server 160SMS and the trusted tag checker 120TTC, that send to the TFG renewable controller 1040 two types of renewable signals: (1) Trusted Flow Parameters/Codes 121 and (2) Secure Time-stamps 122. The two renewable signals determine how the TFG renewable controller 1040 controls the TFG controller 1010.

As shown in FIG. 10, the operation of the pseudo-random tag generator 1020 is further controlled by the TFG update controller 1050, which sends update codes and parameters 1051 to the pseudo-random tag generator 1020. The update codes and parameters 1051 determine the update characteristics of the pseudo-random tag generator 1020. The update characteristics include changes to the security tag vector 711 generation. In one embodiment of the present invention, the operation of the TFG update controller 1050 is further controlled through the network by at least one of: the security management server 160SMS and trusted tag checker 120TTC, that send to the TFG update controller 1050 two types of renewable signals: (1) Trusted Flow Parameters/Codes 121 and (2) Secure Time-stamps 122. The two renewable signals determine how the TFG update controller 1050 controls the pseudo-random tag generator 1020.

Another more detailed realization of the TFG update controller 1050, TFG controller 1010, TFG renewable controller 1040 and the pseudo-random tag generator 1020 (all shown in FIG. 10) are described in the operation disclosed in FIG. 13.

Figure 11:
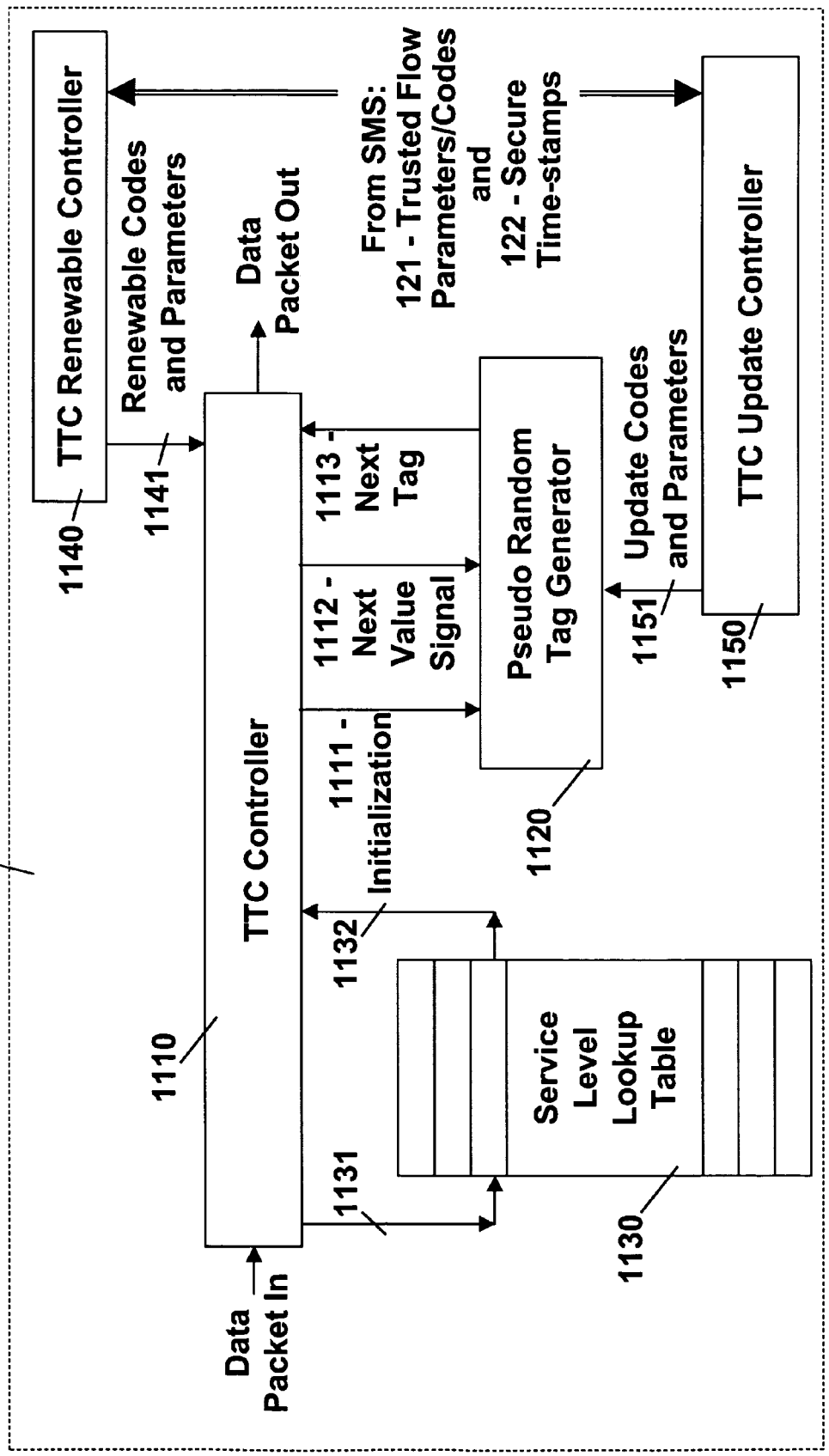
FIG. 11 is a functional structure of the trusted tag checker (TTC) that is used to check the authenticity of the program used to generate and send data packets with security tags.

FIG. 11 is a functional structural diagram of the trusted tag checker (TTC) 120TTC that is used to check the authenticity of the TFG program used to generate and send data packets with security tags. The TTC controller 1110 receives data packet 1111 and then checks its service type by sending a decoding signal 1131 to the service level lookup table 1130. The decoding signal 1131 can be at least one of: a priority field 703Pri, an address and port fields 704AdrPrt, a class of service 714 and a security signal 713. The response signal 1132 indicates to the TTC controller 1110 whether or not the data packet 1111 has a security tag vector 711 that needs to be checked in order to verify the authenticity of the generating and sending TFG program 110TFG.

The TTC controller 1110 sends initialization parameters 1112 to the pseudo-random tag generator 1120 prior to sending the next value signal 1113 to the pseudo-random tag generator 1020 requesting a security tag vector (STV) 711 for checking STV 711 received in the generic header of the incoming data packet 1111. The pseudo-random tag generator 1120 returns the next tag 1114 to the TTC controller 1110 with the next security tag vector (STV) 711. Then the TTC controller 1110 compares the two STV 711 values from the data packet and the locally computed by the pseudo-random tag generator 1120; if the two values are the same the data packet can be sent with premium service as shown in FIG. 9. Module 915 in FIG. 9 represents the operation of sending of data packets that can be based on various parameters, e.g., time of arrival 705ToA, address 704AdrPrt, and priority 703Pri.

As shown in FIG. 11, the operation of the TTC controller 1110 is further controlled by the TTC renewable controller 1140, which sends renewable codes and parameters 1141 to the TTC controller 1110. The renewable codes and parameters 1141 determine renewable characteristics of the TTC controller 1110. The renewable characteristics include parameters, e.g., how many data packets can be checked and compared by the TTC controller 1110. In one embodiment of the present invention, the operation of the TTC renewable controller 1140 is further controlled through the network by the security management server 160SMS that sends to the TFG renewable controller 1140 two types of renewable signals: (1) Trusted Flow Parameters/Codes 121 and (2) Secure Time-stamps 122. The two renewable signals determine how the TTC renewable controller 1140 controls the TTC controller 1110.

As shown in FIG. 11, the operation of the pseudo-random tag generator 1120 is further controlled by the TTC update controller 1150, which sends update codes and parameters 1151 to the pseudo-random tag generator 1120. The update codes and parameters 1151 determine the update characteristics of the pseudo-random tag generator 1120. The update characteristics include changes to the security tag vector 711 generation. In one embodiment of the present invention, the operation of the TTC update controller 1150 is further controlled through the network by the security management server 160SMS and trusted tag checker 120TTC which sends to the TTC update controller 1150 two types of renewable signals: (1) Trusted Flow Parameters/Codes 121 and (2) Secure Time-stamps 122. The two renewable signals determine how the TTC update controller 1150 controls the pseudo-random tag generator 1120.

Figure 15:
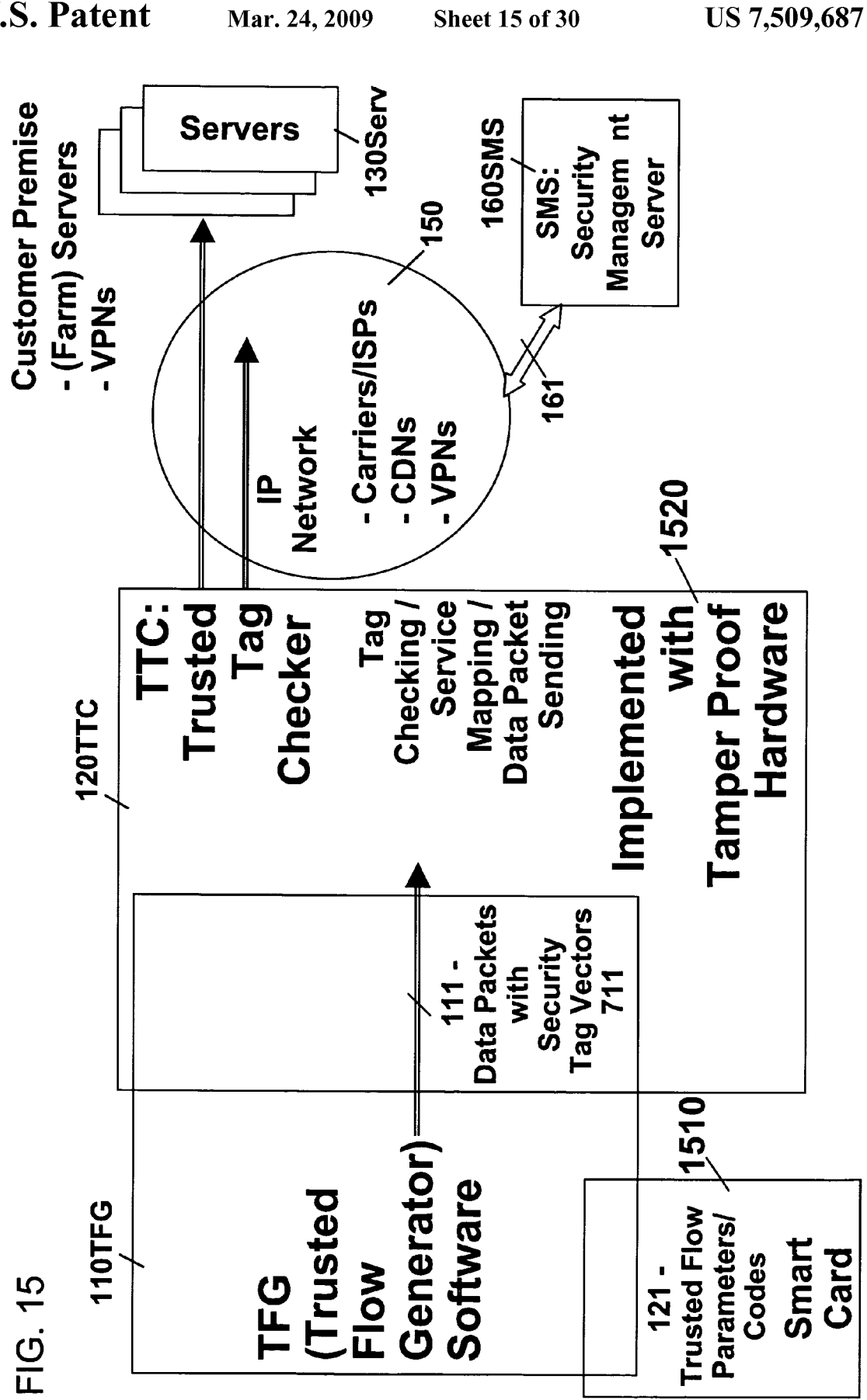
FIG. 15 is a functional description of a system implemented with tamper-proof hardware.

FIG. 15 is a functional descriptive diagram of a system implemented, e.g., with tamper-proof hardware. In this integrated configuration, the operations and implementations shown in FIG. 8, FIG. 9, FIG. 10, and FIG. 11, for TFG 110TFG and TTC 120TTC are combined. This combined integrated configuration can be implemented in various manners, e.g., with tamper-proof hardware, VLSI, micro-coded with a network appliance and micro-coded in a tamper-proof manner with a network appliance. The integrated configuration can be further combined with a smart card 1510. In an alternate embodiment of the present invention, the integrated configuration is further enhanced with a TFG challenge controller—as FIG. 16 discloses in detail.

The embodiment shown by FIG. 15 is used in the realization of various edge devices and network appliances, e.g., a cellular telephone, a PDA, a single printed circuit board, a single chip, a single computing module, a single chassis, a hand held device, a single box, a user terminal.

The TFG system, shown in FIG. 8 and FIG. 10, possesses means for providing controlled communication in accordance with defined rules of transmission. The system further comprises: processing data in accordance with defined logic to construct a first data packet; means for generating a security tag vector 711 responsive to validating the processing in accordance with the defined logic; and means for constructing by the TFG controller 1010 (shown in FIG. 10). The trusted data packet 111 is responsive to the means for processing and means for generating.

Figure 17:
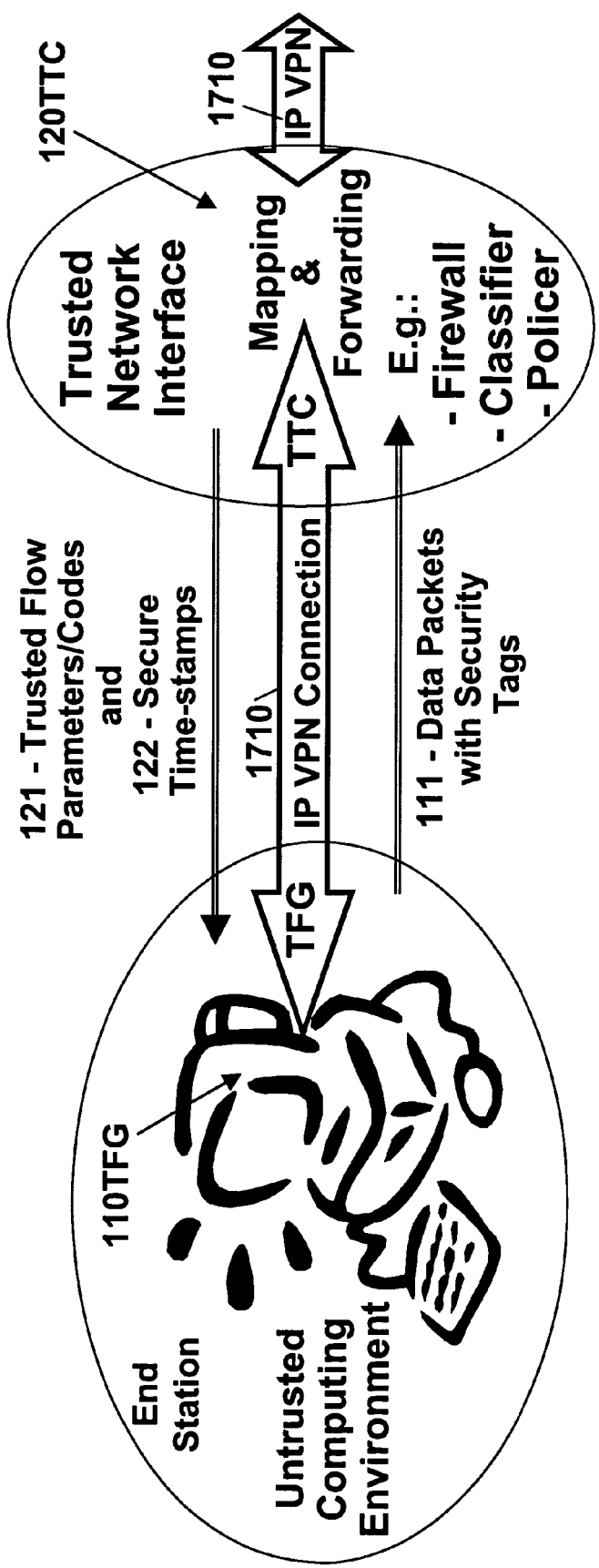
FIG. 17 is a functional description of a system that generates and sends data packets with security tag vectors over IP (Internet protocol) VPN (virtual private network) connection through a network interface, e.g., firewall, classifier, and policer, while mapping data packets with verified security tag vectors to premium service.

The system further comprises a means for transmitting the trusted data packet 111 onto a communications path, e.g., the VPN connection 2810 in FIG. 17, in accordance with the defined rules of transmission.

The system as shown in FIG. 1 and FIG. 11, comprises a means for receiving the trusted data packet 111 from the communications path; and means for validating the trusted data packet responsive to analyzing the trusted data packet to verify the security tag vector 711 responsive to the defined logic.

The system further comprises a means for mapping 1130 (shown in FIG. 11). The mapping of the trusted data packet 111 to a first communications class of service is responsive to the validating of the trusted data packet and verifying the respective security tag vector. The means for mapping the trusted data packet 111 to a second communications class of service is responsive to the validating of the trusted data packet; resulting in failed verifying of the security tag vector 711.

The system further comprises a means for coupling the first communications class of service with the trusted data packets 111 for further communication therefrom. The data packets of the second communications class of service deny further communication therefrom and are stored in a local storage without further transmission.

In an alternate embodiment of the system, the data packets of the second communications class of service are transmitted at a lower priority level than the first communications class of service, wherein the priorities are determined responsive to set of priority bits 703Pri within each of the data packets.

The system wherein the means for transmitting is performed in a first computing element that is part of TFG is shown in FIG. 1, FIG. 8 and FIG. 10. The means for receiving is performed in a second computing element that is part of TTC, as shown in FIG. 1, FIG. 9 and FIG. 11. The system wherein the first computing element and the second computing element are both contained within a single physical computing system is shown in FIG. 15.

In the system shown in FIG. 15, the first computing element and the second computing element are contained in separate physical computing systems, as shown in FIG. 1, FIG. 2, FIG. 3, FIG. 4 and FIG. 17. The second computing element of the system has non-modifiable processing logic.

In the system, as in FIG. 1 and FIG. 15, at least one of the first computing element and the second computing element comprises at least one of: tamper-proof hardware, tamper-proof firmware and self-destructive hardware. The second computing element of the system is made inoperative responsive to detection of at least one of: tampering, attempting to replace hardware, attempting to replace firmware, and attempting to replace software. The single physical computing system, shown in FIG. 15, is at least one of: a single printed circuit board, a single chip, a single computing module, a single chassis, an hand held device, a PDA, a cellular phone, a single box, and a user terminal.

In the TFG system, shown in FIG. 8 and FIG. 10, the means are obfuscated for generating the security tag vectors (STVs) 711 and processing data in accordance with defined logic to construct the first data packet. The TFG system generating the STV 711 is hidden within the processing data in accordance with defined logic to construct the first data packet 111.

Figure 12:
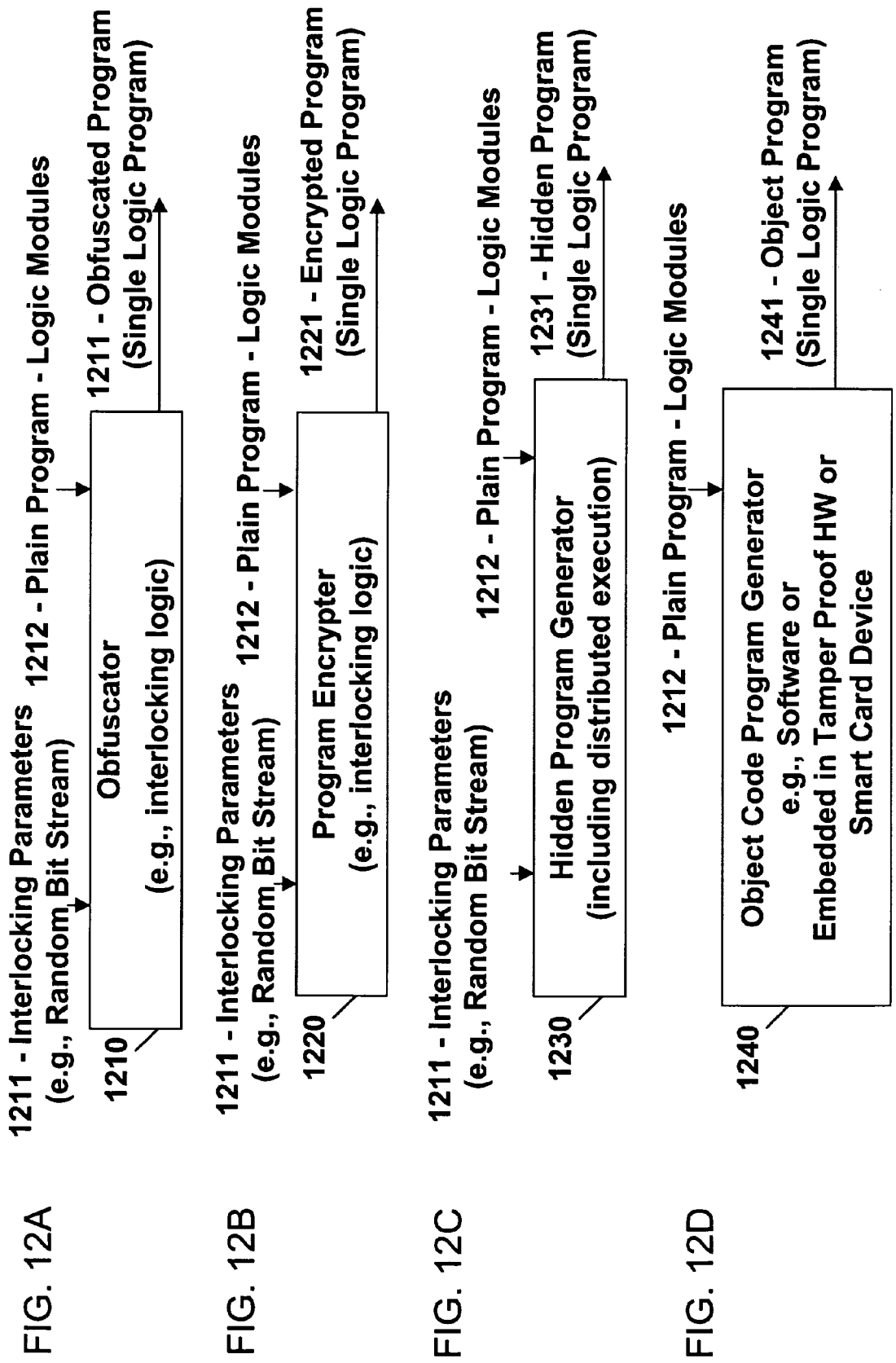
FIG. 12A is a functional description of a program obfuscator that consists of interlocking logic and receives as inputs interlocking parameters and a plain program with multiple logic modules and creates as an output an obfuscated program as a single logic program.
FIG. 12B is a functional description of a program encrypter that consists of interlocking logic and receives as inputs interlocking parameters and a plain program with multiple logic modules and creates as an output an encrypted program as a single logic program.
FIG. 12C is a functional description of a hidden program generator that consists of interlocking logic and receives as inputs interlocking parameters and a plain program with multiple logic modules and creates as an output a hidden program as a single logic program.
FIG. 12D is a functional description of an object code program generator, e.g., software or embedded in tamper-proof hardware or smart card device, and creates as an output an object program as a single logic program.

In the TFG system, shown in FIG. 8 and FIG. 10, the means for generating the security tag is encrypted within the processing data in accordance with defined logic to construct the first data packet, as shown in FIG. 12, FIG. 13 and FIG. 14.

The system, as shown FIG. 1, further comprises means for coupling the first computing element TFG 110TFG and the second computing element TTC 120TTC through a communications network 140 and 150. The communications network, 140 and 150, is at least one of: an access network, a metropolitan network, a local area network, a wireless network, an enterprise network, a cellular telephone network, a cable modem network, a passive optical network, Ethernet, token ring, a spatial reuse ring, SONET ring, a resilient packet ring, a costumer premise network (CPN), an IP, Internet, a 3G wireless network, IEEE 802 standards, ATM network, frame relay (FR) network, a virtual private network (VPN), a shared media, and a storage area network (SAN). The first computing element TFG 110TFG and the second computing element TTC 120TTC are directly coupled.

The first computing element TFG 110TFG is part of at least one of: a single printed circuit board, a single chip, a single computing module, a single chassis, an hand held device, a PDA, a cellular phone, a single box, a user terminal, an application software module, an operating system module, a Java applet, a communications software module, a firmware component, a software driver, and a distributed system software module.

The second computing element TTC 120TTC is part of at least one of: a firewall, a gateway, a router, a routing controller, a local area network bridge, a local area network switch, a wireless base station, a wireless 3G base station, an IEEE 802.11 base station, a cable modem head-end, a central office, an ADSL DSLAM, and a point-of-presence (PoP).

An alternate embodiment of the present invention further comprises: means for forwarding the trusted data packet 111 for further communication over a defined communications path 150, wherein the defined communications path 150 is part of at least one of: a VPN (virtual private network), an ATM, a FR (frame relay), a CPN (costumer premise network), a content delivery network (CDN), an ISP, a shared media, a firewall, a local area network, the Internet, a metropolitan area network, a SAN, a link to application server, a link to web server, a link to data base server, a link to Internet server, a link to network server, a public network, an enterprise network, and a carrier network.

The system further comprises a means for forwarding the trusted data packet 111 to a further computing device, wherein the further computing device is at least one of: an application server, a web server, a data base server, an Internet server, a network server, a firewall, a multimedia server, and a video server.

In the system, within the TTC 120TTC, the first class of service comprises local processing of the trusted data packet 111. The local processing is done by at least one of: a router, a server, a web-server, a database, a firewall, and a network appliance.

The TFG 120TFG further comprises means for receiving at least some of the defined rules of transmission from separate rules controllers: TFG renewable controller 1040 and TFG update 1050, specified in FIG. 10. In the system, within the TFG 120TFG, the defined rules of transmission determine at least one of: performance characteristics, access characteristics, transmission limitations, transmission rates, window sizes, port numbers, IP addresses, network addresses, quotas, renewable quotas, packet structure limitations, and transmission schedule.

In the system, within the TFG 120TFG, at least one of the defined rules of transmission determines a renewable precondition for transmission. The renewable precondition for transmission is defined by least one of: renewable transmission quota of trusted data packets, number of trusted data packets that can be transmitted per unit of time, time signal, UTC time signal, digitally signed time signal, digitally signed time-stamp, digitally signed time-stamp from UTC (coordinated universal time), digital cash for transmission of trusted data packets, and cryptographic keys for marking trusted data packets.

Part of the renewable controller 1040 obtains the renewable precondition for transmission from at least one of: a predefined logic, an external rule controller, a security management system (SMS) 160SMS, a network interface, a network appliance, a server, a network management system, a firewall, a local computation, a smart card device, and a portable device. Whenever the renewable precondition for transmission is not valid, transmission is suspended.

The TFG system in FIG. 10, further comprises: means for updating of parts of defined logic by using a TFG update controller 1050, wherein the means for updating comprises at least one of: means for adding data, means for deleting data and means for replacing data and wherein data comprises at least one of lines of codes, machine codes, obfuscated codes, object codes, tables of codes, program parameters, subroutine parameters, tables of parameters, data structure of parameters, software modules, alpha numeric values, cryptographic fields, assembly language code, software applets, program control information, firmware code, instructions for reprogramming programmable hardware elements e.g. PLAs.

In the TFG system, the means for generating data packets 111 with STV comprises at least one of: means for applying a pseudo-random generator, means for applying a pseudo-random function, means for applying a cryptographic function, means for applying an encryption function, means for applying a scrambling subroutine, means for applying an authentication function, means for applying a digital signing function, means for applying a cryptographic hash function, applying a subroutine, means for applying a computational logic module, means for applying a symmetric cryptography function, applying an asymmetric cryptography function, employing a cryptographic key, employing a cryptographic seed, employing an encrypted software, employing an obfuscated software, means for employing a hidden program, means for employing logic with a set of parameters, means for employing a hardware module, means for employing a smart card, means for employing a portable device, and means for employing a distributed protocol.

The TTC system in FIG. 9 and FIG. 11, has means for validating compliance with communications processing for the transmittal of data packets 111 comprised of a received security tag vector—STV 711. The TTC system further comprises: means for receiving one of the data packets; means for generating a local security tag; means for comparing the local security tag to the received security tag; and means for mapping the received data packet to a defined class of service responsive to the means for comparing.

The TTC system in FIG. 9 and FIG. 11, further comprises: means for mapping the received data packet to a first class of service responsive to the local security tag equaling the received security tag; and means for mapping the received data packet to a second class of service responsive to the local security tag being different from the received security tag.

The TTC system in FIG. 9 and FIG. 11, further comprises means for forwarding the received data packet for further communication over a defined communications path. The TTC system in FIG. 9 and FIG. 11, has at least part of the defined communications of at least one of: a VPN, an ATM, a FR, a CPN, a content delivery network (CDN), an ISP, a shared media, a firewall, a local area network, an Internet, a metropolitan area network, a SAN, a link to application server, a link to web server, a link to data base server, a link to Internet server, a link to network server, a public network, an enterprise network, and a carrier network.

The TTC system in FIG. 9 and FIG. 11, further comprises: means for forwarding the received data packet to a further computing device, wherein the further computing device is at least one of: an application server, a web server, a data base server, an Internet server, a network server, a firewall, a multimedia server, a video server.

In the TTC system in FIG. 9 and FIG. 11, the first class of service is comprised of a local processing of the received data packet 111, wherein the local processing is done by at least one of: a router, a server, a web-server, a database, a firewall, and a network appliance.

The TFG and TTC systems have means for providing controlled signaling in accordance with defined rules of at least one of transmission and operation: means for processing data in accordance with defined logic to construct operation;

means for generating a security tag responsive to validating the processing in accordance with the defined logic; and means for constructing a signal responsive to computing with security tag. The system further comprises means for transmitting the signal onto a communications path in accordance with the system operation.

The system further comprises means for receiving at least some of the defined rules of at least one of transmission and operation from a separate rules controller: TFG renewable controller 1040 and TFG update 1050, specified in FIG. 10. At least one of the defined rules of at least one of transmission and operation, determines a renewable precondition for at least one of transmission and operation.

The system specified in FIG. 10 further comprises means for updating of parts of defined logic; wherein generating comprises at least one of: means for applying a pseudo-random generator, means for applying a pseudo-random function, means for applying a cryptographic function, means for applying an encryption function, means for applying a scrambling subroutine, means for applying an authentication function, means for applying a digital signing function, means for applying a cryptographic hash function, means for applying a subroutine, means for applying a computational logic module, means for applying a symmetric cryptography function, means for applying an asymmetric cryptography function, means for employing a cryptographic key, means for employing a cryptographic seed, means for employing an encrypted software, means for employing an obfuscated software, means for employing a hidden program, means for employing logic with a set of parameters, means for employing a hardware module, means for employing a smart card, means for employing a portable device, and means for employing a distributed protocol.

In the TFG system, at least one of the defined rules of at least one of transmission and operation, determines an action based on a context; wherein the context involves at least one of: a system user present, a system user present at an end-station, a system user present at the computer used for transmission and operation, application program present, a data information available, a cryptographic keys available and parameters available. When said context is missing for at least one of transmission and operation there will be no transmitting the signal onto a communications path in accordance with the operation.

The TTC system in FIG. 9 and FIG. 11 validates compliance with defined rules of at least one of transmission and operation via a received signal from said system further comprised of: means for receiving signal; means for generating a local signal; means for comparing the local signal and received signal; means for deciding on compliance; means for mapping at least one of transmission and operations to a defined class of service responsive to the deciding; means for receiving data packet; means for mapping the received data packet to a first class of service responsive to deciding; means for mapping the received data packet to a second class of service responsive to deciding; means for forwarding the received data packet for further communication over a defined communications path; and means for forwarding the received data packet to a further computing device.

In the TTC system in FIG. 1; FIG. 9 and FIG. 11, the first class of service is comprised of local processing of the received data packet; wherein the local processing is done by at least one of: a router, a server, a web-server, a database, a firewall, and a network appliance.

The trusted system disclosed in this invention provides for a communications system comprising:

(1) TFG system in FIG. 8 and FIG. 10 with a first communications subsystem comprising a first processing subsystem providing first logic for data packet processing, rules of transmission and security tag generation, for selectively transmitting trusted data packets 111; and (2) TTC system in FIG. 9 and FIG. 11 with a second communications subsystem comprising a second processing subsystem providing logic for checking, validating and mapping of the selectively transmitted trusted data packets responsive to a defined validation logic; and (3) a communications access network coupling the first communications subsystem and the second communications subsystem.

In said trusted system the mapping of the selectively transmitted trusted data packets 111 is further comprised of mapping logic; wherein mapping logic is further comprised of at least one of: a mapping table, decision-tree, a processing logic, a data packet processing logic, a data packet header processing decision-tree, a security tag processing logic, a data packet identification processing logic, a data packet priority processing logic, a data packet class of service processing logic, and a secure time-stamp processing logic.

Said trusted system further comprises a communications service network for coupling the second communications subsystem to a destination; wherein the rules of transmission are provided to the first communications subsystem from the communications service network. The second communications subsystem is further comprised of a subsystem for forwarding data packets responsive to the mapping logic.

In the TFG system in FIG. 1, FIG. 8 and FIG. 10, the rules of transmission are part of the TFG controller 1010; are further characterized as defining at least one of: a transmission rate, a maximum window size, a port number, a destination IP, a source IP, a data packet priority, a transmission time, and a transmission schedule.

In the TFG system in FIG. 1, FIG. 8 and FIG. 10, the rules of transmission and security tag generation are part of the TFG controller 1010; are further characterized as responsive to a at least one of: a predefined schedule, a secure time-stamp, renewable codes and parameters, and update codes and parameters.

In the TFG system in FIG. 1, FIG. 8 and FIG. 10, the rules of transmission, are part of the TFG controller 1010; wherein the rules of transmission are provided from an external storage medium. The first logic that is part of the TFG controller 1010 is comprised of an interlocking of a plurality of logic modules responsive to the data packet processing, the rules of transmission and the security tag generation. The interlocking is further characterized by each respective one of the plurality of logic modules being associated with a respective one of a plurality of defined subtasks. The combined plurality of defined subtasks defines the first logic, wherein all of the logic modules are required to properly perform the respective defined subtask to provide the first logic.

The TFG system in FIG. 1, FIG. 8 and FIG. 10, further comprises: an update controller, as part of the TFG, and a security management server (SMS) that is external to the TFG system. The update controller 1050 provides update codes and parameters to the first processing subsystem that is part of the TFG controller 1010, wherein the SMS provides an update information to the update controller. The system further comprises a renewable controller 1040, wherein the renewable controller provides update codes and parameters to the first processing subsystem; the SMS provides renewable information to the renewable controller. The TFG system with its first processing subsystem further comprises cryptographic modules; wherein cryptographic modules further provide for at least one of: program authentication, user authentication, cryptographic authentication, application authentication, encryption, secure time-stamp, and digital signature.

The TTC system with its second processing subsystem further comprises validation modules; wherein validation modules further providing for at least one of: program authentication checking, user authentication checking, cryptographic authentication checking, application authentication checking, decryption, secure time-stamp, and digital signature validation.

In another embodiment of the present invention, the system controls communications data packet flow between at least two computing elements comprising: means for generating a security tag; means for associating the security tag with a first computing element responsive to compliance logic; means for generating a data packet which includes a security portion; means for transmitting the data packet over a communications path; means for receiving the data packet at least a second computing element; means for processing the data packet to validate the security portion responsive to the security portion and at least a portion of the data packet; and means for transmitting the data packet from the second computing element to for further processing at least a third computing element; wherein (1) the communications path includes at least the second computing element and the third computing element, (2) the transmitting is responsive to the processing of the second computing element and the third computing element and (3) wherein the processing in at least one of: the second computing element and the third computing element, computing of additional security.

In an alternate embodiment of the present invention for providing secure communications, the system comprises: means for consistent initialization of a tag generator, which is part of the TFG controller 1010, operating from an initial generator state to generate a sequence of security tags 711 for association with data packets for transmission; means providing for transmission of the data packets with associated security tags from the TFG controller 1010 to tag verifier, which is part of TTC 120TTC, operating from an initial verification state to generate a sequence of comparison security tags for selective comparison to the security tags 711. The system further includes means for coordinating the initial generator state and the initial verifier state prior to transmission of any of the data packets in the sequence; wherein the tag verifier provides valid comparison tags responsive to the means for coordinating.

Said system comprises means for consistent initialization: a sequence number 712 that is associated with the tag generator, which is part of the TFG controller 1010. The sequence number is included as part of the security tag. The tag verifier, which is part of TTC, generates a comparison sequence number for selective comparison to the sequence number that is part of the security tag; wherein the sequence number 712 is used for at least detecting data packet loss.

Said system further comprises: a secure time-stamp secure time-stamp; wherein the tag generator, which is part of the TFG controller 1010, includes the secure time-stamp as part of the security tag 711 in the generic data packet header. The tag verifier, which is part of TTC 120TTC, generates a comparison secure time-stamp for selective comparison to the secure time-stamp that is part of the security tag.

Said system for providing secure communications also comprises: a tag generator operating from an initial generator state to generate a sequence of security tags and related information for association with data packets for transmission; means providing for transmission of the data packets with associated security tags 711 in the generic data packet header; a tag verifier operating from an initial verification state to generate a sequence of comparison tags for selective comparison to the security tags responsive to the related information; and wherein (1) the tag verifier only provides validation of the data packets 111 responsive to comparing the comparison tags and the respective security tags for the respective data packets, and to the synchronization of the initial generator state and the initial verification state and (2) the related information is at least of: program authentication, user authentication, cryptographic authentication, application authentication, encryption, secure time-stamp, time-stamp, clock reading, and digital signature.

Program Hiding and Obfuscating with Secure Logic Interlocking:

The system specified herein is designed for providing secure integration of separate logic modules to provide a combined functionality, the system comprising: a plurality of software logic modules operable stand-alone to provide a respective plurality of subtask functions; a transformation controller for interlocking the plurality of software logic modules into a single logic program; wherein the combined functionality is only provided when the plurality of subtask functions are executed responsive to the single logic program.

The system for providing secure integration gets as input random bit string 1211 as a parameter and another parameter of plain program consisting of logic modules 1212. It performs the integration of the logic modules using an "obfuscator" 1210; or a "program encrypter" 1220; and/or a "hidden program generator" 1230—generating modules for remote execution, or execution in memory modules which are not easily available or recognizable; and/or an "object code program generator"—generating software which makes the code unchangeable and/or it embeds the code in a tamper-proof device" 1240. In all cases the outcome is a single logic program which can be an obfuscated program" 1211; and/or "an encrypted program" 1221; and/or "a hidden program" 1231 and/or "an object program" 1241. The various options to be executed are presented in FIG. 12. The program can be integrated where part of it is hidden and another part is encrypted. It is clear to one who is familiar with the art how to combine and super-impose the transformation above and variation thereof as part of the system for secure integration.

The exact sequence and nature of the obfuscation and/or encryption transformations which maintains the logic of each of the module and makes the executable logic a unique integrated logic which is to be executed as one logic without the user being able to separate the modules, is also subject to variation and is known in the art as explained in the background for the invention.

The system for secure integration can be run, wherein the single logic program is written to be immune to reverse generation. Namely, there is no effective way to separate the module to be executed separately by reverse engineering.

The system can be executed on various inputs and in particular, wherein one of the software logic modules provides a cryptographic function for producing pseudo-random sequence of security tags vectors 711. When this module is not available for reverse engineering, there is no way to generate the output sequence of security tags due to the strength of unpredictability of cryptographic functions.

In one embodiment, the system can use various means known in the art and run producing a pseudo-random sequence of security tags involving computation by at least one of the following methods: applying a pseudo-random generator, applying a pseudo-random function, applying a cryptographic function, applying an encryption function, applying a scrambling subroutine, applying an authentication function, applying a digital signing function, applying a cryptographic hash function, applying a subroutine, applying a computational logic module, applying a symmetric cryptography function, applying an asymmetric cryptography function, employing a cryptographic key, employing a cryptographic seed, employing an encrypted software, employing an obfuscated software, employing a hidden program, employing logic with a set of parameters, employing a hardware module, employing a smart card, employing a portable device, and employing a distributed protocol. These methods are examples and not exclusive and are available in the art as software and/or hardware subroutines.

Secure logic integration is achieves by a mechanism in which the single logic program (in one of many forms 1211, 1221,1231,1241) can now perform in one location (e.g., a TFG 110TFG) as a hidden program portion 414, and signal the security tag (with various fields as in 711,712,713,714). Due to the uniqueness of the module and the fact that the input logic modules are now interlocked and are executed all together, we are assured that the functionality of the separate logic modules is faithfully executed when the signal is correctly generated. When the security tags are attached to a stream of packets as in 111, they can be checked at another location, e.g., the TTC 120TFG. The checking 910 assures the origin of the security tags and thus the stream of packets. The TFG controller 1010 uses the unique logic module and so also uses the pseudo-random tag generator 1020, whereas the TTC controller 1110 employs the pseudo-random tag generator 1120 to check the tag by comparison.

In the preferred embodiment the system for secure integration is run, where one of the software logic modules provides logic to construct data packets. In fact, such logic modules can be any type of networking software and a combination of networking modules and can be integrated as well. The notion of data packet is general, e.g., we can execute the system for providing logic integration, wherein logic to construct data packets computes at least one of: an IP data packet, a TCP/IP data packet, a UDP data packet, an ATM data packet, a MPLS data packet, a TCP SYN signal, a PING signal, a ICMP signal, an IPv4, an IPv6, a FC frame, a cable modem frame, an Ethernet frame, and a data packet segmentation.

The system for secure logic integration provides a single logic module that hides certain rules of execution, thus the mechanism assures to interlock the signal generation of security tags and the rules of execution. In particular the system is run wherein one of the software logic modules provides rules of transmission. These rules are part of a computation and the system is run, wherein the rules of transmission compute at least one of: performance characteristics, access characteristics, transmission limitations, transmission rates, window sizes, port numbers, IP addresses, network addresses, quotas, renewable quotas, packet structure limitations, schedule. A combination of rules may be used to assure that a number of execution rules are being followed for various transmissions and various operations.

The system of secure integration of separate logic modules can integrate rules, wherein at least one of the rules of transmission determines a renewable precondition for transmission. This will enforce the TFG controller 1010 to request and receive renewable codes and parameters 1041 from a TFG renewable controller 1040 when the single module will be executed in the TFG controller. The system of secure integration can be run wherein the renewable precondition for transmission is least one of: a renewable transmission quota of trusted data packets, a number of trusted data packets that can be transmitted per unit of time, a time signal, a UTC time signal, a digitally signed time signal, digital cash for transmission of trusted data packets, and cryptographic keys for marking trusted data packets. These quota-oriented methods and cryptographic refresh parameter methods are known in the art; however, logic needs to be integrated for recognizing renewable condition and activation of renewable codes and parameter receipt process when precondition for transmission is not valid. The system can be constructed wherein the renewable precondition for transmission is obtained from at least one of: a predefined logic, an external rule controller, a security management system, a network interface, a network appliance, a server, a network management system, a firewall, a local computation, a smart card device, and a portable device. These are examples of locations and operations of the TFG renewable controller 1040.

The system for secure integration can get as input where combinations of individual software modules are provided as input. A first example is where it can be run wherein one of the software logic modules provides a cryptographic function for producing a pseudo-random sequence of security tags; and wherein one of the software logic modules provides logic to construct data packets. A second example is the system wherein one of the software logic modules provides a cryptographic function for producing a pseudo-random sequence of security tags; and wherein one of the software logic modules provides rules of transmission. A third example is the system 1 wherein one of the software logic modules provides a cryptographic function for producing a pseudo-random sequence of security tags; wherein one of the software logic modules provides logic to construct data packets; and wherein one of the software logic modules provides rules of transmission.

FIG. 14 illustrates an embodiment in which the plain program components to be integrated comprise a well-behaved operational program (e.g., a TCP program in the context of the Internet protocol) that has defined rules of transmissions (e.g., a window size). A second component is a cryptographic program for security tag generation. A third component is a parameter table (e.g., with the seed for a pseudo-random generator). A fourth component is a control program for adding rules to the integrated task (e.g., automatic refresh parameters for the renewable rules).

To achieve a large set of hidden programs we need the system of secure integration of software modules, further comprising: a source of interlocking parameters 1211; and wherein the transformation controller is further comprised of means for combining the software logic modules according to defined interlocking logic responsive to the interlocking parameters. The source of interlocking parameters is generated by a random source, cryptographic keys, or a defined table and location in memory. Someone who is familiar with the art can employ other methods that allow the logic to choose from a large set of options and can employ cryptographic means and decision tree logic for activating transformations in a random and unknown fashion.

A system is provided wherein the transformation controller (1210,1220,1230,1240) determines an intermixture of the subtask functions of the plurality of software logic modules into a single program in order to provide the combined functionality. Further, intermixture of subtask functions can be provided in a defined plurality of different ways; and wherein each of the different ways provides a different one of the single program providing the combined functionality.

The resulting intermixture of subtask functions is further comprised of at least one of: obfuscation, encryption, replication, adding dummy code, addition of redundant control, renaming of variables, splitting a procedure into multiple sub-procedure, dictionary transformation, compilation, interpretation, cryptographic transformation, digital signing, and scrambling. Transformations in the art for may change the representation of the logic and its way of execution, but they do not change the meaning and results of the logic.

In an alternate embodiment, replication is comprised of repetitions of the software logic modules into an oversize program comprising the single program embedded therein, wherein each repetition is made active separately to define an active single program within the oversize program, which acts as the single program.

There are many situations for which the transformation controller of the system for secure integration further generates external software modules for linked operation with the single program required for the required combined function, e.g., the resulting single program (in the TFG 110TFG) may be required to consult with another subsystem (the TTC 120TTC) where the external software modules reside and operate.

The system for secure integration of software modules which also generates external logic modules can be run where it is further comprised of means for transmitting the external software modules to separate computing subsystems; and wherein the external software modules are executed in the separate computing subsystems to provide at least one of: update information and renewable information coupled to the single logic program.

The system can be executed wherein means for transmitting further involve at least one of: encryption, authentication, and digital signing. It can be run wherein the update information is at least one of: change data, change executable code, change pattern, change order and pseudo-change of dummy code.

The system can be run, wherein the renewable information is at least one of: renewable transmission quota of trusted data packets, number of trusted data packets that can be transmitted per unit of time, time signal, UTC time signal, digitally signed time signal, digital cash for transmission of trusted data packets, and cryptographic keys for marking trusted data packets.

Note that the system of secure integration can further comprise means for transmitting the single logic program to a primary computing system. The system can be run wherein means for transmitting further involve at least one of: encryption, authentication, and digital signing.

In particular, the system can be combined wherein there is security verification information generated by the transformation controller; for utilization by a separate security tag verification logic in a separate communications subsystem which validates the security tag.

An operation by the resulting single program and resulting external software modules is demonstrated in FIG. 13, wherein the single program exemplified by a distributed execution of first hidden program 1310 is required to call 1311, 1313 and get returns 1312, 1314 when executed. The external software modules of codes 1340 and parameters 1350 are responsible for the returns. This distributed execution is activated on a data packet with empty generic parameters 1301. To demonstrate that a single program operation can be repeated in many places and by various software components in the computing subsystem we can view the continuation of the execution in 1310 that continues with 1330, but on the output of 1310—a data packet with first generic parameters 1302. The operation is a second single program represented by a distributed execution of second hidden program 1330 with calls 1331, 1333, and returns 1332,1334 from a second code 1360 and second parameters 1370 in a second external software module.

The system of secure integration of separate logic modules can have one of the software logic modules provide security services. There are many examples of such services. The services can combine users and programs in a secure way and integrate them into the operational modules—generating a security tag based on them, and generating it on the operational level without the need for extra operations from the user or the program. In fact, the system can have the security services include means for at least one of: user authentication, user sign-on, data packet authentication, user login, applying user's cryptographic keys, applying organization's cryptographic keys, and digital signing. It can have security services further provide means for applying cryptographic transformations based on keys belonging to a primary computing system. The primary computing system can be the one that includes means for execution of single logic program.

The above in effect embeds security services automatically into the operational level. The services can authenticate elements and embed the authentication information in the security tags. This will result in a virtual private network implemented in the operational level of packet handling and rules of transmission.

The system can have one of the software logic modules provide for a cryptographic function for producing pseudo-random sequence of security tags, and further comprising means for providing one of the software logic modules to a secondary computing subsystem.

The generation of the hidden program single module and the external modules and the distribution are all part of the transformation controller and constitute together with the logic component for transformations, cryptography and transmission: the system enabling a single logic module that has a combined functionality.

Figure 16:
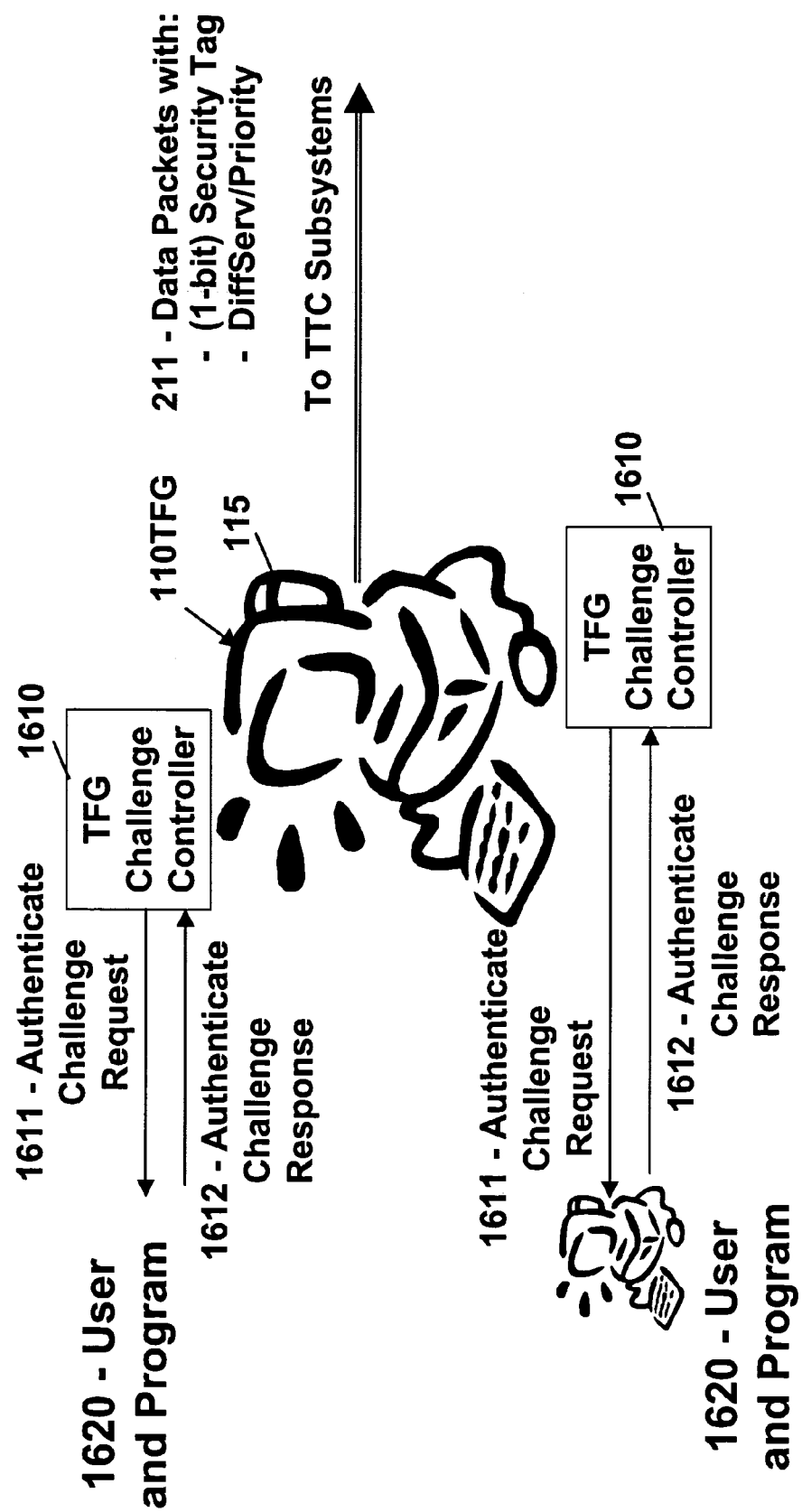
FIG. 16 is a functional description of system that consists of a TFG challenge controller that sends an authenticate challenge request message to users and programs and receives back an authenticate challenge response message, wherein only when the response matches the challenge the system will generate and send data packets with security tag vectors.

The Authenticate Challenge Request and Response Operation:

FIG. 16 is a functional descriptive diagram of a system that consists of a TFG challenge controller that sends authenticate challenge request messages to users and programs and receives back an authenticate challenge response messages; the system will generate and send data packets with security tag vectors only when the response matches the challenge.

The secured network management system in FIG. 16 manages the communications of data packets. The system comprises: a plurality of trusted flow generator (TFG) subsystems; a plurality of trusted tag checker (TTC) subsystems; and a plurality of secure management server (SMS) subsystems.

Said system, wherein each of the TFG subsystems sends and receives messages and selectively generates a security tag vectors 711, is responsive to compliance logic for association with each respective one of the data packets.

The system in FIG. 16 includes a communications network for coupling the data packets, the plurality of TFG subsystems, and the plurality of TTC subsystems; and wherein each of the TFG subsystems 110TFG is comprised of logic comprised of: packet processing, rules of transmission and security tag vector 711 generation, wherein the TFG subsystem further comprising a TFG challenge controller 1610.

The TFG challenge controller 1610 further comprises a communication subsystem for interaction with users and programs that produce inputs for packet processing. The communication subsystem sends a challenge message 1611 to users and programs that produce inputs for packet processing.

The challenge message 1611 comprises at least one of: a cryptographic field, an encryption field, a clear text field, a request for users to perform a task using a keyboard, a request for users to perform a task using a mouse, a request for users to perform a task using a biometrics reader, a request for users to perform a task using a terminal input function: e.g., requesting an answer to a verbal question, requesting an answer to an audiovisual question, requesting an answer to a previously stored data item, requesting an answer related to published information within the user and the program computing subsystems, requesting payment, requesting digital form of payment, requesting a credit card number, requesting information retrievable from a smart card, requesting information retrievable from a portable device, an activation of a sensor enabling the receipt of sensory information, and requesting information based on means of computing received from the SMS subsystem.

The TFG challenge controller 1610 receives a response message 1612 from users and programs that produce input for packet processing. The response message 1612 comprises at least one of: e.g., a cryptographic field, an encryption field, a clear text field, a response to a request for users to perform a task using a keyboard, a response to a request for users to perform a task using a mouse, a response to a request for users to perform a task using a biometrics reader, a response to a request for users to perform a task using a terminal input function, a response to a message requesting an answer to a verbal question, a response to a message requesting an answer to an audiovisual question, a response to a message requesting an answer to a previously stored data item, a response to a message requesting an answer related to published information within the user and the program computing subsystems, a response with payment, a response with a digital form of payment, a response with a credit card number, a response with information retrievable from a smart card, a response with information retrievable from a portable device, a response with a signal, a response with a radio signal, a response with a wireless signal, a response with an RF information, a response with an IR information, response with sensory information, response with audio information, response with olfactory information, and an answer to a message requesting information based on means of computing received from the SMS subsystem.

In FIG. 16, the TFG challenge controller 1610 allows user and program input to be used in packet processing responsive to a response message 1612 received from a user and a program. The TFG challenge controller 1610 does not allow user and program input for use in packet processing responsive to a failed response message 1612 received from user and program.

The TFG subsystem 110TFG selectively generates data packets with security tags responsive to the response messages 1612 that successfully answered the challenge request 1611. The TFG subsystem then sends the data packets with security tags 711 to the TTC subsystem 120TTC. The TTC subsystem, upon receiving the data packet from the TFG subsystem, validates the data packet by analyzing the security tag 711.

The TTC subsystem further comprises means for mapping the data packet with security tags 711 to a first communications class of service responsive to the validating the data packet and verifying the respective security tag 711; and means for mapping the data packet to a second communications class of service responsive to the validating the data packet with security tags resulting in failed verifying of the security tag 711. Then the TTC subsystem is couples the data packets of the first communications class of service for further communication therefrom. The TTC subsystem denies further communications therefrom of the data packets of the second communications class of service. The TTC subsystem stores the second communications class of service in local storage without further transmission. In another embodiment of the present invention, the TTC subsystem sends the data packet of the second communications class of service at a lower priority level than the data packets of the first communications class of service.

The IP Virtual Private Network Functional Operation:

FIG. 17 is a functional descriptive diagram of a system that generates and sends data packets with security tag vectors 711 over IP (Internet protocol) VPN (virtual private network) connection 1710 through a network interface, e.g., firewall, classifier, and policer, while mapping data packets with verified security tag vectors 111 to premium service. Consequently, the data packets that were generated and sent from an untrusted computing environment at the end station, are to be trusted, once the respective security tag vectors 711 have been verified.

The VPN connection 1710 is created by using a trusted flow generator (TFG) 110TFG and a trusted tag checker 120TTC—respectively shown in the details of FIG. 8, FIG. 9, FIG. 10 and FIG. 11.

The Content Protection Operation in Remote Hostile Environment: FIG. 18 to FIG. 28

Another embodiment of the disclosed invention involves Digital Right Management (DRM)—or Content Management (CM). DRM is a set of technologies that content owners can use in order to protect their copyrights while providing content to customers. In most cases, DRM/CM is a system that encrypts digital media content and limits access to only those people who have acquired a proper license/permission to play/use the content.

Several circumstances can, in principal, lead to the compromise of the DRM/CM system or of a protected video/audio/e-book content, even though they are not attacks in the classical sense, e.g.:

A cryptographic algorithm or protocol is discovered to be not secure. This is very unlikely if standard, field-tested cryptographic algorithms and protocols are used.

An attack against the fingerprinting algorithm is discovered. The system anticipates this possibility by allowing easy field upgrades of the fingerprinting components.

Social engineering: The content is stolen outside the content protection system (e.g., in the producing studio). This type of attack does not affect the digital cinema system and has to be addressed by other means.

A flaw in the production of a certain projector model makes it possible to compromise any projector of the given model without substantial hardware tampering. All affected projectors have to be revoked.

Figure 18:
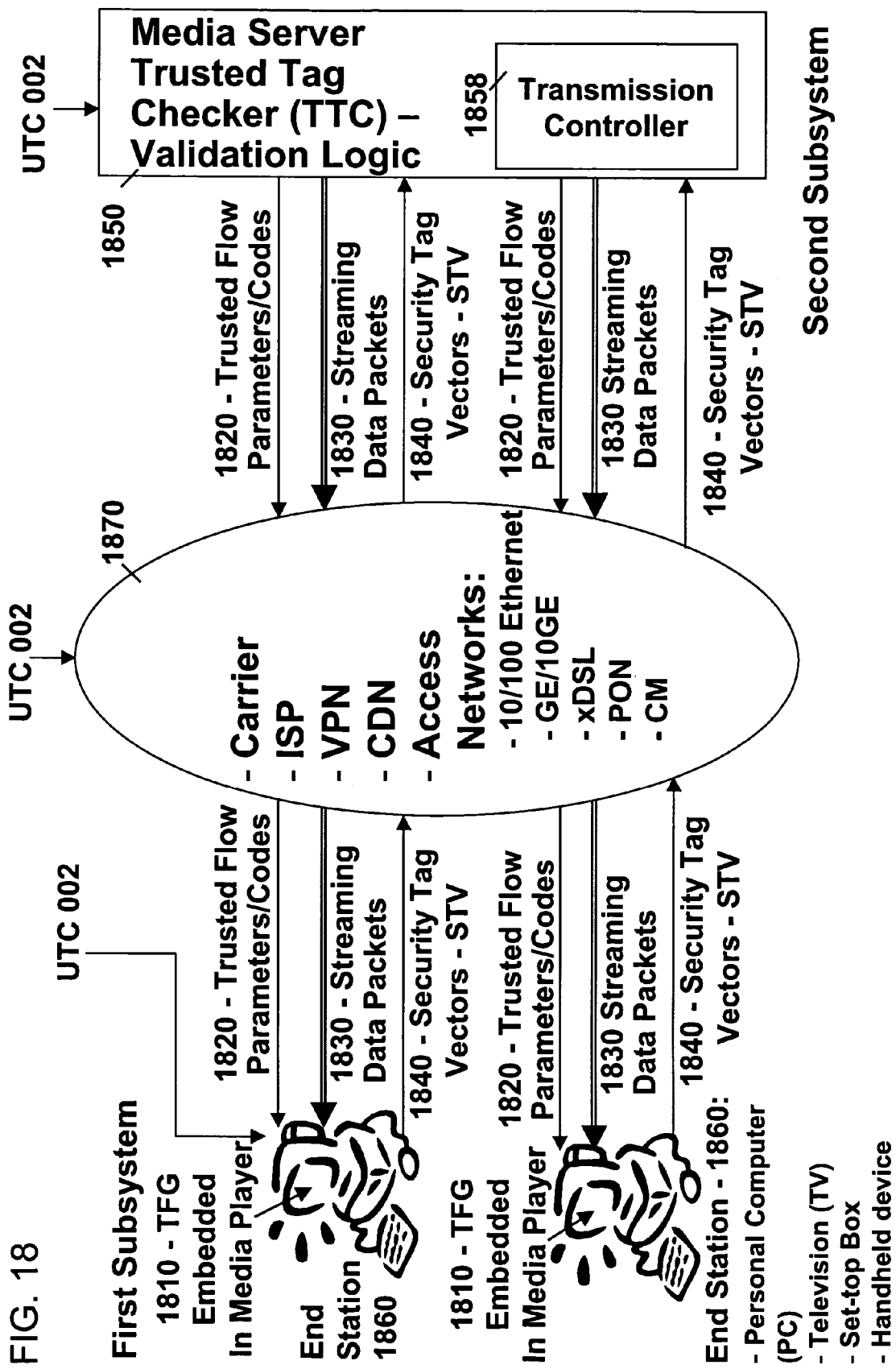
FIG. 18 is a functional description of a system for the communication of a stream of data packets generated and sent by a second subsystem, e.g. a media server conditioned to receiving a flow of valid security tag vectors generated by a first subsystem, e.g., a media player that is the intended destination for the data packets, wherein the first subsystem comprises a tag flow generator (TFG) module for generating the flow of security tag vectors responsive to Trusted Flow Parameters/Codes received from the second subsystem that comprises a Trusted Tag Checker (TTC) module for verifying the validity of the received flow of security tag vectors.

FIG. 18 is a functional description of a system for the communication of streaming data packets 1830 received by a first subsystem 1860 that processes the data packets according to defined rules. The first subsystem comprises a first processing subsystem providing first logic for processing data packets that is tightly coupled via interlocking mechanisms to a trusted flow generator (TFG) 1810. The TFG 1810 generates a flow of security tag vectors (STVs) 1840 responsive to received Trusted Flow Parameters/Codes 1820.

The system in FIG. 18 further comprises a second subsystem 1850 comprising a second processing subsystem for generating and sending the streaming data packets 1830 to at least one of the first subsystems 1860. The second subsystem 1850 further comprises a transmission controller 1858 for regulating the transmission of the streaming data packets 1830 responsive to receiving a flow of valid STVs 1840 relative to the corresponding Trusted Flow Parameters/Codes

1820. The second subsystem 1850 comprises a Trusted Tag Checker (TTC) that encompasses the logic for validating the received flow of STVs 1840 responsive to a defined validation logic and for stopping the transmission of the streaming data packets 1830 by the second processing subsystem. A network 1870 is coupled with the first subsystem 1860 and the second subsystem 1850 for enabling the transfer of the Trusted Flow Parameters/Codes 1820 and the streaming data packets 1830 from the second subsystem 1850 to at least one of a plurality of first subsystems 1860 and the transfer of the STVs 1840 from at least one of a plurality of first subsystems 1860 to the second subsystem 1850.

In another embodiment, the first processing subsystem is a media player and the second processing subsystem is a media server and the communication system supports the management of digital rights. In another embodiment, the first subsystem 1860 or end station is at least one of, but not limited to, a personal computer (PC), a television set (TV), a set-top box, and a handheld device. In another embodiment, the network 1870 is at least one of: a carrier network, an Internet Service Provider (ISP) network, a Virtual Private Network (VPN), a Content Delivery Network (CDN), a leased line, and an access network; wherein the access network is implemented using at least one of Ethernet (at 10 Mb/s), FastEthernet (at 100 Mb/s), Gigabit Ethernet (at 1 Gb/s), 10 Gigabit Ethernet (at 10 Gb/s), xDSL (digital subscriber line), Passive Optical Network (PON), and a Cable modem (CM).

In another embodiment, the second subsystem 1850 transmits the Trusted Flow Parameters/Codes 1820 when the communication with a new end station 1860 begins. In another embodiment, the second subsystem 1850 transmits the Trusted Flow Parameters/Codes 1820 when the communication with a new first processing subsystem with an end station 1860 begins. In another embodiment, the second subsystem 1850 transmits the Trusted Flow Parameters/Codes 1820 periodically throughout the communication with a first processing subsystem within an end station 1860. In another embodiment the network operates responsive to an external common time reference, e.g., the Coordinated Universal Time (UTC) 002. In another embodiment, the operation of at least one of the first subsystem 1860, the first processing subsystem, the TFG 1810, the second subsystem 1850, the second processing subsystem, the transmission controller 1958, and the TTC is responsive to an external common time reference, e.g., the Coordinated Universal Time (UTC) 002.

The transmission controller 1858 in the second subsystem 1850 regulates the transmission of streaming data packets 1830 responsive to the security tag vectors (STVs) 1840 received from the first subsystem 1860. The operation of the transmission controller 1858 is described by the flow chart depicted in FIG. 20. After having performed the necessary protocol initialization steps 2010, which include the transmission of an initial set of Trusted Flow Parameters/Codes 1820, the transmission controller 1858 activates 2020 the streaming of data packets 1830. A first timer regulates the periodic transmission of Trusted Flow Parameters/Codes 1820: whenever the first timer expires 2030, a new set of Trusted Flow Parameters/Codes 1820 is generated and sent out 2035 and the first time is reset 2038.

The transmission controller 1858 constantly checks whether security tag vectors (STVs) 1840 are being received 2040 from the end station 1860 to which the streaming data packets 1830 are being sent 2020. A second timer measures the time left for a new STV to arrive. As long as the second timer has not expired 2060-N the transmission of streaming data packets 1830 is continued 2020. However, if the second timer expires 2060-Y, the streaming of data packets 1830 is stopped 2070.

Whenever an STV 1840 is received 2040-Y, the STV 1840 is verified 2050 by the Trusted Tag Checker (TTC) embedded in the second subsystem 1850. If the STV 1840 is valid 2050-Y, the second timer is reset 2080 and the streaming of data packets 1830 continued 2020. Otherwise 2050-N, the streaming of data packets 1830 is stopped 2070.

Figure 21:
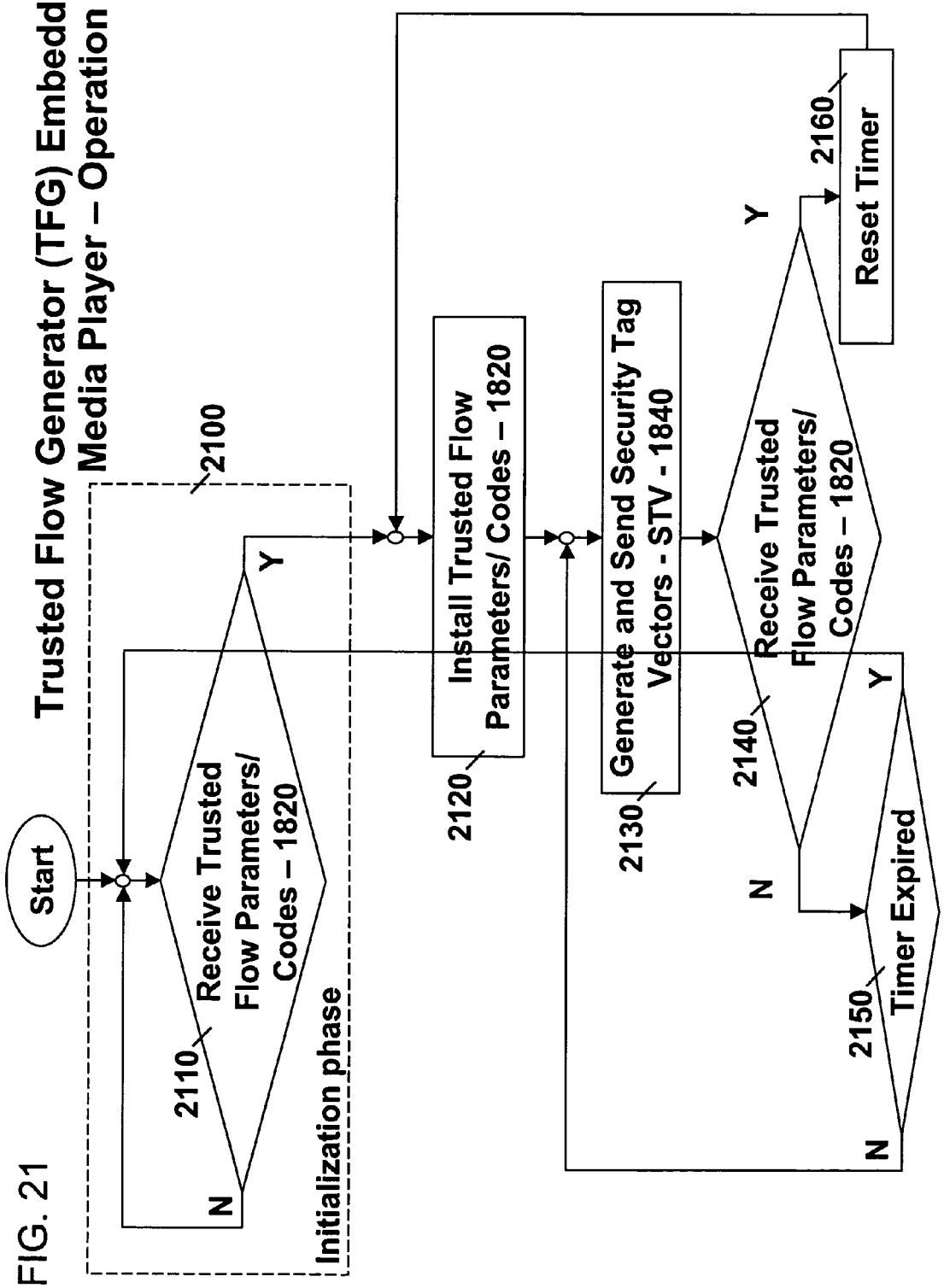
FIG. 21 is a flow chart providing a schematic description of a Trusted Flow Generator (TFG) embedded in a subsystem, e.g., a media player that generates and delivers a valid flow of security tag vectors (STVs) responsive to received Trusted Flow Parameters/Codes.
Figure 22:
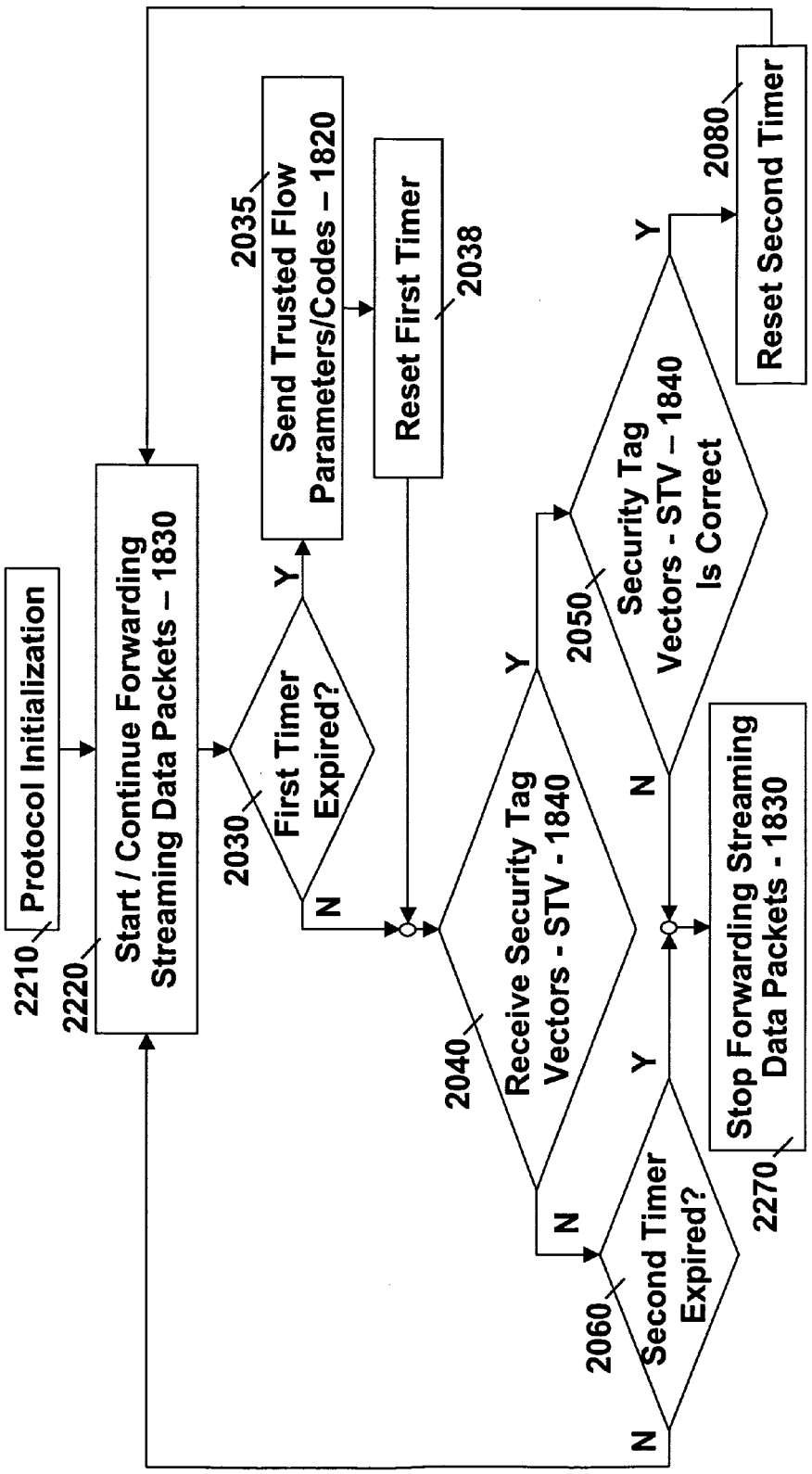
FIG. 22 is a flow chart providing a schematic description of the operation of a controller within a subsystem conditionally forwarding a stream of data packets, e.g., a network interface comprising a Trusted Tag Checker (TTC), regulating the forwarding of the data packet stream provided that a Trusted Tag Checker (TTC) successfully receives and verifies a flow of security tag vectors (STVs).

The Trusted Flow Generator (TFG) 1810 embedded in the first subsystem 1860 that receives the streaming data packets 1830 operates as described by the flow chart in FIG. 21. The TFG 1810 operation begins with an initialization phase 2100 that is aimed at receiving a starting set of Trusted Flow Parameters/Codes 1820. Once the set of Trusted Flow Parameters/Codes 1820 is received 2110-Y, the Trusted Flow Parameters/Codes 1820 are installed 2120 for being subsequently used for the generation of valid STVs 1840 that are sent out 2130 to the TTC embedded in the second subsystem 1850 that is generating the streaming data packets 1830.

The TFG 1810 continuously checks whether a new set of Trusted Flow Parameters/Codes 1820 have been received 2140. A timer measures the time left for a new set of Trusted Flow Parameters/Codes 1820 to arrive. As long as the timer has not expired 2150-N, the TFG continues to generate and send out 2130 STVs 1840 responsive to the currently installed Trusted Flow Parameters/Codes 1820. However, if the timer expires 2050-Y, the TFG re-enters the initialization phase 2100.

Whenever a new set of Trusted Flow Parameters/Codes 1820 is received 2140-Y, it is installed 2120 and used for generating STVs 1840.

Figure 24:
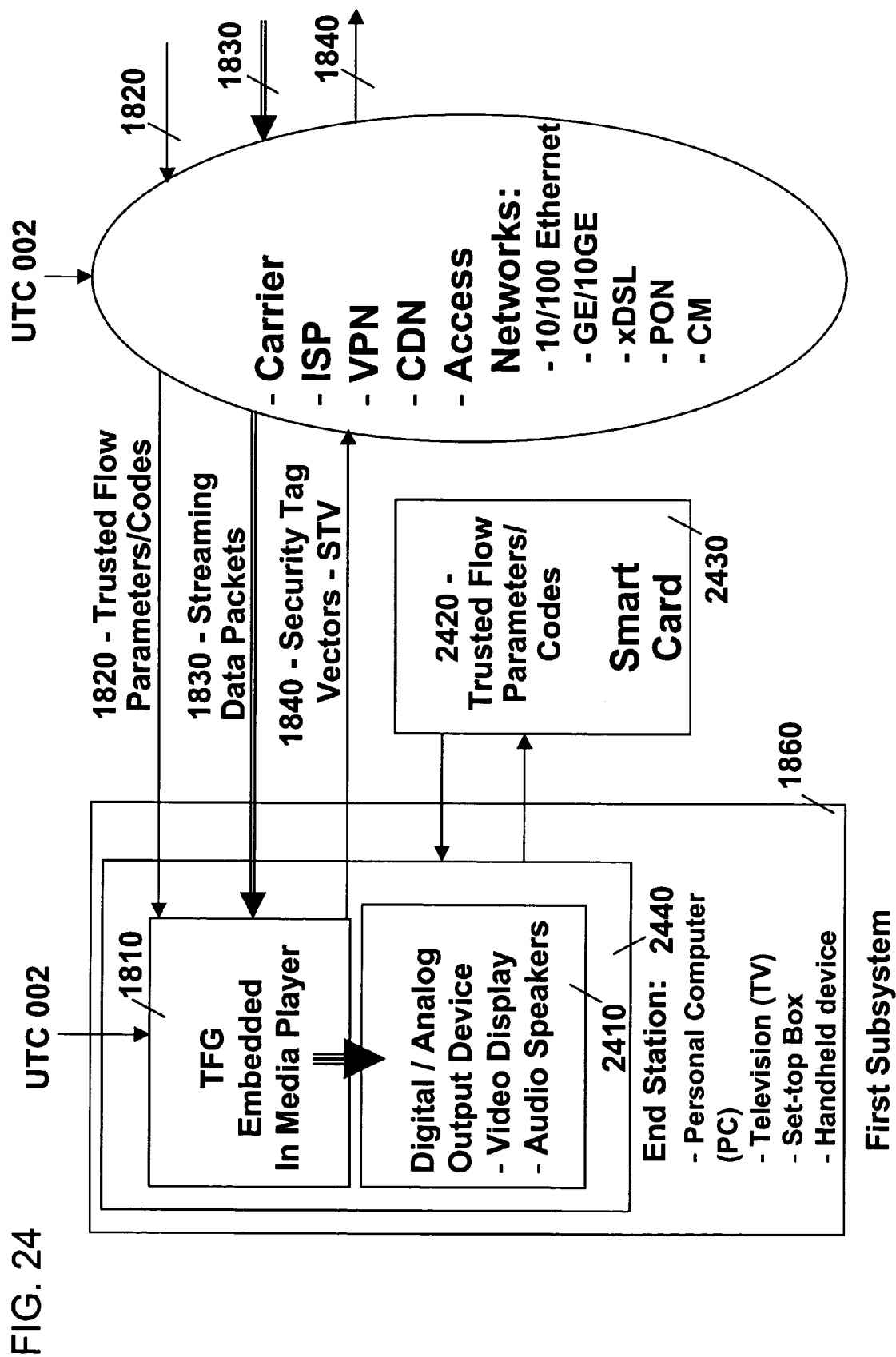
FIG. 24 is a functional description of a first subsystem, e.g., a media player, for receiving a stream of data packets generated and sent by a second subsystem, e.g., a media server (not shown in the figure), conditioned to receiving a flow of valid security tag vectors generated by the first subsystem, wherein the first subsystem comprises a tag flow generator (TFG) module for generating the flow of security tag vectors responsive to Trusted Flow Parameters/Codes received from the second subsystem and to Trusted Flow Parameters/Codes stored within a smart card coupled with the first subsystem, wherein the first subsystem comprises at least one digital or analog output device, e.g., as a video display or an audio speaker that is tightly coupled with the embedded TFG through an interlocking mechanism such that the TFG can properly generate the flow of security tag vectors only if the analog or digital output device is under full control.

FIG. 24 is a functional descriptive diagram of another embodiment of the first subsystem 1860 that is coupled with a smart card 2430 for storing and providing upon request Trusted Flow Parameters/Codes 2420, to be used together with the Trusted Flow Parameters/Codes 1810 received from the second subsystem 1850 (not explicitly shown in FIG. 24), by the TFG 1810 embedded in the first processing subsystem 2440 for generating a flow valid STVs. Furthermore, in the embodiment shown in FIG. 24, at least one digital or analog output device 2410, e.g., at least one of a video display and audio speakers, is within the first processing subsystem 2410 and tightly coupled by means of an interlocking mechanism to the TFG 1810. The interlocking mechanism ensures that the TFG 1810 can operate properly, e.g., generate valid STVs, only if the digital/analog output device 2410 operates properly. Consequently, if the digital/analog output device 2410 does not operate according to a defined behavior, the TFG will not be able to generate a flow of valid STVs, and the second subsystem 1850 will stop sending the streaming data packets 1830.

Figure 19:
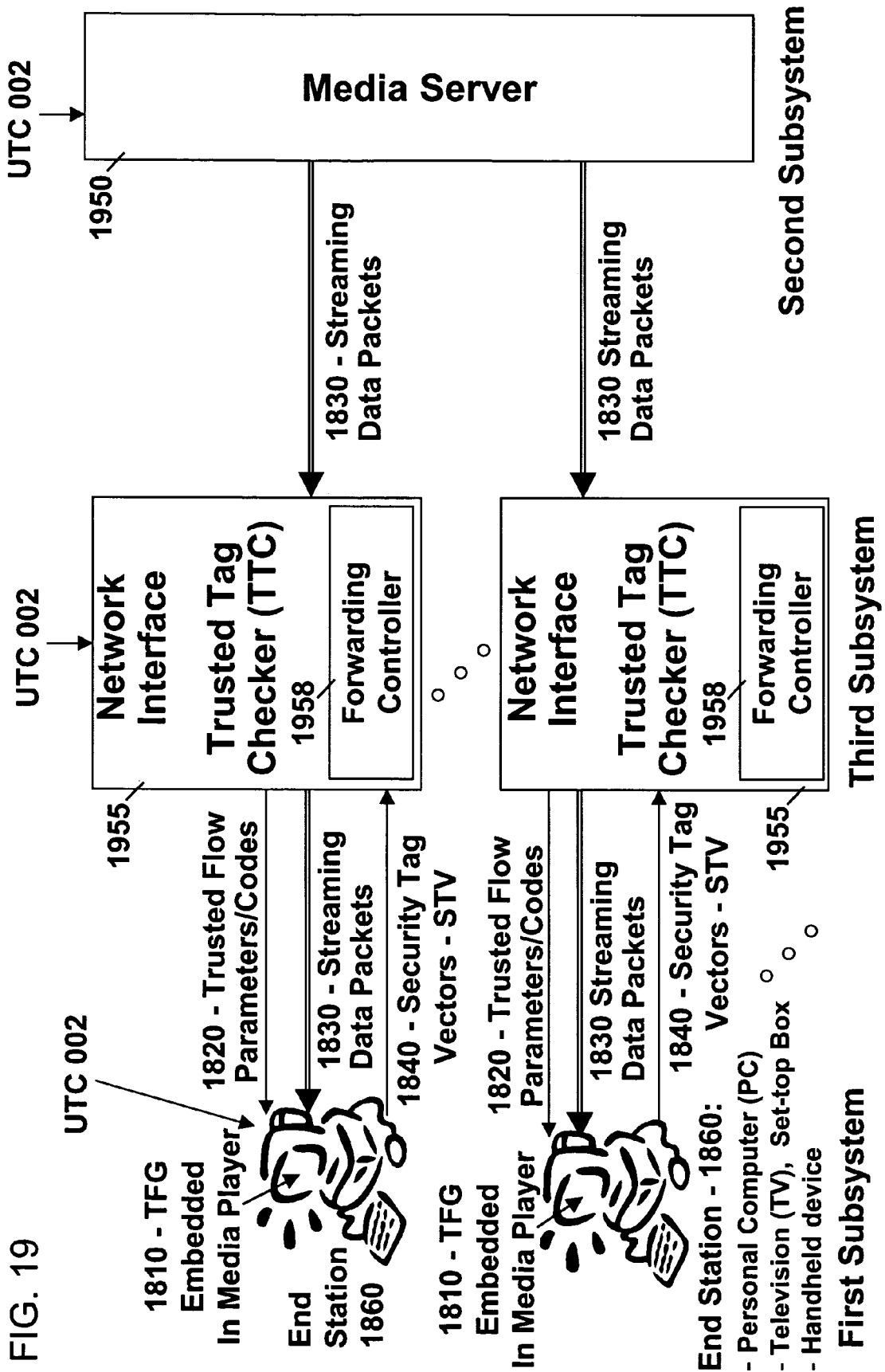
FIG. 19 is a functional description of a system for the communication of a stream of data packets generated and sent by a second subsystem, e.g., a media server, and forwarded by a third subsystem, e.g. a network interface, conditioned to receiving a flow of valid security tag vectors generated by a first subsystem, e.g., as a media player that is the intended destination for the data packets, wherein the third subsystem comprises a tag flow generator (TFG) module for generating the flow of security tag vectors responsive to Trusted Flow Parameters/Codes received from the third system that comprises a Trusted Tag Checker (TTC) module for verifying the validity of the received flow of security tag vectors.
Figure 20:
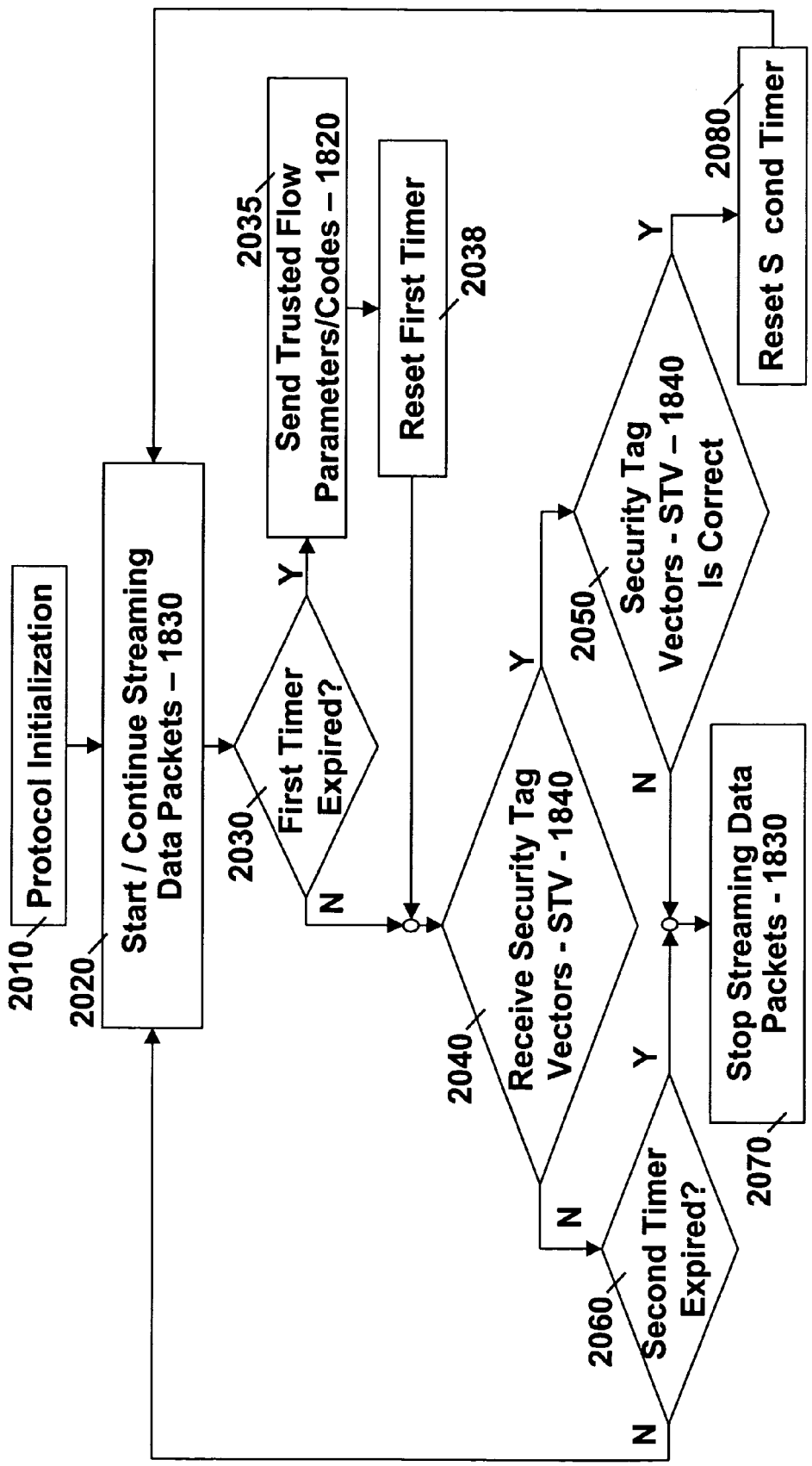
FIG. 20 is a flow chart providing a schematic description of the operation of a controller within a subsystem conditionally generating a stream of data packets, e.g., a media server comprising a Trusted Tag Checker (TTC), regulating the streaming of data packets provided that a Trusted Tag Checker (TTC) successfully receives and verifies a flow of security tag vectors (STVs).

FIG. 19 is a functional descriptive diagram of a system for the communication of streaming data packets 1830 received by a first subsystem 1860 that processes the data packets according to defined rules. The first subsystem comprises a first processing subsystem providing first logic for processing data packets that is tightly coupled through an interlocking mechanism to a trusted flow generator (TFG) 1810. The TFG 1810 generates a flow of security tag vectors (STVs) 1840 responsive to received Trusted Flow Parameters/Codes 1820.

The system in FIG. 19 further comprises a second subsystem 1950 comprising a second processing subsystem for generating and sending the streaming data packets 1830 to at least one of the first subsystems 1860.

The system in FIG. 19 further comprises a third subsystem 1955 for forwarding the streaming data packets 1830. The third subsystem 1955 further comprises a forwarding controller 1958 for regulating the forwarding of the streaming data packets 1830 responsive to receiving a flow of valid STVs 1840 relative to the corresponding Trusted Flow Parameters/Codes 1820. The third subsystem 1950 comprises a Trusted Tag Checker (TTC) that encompasses the logic for validating the received flow of STVs 1840 responsive to a defined validation logic and for stopping the forwarding of the streaming data packets 1830 generated by the second processing subsystem.

A network—not explicitly shown in FIG. 19—is coupled with the first subsystem 1860 and the third subsystem 1955 for enabling the transfer of the Trusted Flow Parameters/Codes 1820 and the streaming data packets 1830 generated by the second subsystem 1950 from the third subsystem 1955 to at least one of a plurality of first subsystems 1860 and the transfer of the STVs 1840 from at least one of a plurality of first subsystems 1860 to the third subsystem 1955. A network—not explicitly shown in FIG. 19—is coupled with the second subsystem 1950 and the third subsystem 1955 for enabling the transfer of the streaming data packets 1830 generated from the second subsystem 1950 to at least one of a plurality of third subsystems 1955 for being forwarded to at least one of a plurality of first subsystems 1860.

In another embodiment, the first processing subsystem is a media player and the second processing subsystem is a media server and the communication system supports the management of digital rights. In another embodiment, the first subsystem 1860 or end station is at least one of, but not limited to, a personal computer (PC), a television set (TV), a set-top box, and a handheld device. In another embodiment, the network—not explicitly shown in FIG. 19—is at least one of a carrier network, an Internet Service Provider (ISP) network, a Virtual Private Network (VPN), a Content Delivery Network (CDN), a leased line, an access network, wherein the access network is implemented using at least one of Ethernet (at 10 Mb/s), FastEthernet (at 100 Mb/s), Gigabit Ethernet (at 1 Gb/s), 10 Gigabit Ethernet (at 10 Gb/s), xDSL (digital subscriber line), Passive Optical Network (PON), Cable modem (CM). In another embodiment, the third subsystem 1955 is at least one of a network interface, a network appliance, an access device, a router, a firewall, a content delivery router, a proxy server.

In another embodiment, the third subsystem 1955 transmits the Trusted Flow Parameters/Codes 1820 when the communication with a new end station 1860 begins. In another embodiment, the third subsystem 1955 transmits the Trusted Flow Parameters/Codes 1820 when the communication with a new first processing subsystem with an end station 1860 begins. In another embodiment, the third subsystem 1955 transmits the Trusted Flow Parameters/Codes 1820 periodically throughout the communication with a first processing subsystem within an end station 1860. In another embodiment, the network operates responsive to an external common time reference, e.g. the Coordinated Universal Time (UTC) 002. In another embodiment, the operation of at least one of the first subsystem 1860, the first processing subsystem, the TFG 1810, the second subsystem 1950, the second processing subsystem, the third subsystem 1955, the forwarding controller 1958, and the TTC is responsive to an external common time reference, e.g., the Coordinated Universal Time (UTC) 002.

The forwarding controller 1958 in the third subsystem 1955 regulates the forwarding of streaming data packets 1830 responsive to the security tag vectors (STVs) 1840 received from the first subsystem 1860. The operation of the forwarding controller 1958 is described by the flow chart depicted in FIG. 22. After having performed the necessary protocol initialization steps 2210, which include the transmission of an initial set of Trusted Flow Parameters/Codes 1820, the forwarding controller 1958 activates 2220 the forwarding of streaming data packets 1830. A first timer regulates the periodic transmission of Trusted Flow Parameters/Codes 1820: whenever the first timer expires 2030, a new set of Trusted Flow Parameters/Codes 1820 is generated and sent out 2035 and the first time is reset 2038.

The forwarding controller 1958 constantly checks whether security tag vectors (STVs) 1840 are being received 2040 from the end station 1860 to which the streaming data packets 1830 are being forwarded 2220. A second timer measures the time left for a new STV to arrive. As long as the second timer has not expired 2060-N, the forwarding of streaming data packets 1830 is continued 2220. However, if the second timer expires 2060-Y, the forwarding of streaming data packets 1830 is stopped 2270.

Whenever an STV 1840 is received 2040-Y, the STV 1840 is verified 2050 by the Trusted Tag Checker (TTC) embedded in the third subsystem 1955. If the STV 1840 is valid 2050-Y, the second timer is reset 2080 and the forwarding of streaming data packets 1830 continued 2220. Otherwise 2050-N, the streaming of data packets 1830 is stopped 2270.

Figure 23:
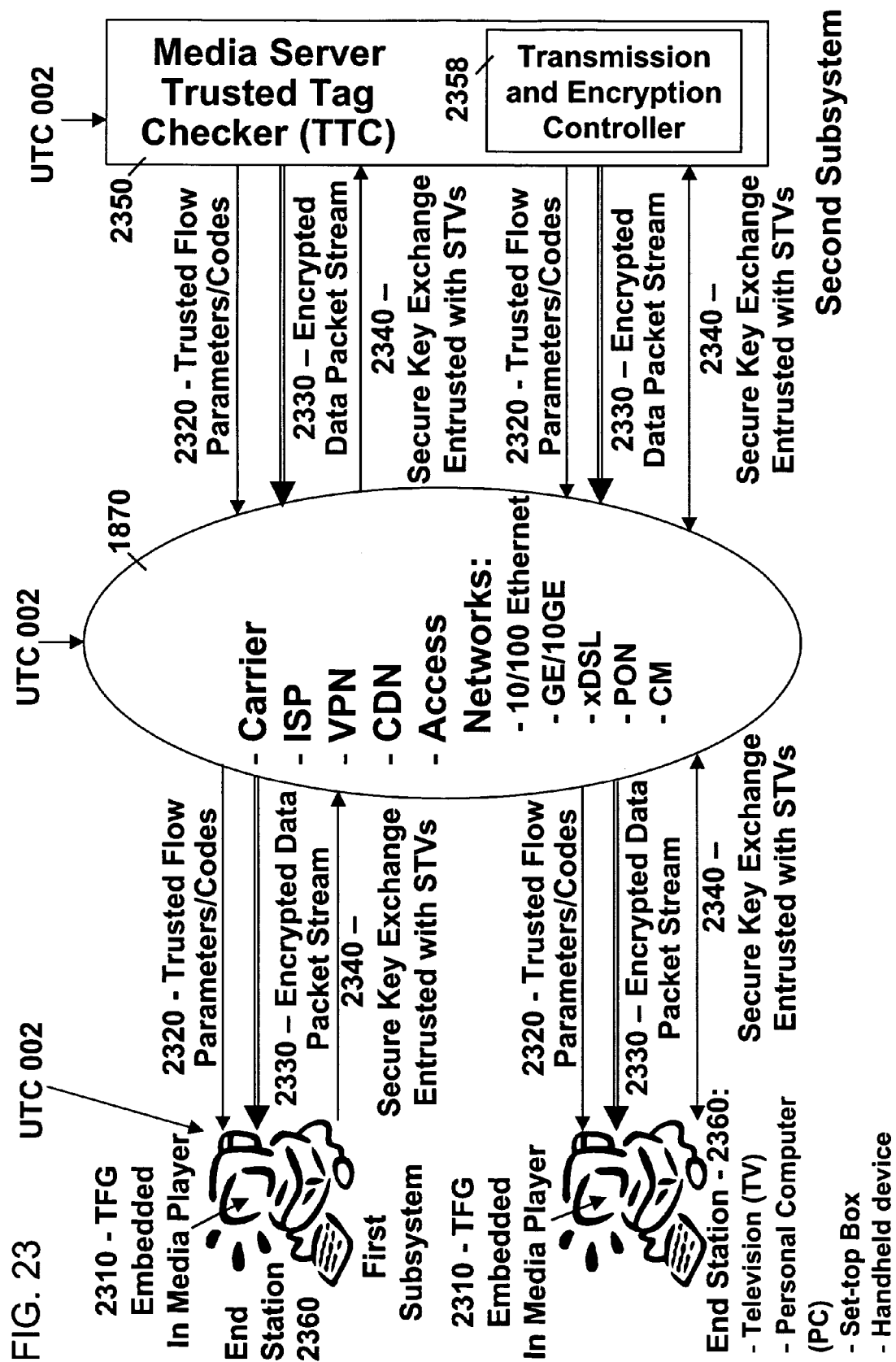
FIG. 23 is a functional description of a system for the communication of a stream of encrypted data packets generated, encrypted, and sent by a second subsystem, e.g., a media server, conditioned to successfully exchange at least one encryption key in a secure and trusted way with a first subsystem, e.g., a media player that is the intended destination for the secure data packets, wherein the secure key exchange is entrusted through valid security tag vectors, wherein the first subsystem comprises a tag flow generator (TFG) module for generating the security tag vectors responsive to Trusted Flow Parameters/Codes received from the second subsystem that comprises a Trusted Tag Checker (TTC) module for verifying the validity of the received security tag vectors.

FIG. 23 is a functional descriptive diagram of a system for the communication of an encrypted data packet stream 2330 received by a first subsystem 2360 that decrypts and processes the data packets according to defined rules. The first subsystem 2360 comprises a first processing subsystem providing first logic for decrypting and processing data packets that is tightly coupled through an interlocking mechanisms to a trusted flow generator (TFG) 2310. The TFG 2310 generates a flow of security tag vectors (STVs) responsive to received Trusted Flow Parameters/Codes 2320; the STVs are deployed for entrusting a secure key exchange 2340 needed for successfully decrypting the encrypted data packet stream 2330.

The system in FIG. 23 further comprises a second subsystem 2350 comprising a second processing subsystem for generating and sending the encrypted data packet stream 2330 to at least one of the first subsystems 2360. The second subsystem 2350 further comprises a transmission and encryption controller 2358 for regulating the transmission of the encrypted data packet stream 2330 conditioned to successfully completing a secure key exchange entrusted with STVs 2340. The second subsystem 2350 comprises a Trusted Tag Checker (TTC) that encompasses the logic for validating the STVs received by the second subsystem 2350 during the secure key exchange 2340 responsive to a defined validation logic and according to the corresponding Trusted Flow Parameters/Codes 2320. The transmission and encryption controller 2358 in the second subsystem 2350 encompasses the logic for stopping the transmission of the encrypted data packet stream 2330 if the secure key exchange 2340 fails or if the STVs coupled with the secure key exchange cannot be validated by the TTC. The validation of the STVs used during the secure key exchange 2340 ensures that only the first processing subsystem interlocked with the TFG that generated the STVs deployed during the secure key exchange 2340 will possess the key and hence will be able to decrypt the stream of data packets encrypted 2330 with the exchanged keys. The STVs are securely coupled with the packets transmitted during the secure key exchange 2340 by means of proper signing and authentication techniques. Applying proper encryption techniques secures the key exchange. The authentication, signing, and encryption techniques deployed are at least one of, but not limited to, IPsec, SSL, TLS, digital certificates, DES, 3-DES, and RSA.

A network 1870 is coupled with the first subsystem 2360 and the second subsystem 2350 for enabling the transfer of the Trusted Flow Parameters/Codes 2320 and the encrypted data packet stream 2330 from the second subsystem 2350 to at least one of a plurality of first subsystems 2360 and the transfer of data units needed to implement the secure key exchange entrusted with STVs 2340 between at least one of a plurality of first subsystems 2360 and the second subsystem 2350.

In another embodiment, the first processing subsystem is a media player and the second processing subsystem is a media server and the communication system supports the management of digital rights. In another embodiment the first subsystem 1860 or end station is at least one of, but not limited to, a personal computer (PC), a television set (TV), a set-top box, and a handheld device. In another embodiment, the network 1870 is at least one of a carrier network, an Internet Service Provider (ISP) network, a Virtual Private Network (VPN), a Content Delivery Network (CDN), a leased line, an access network, wherein the access network is implemented using at least one of Ethernet (at 10 Mb/s), FastEthernet (at 100 Mb/s), Gigabit Ethernet (at 1 Gb/s), 10 Gigabit Ethernet (at 10 Gb/s), xDSL (digital subscriber line), Passive Optical Network (PON), Cable modem (CM).

In another embodiment, the second subsystem 2350 transmits the Trusted Flow Parameters/Codes 2320 when the communication with a new end station 2360 begins. In another embodiment, the second subsystem 2350 transmits the Trusted Flow Parameters/Codes 2320 when the communication with a new first processing subsystem with an end station 2360 begins. In another embodiment, the second subsystem 2350 transmits the Trusted Flow Parameters/Codes 2320 periodically throughout the communication with a first processing subsystem within an end station 2360. In another embodiment, the network operates responsive to an external common time reference, e.g., the Coordinated Universal Time (UTC) 002. In another embodiment, the operation of at least one of the first subsystem 2360, the first processing subsystem, the TFG 2310, the second subsystem 2350, the second processing subsystem, the transmission and encryption controller 2358, and the TTC is responsive to an external common time reference, e.g. the Coordinated Universal Time (UTC) 002.

The transmission and encryption controller 2358 comprised in the second subsystem 2350 regulates the encryption and transmission of the encrypted data packet stream 2330 responsive to the successful completion of secure key exchanges entrusted with STVs 2340 with the first subsystem 2360. The operation of the transmission and encryption controller 2358 is described by the flow chart depicted in FIG. 26. After having performed the necessary protocol initialization steps 2700, which are described in FIG. 27, the transmission and encryption controller 2358 activates 2620 the encryption and streaming of encrypted data packets 2330.

A first timer regulates the periodic transmission of Trusted Flow Parameters/Codes 2320: whenever the first timer expires 2630, a new set of Trusted Flow Parameters/Codes 2320 is generated and sent out 2635 and the first time is reset 2638.

The transmission and encryption controller 2358 constantly checks 2610 whether at least one of a plurality of keys is received during a secure key exchange entrusted with STV 2340 with the end station 2360 to which the encrypted data packet stream 2330 is being sent 2620. A third timer is measuring the time left for a new key to arrive. As long as the third timer has not expired 2640-N, the encryption and streaming of encrypted data packets 2330 is continued 2620. However, if the third timer expires 2640-Y, the streaming of encrypted data packets 2330 is stopped 2680.

Whenever at least one of a set of keys is received 2610-Y, the STVs coupled to it are verified 2660 by the Trusted Tag Checker (TTC) embedded in the second subsystem 2650. If the STVs are valid 2660-Y, the third timer is reset 2670 and the successfully exchanged key(s) are installed 2650 for being used for encrypting data packets and the encryption and streaming of encrypted data packets 2330 is continued 2620. Otherwise 2660-N, the streaming of encrypted data packets 1830 is stopped 2680.

Figure 27:
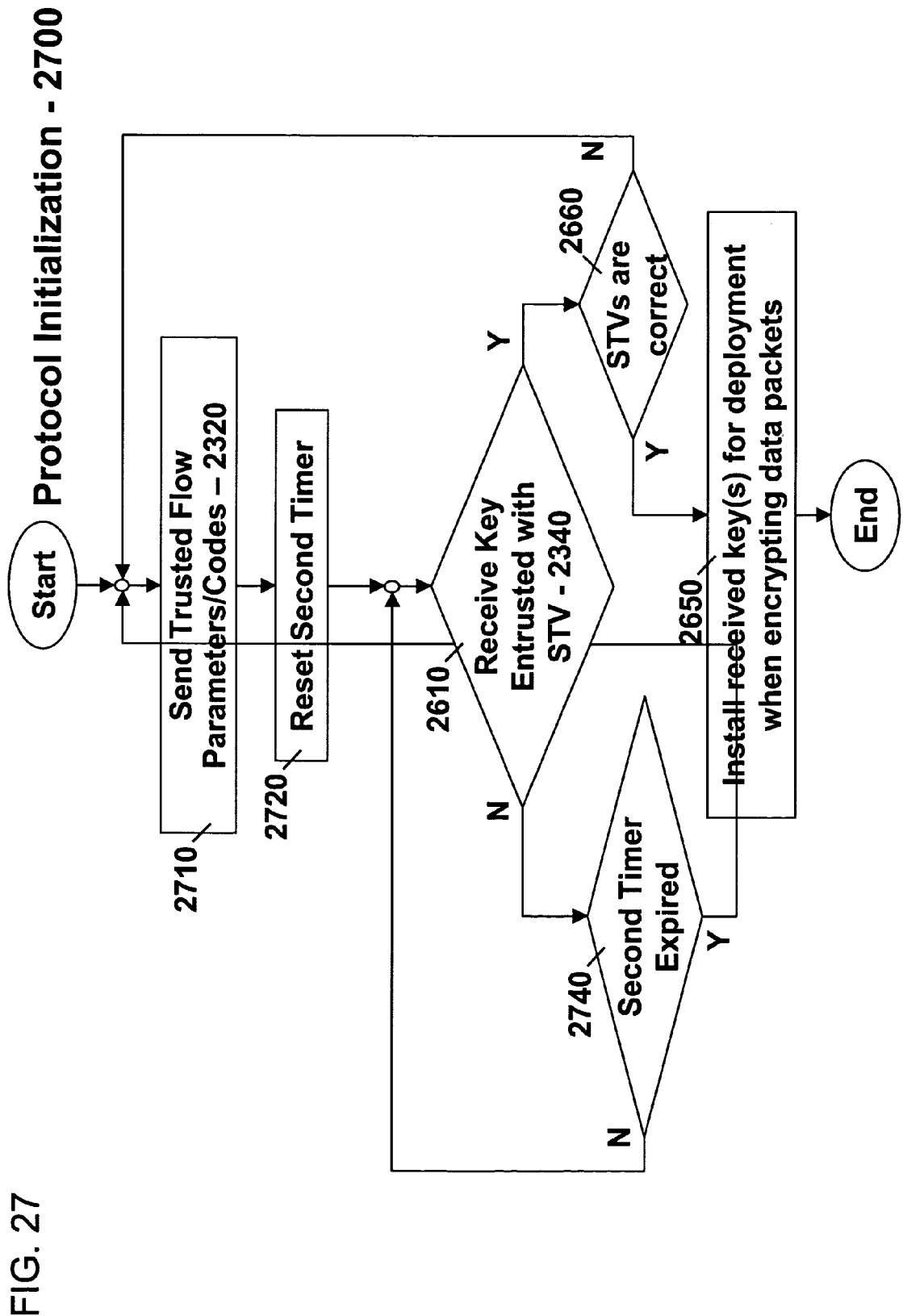
FIG. 27 is a flow chart providing a schematic description of the protocol initialization procedure carried on in order to exchange an encryption key in a trusted way through the deployment of security tag vectors (STVs) entrusting the key exchange.

FIG. 27 is a flow chart providing a schematic description of the protocol initialization procedure 2700 carried on in order to exchange at least one encryption key in a trusted way 2340 through the deployment of security tag vectors (STVs) entrusting the secure key exchange 2340. The transmission and encryption controller 2358 sends 2710 an initial set of Trusted Flow Parameters/Codes 2320 and resets a second timer 2720 used to regulate the exchange of Trusted Flow Parameters/Codes 2320 during the protocol initialization procedure 2700.

Figure 26:
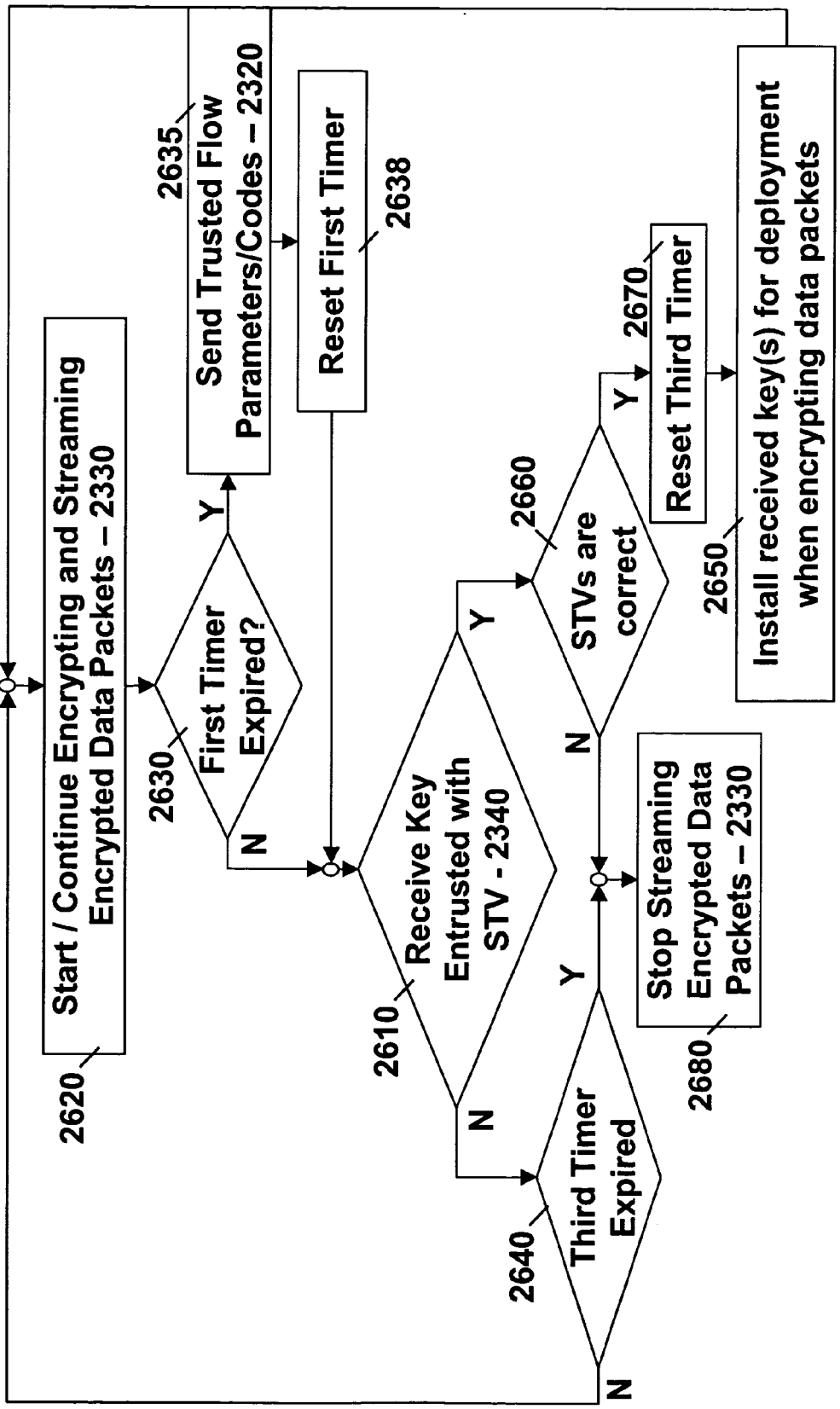
FIG. 26 is a flow chart providing a schematic description of the operation of a controller within a subsystem conditionally generating a stream of secure data packets, e.g., a media server, comprising a Trusted Tag Checker (TTC), regulating the streaming of secure data packets provided that an encryption key is successfully received and the security tag vectors (STVs) entrusting the key exchange are successfully received and verified by the Trusted Tag Checker (TTC).

The transmission and encryption controller 2358 constantly checks 2610 whether at least one of a plurality of keys is received during a secure key exchange entrusted with STV 2340 with the end station 2360 to which the encrypted data packet stream 2330 is going to be sent (2620 in FIG. 26). A second timer measures the time left for a new key to arrive. The transmission and encryption controller 2358 waits for a key to arrive as long as the second timer has not expired 2740-N. However, if the second timer expires 2740-Y, the initial set of Trusted Flow Parameters/Codes 2320 is sent again 2710 and the second timer 2720 reset.

Whenever at least one of a set of keys is received 2610-Y the STVs coupled to it are verified 2660 by the Trusted Tag Checker (TTC) embedded in the second subsystem 2650. If the STVs are valid 2660-Y, the successfully exchanged key(s) are installed 2650 for being used for encrypting data packets and the encryption and streaming of encrypted data packets 2330 is started 2620 (in FIG. 26). Otherwise 2660-N, a set of Trusted Flow Parameters/Codes 2320 is sent 2710 and the second timer 2720 reset.

Figure 28:
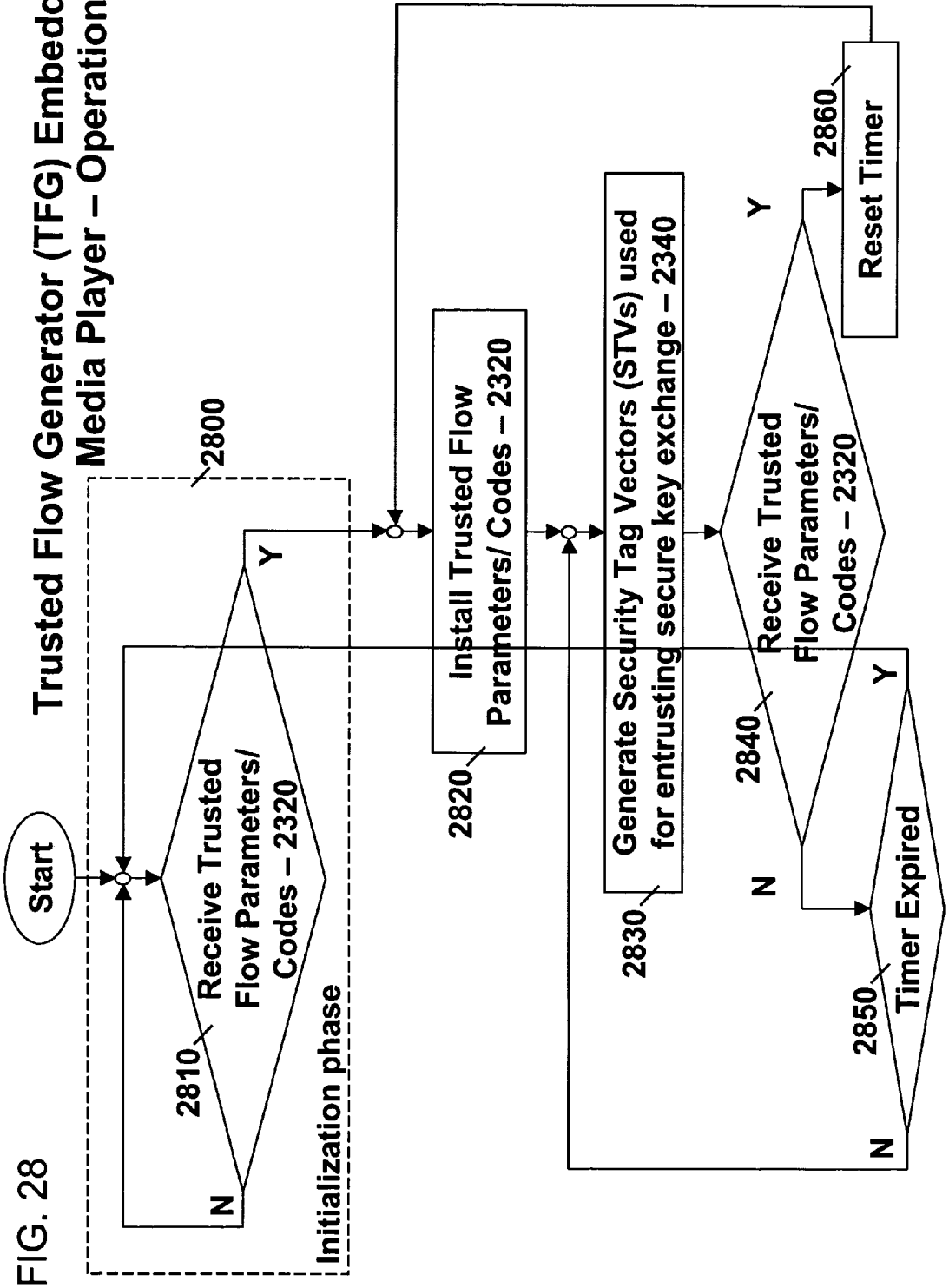
FIG. 28 is a flow chart providing a schematic description of a Trusted Flow Generator (TFG) embedded in a subsystem, e.g., a media player, that generates a valid flow of security tag vectors (STVs) responsive to received Trusted Flow Parameters/Codes deployed to entrust a secure key exchange.

The Trusted Flow Generator (TFG) 2310 embedded in the first subsystem 2360 that receives the encrypted data packet stream 2330 operates as described by the flow chart in FIG. 28. The TFG 2310 operation begins with an initialization phase 2800 that is aimed at receiving a starting set of Trusted Flow Parameters/Codes 2320. Once the set of Trusted Flow Parameters/Codes 2320 is received 2810-Y, the Trusted Flow Parameters/Codes 2320 are installed 2820 for being subsequently used for the generation 2830 of valid STVs that are sent out during the secure key exchange 2340 with the second subsystem 2350 that is generating the stream of encrypted data packets 2330.

The TFG 2310 continuously checks whether a new set of Trusted Flow Parameters/Codes 2320 have been received 2840. A timer measures the time left for a new set of Trusted Flow Parameters/Codes 2320 to arrive. As long as the timer has not expired 2850-N, the TFG continues to generate 2830 STVs responsive to the currently installed Trusted Flow Parameters/Codes 2320. However, if the timer expires 2850-Y, the TFG 2310 re-enters the initialization phase 2800.

Whenever a new set of Trusted Flow Parameters/Codes 2320 is received 2840-Y, the timer is reset 2860 and the new set of Trusted Flow Parameters/Codes 2320 is installed 2820 and used for generating STVs 2830 entrusting secure key exchanges.

Figure 25:
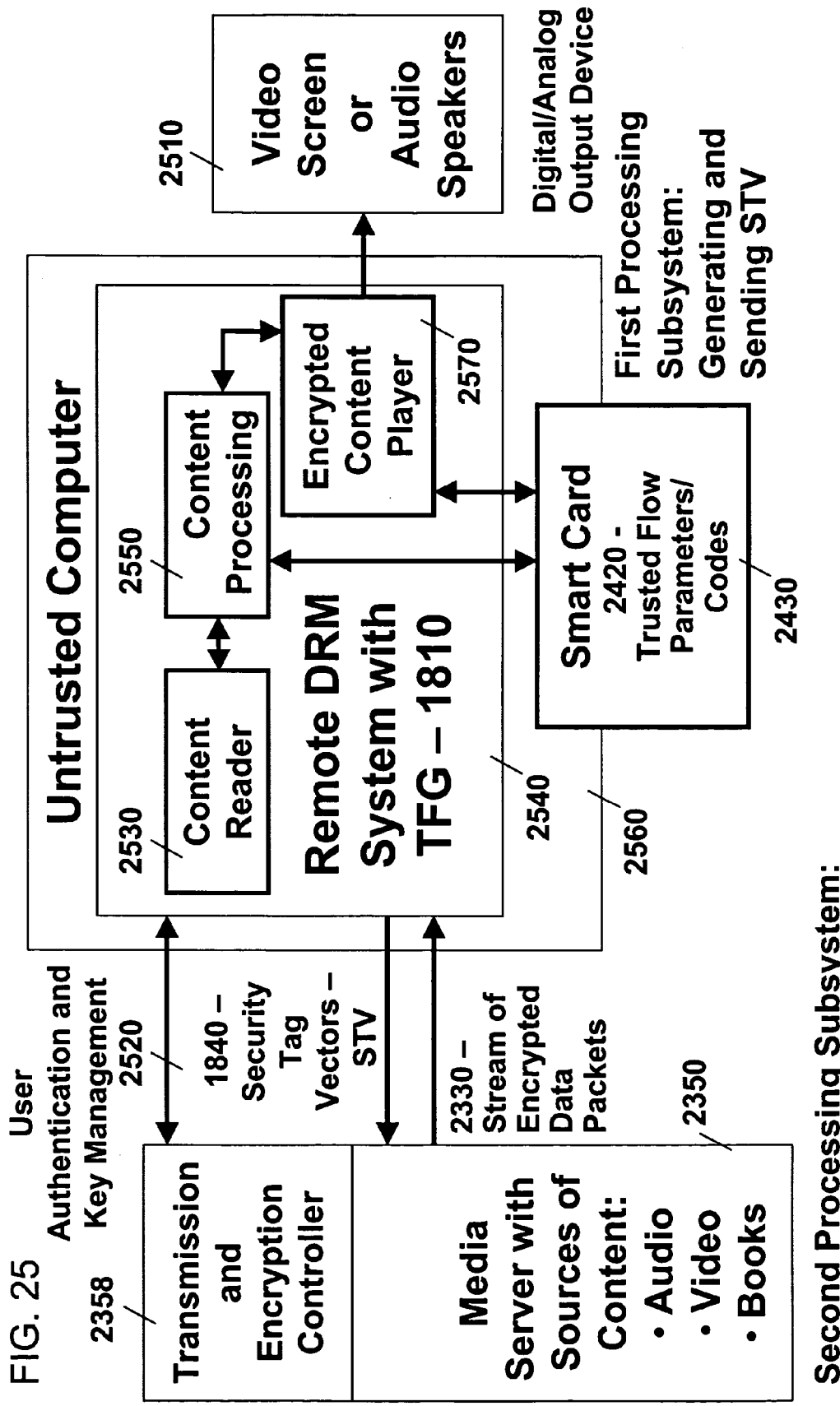
FIG. 25 is a functional description of a digital right management (DRM) system for the protected communication of a stream of packets carrying copyrighted data, wherein the stream of data packets is generated by a second computing element, e.g., a media server, comprising a conditional play controller that conditions the generation of the stream of data to receiving a flow of valid security tag vectors generated by a first computing element, e.g., a media player, running on an untrusted computer, wherein the first computing element comprises a tag flow generator (TFG) for generating the flow of security tag vectors responsive to Trusted Flow Parameters/Codes stored within a smart card coupled with the untrusted computer, wherein an interlocking mechanism ties the generation of valid security tag vectors to the proper execution of all of the remote DRM system component modules.

FIG. 25 is a functional descriptive diagram of another embodiment of digital right management (DRM) system for the protected communication of a stream of encrypted data packets 2330 carrying copyrighted data. The first processing subsystem 2540 is comprised of a first subsystem 2560 or end station that is coupled with an output device 2510 that is at least one of: a video screen and an audio speaker. The first processing subsystem 2540 further comprises a content reader 2530, a content processing module 2550, and an encrypted content player 2570.

The content reader 2530 receives the stream of encrypted data packets 2330 and extracts the content. In another embodiment, the content reader 2530 decrypts the content carried by the encrypted data packets. In another embodiment, the content reader 2530 further encrypts the decrypted content prior to delivering it to the content processing module 2550. In another embodiment, the content reader 2530 extracts an encrypted content and transfers it to the content processing module 2550.

The content processing module 2550 performs the local processing needed to locally show or play the content received within the stream of encrypted data packets 2330. In another embodiment, the content processing module 2550 operates on content previously decrypted by the content reader module 2530. In another embodiment, the content processing module 2550 operates on content encrypted by at least one of the first subsystem 2350 transmitting the stream of encrypted data packets 2330 and the content reader 2530. In another embodiment, the content processing module 2550 encrypts processed content before delivering it to the encrypted content player 2570.

The encrypted content player 2570 is at least one of, but not limited to, a video renderer, a video card, a video memory, and a sound card. The encrypted content player 2570 prepares content for being output on a digital/analog output device 2510 and delivers the content to the device 2510. In another embodiment, the encrypted content player 2570 handles encrypted content. In another embodiment, the encrypted content player 2570 receives decrypted content from the content processing module 2550 and handles decrypted content. In another embodiment, the encrypted content player 2570 receives encrypted content from the content processing module 2550. In another embodiment, the encrypted content player 2570 sends decrypted content to the digital/analog output device 2510. In another embodiment, the encrypted content player 2570 sends encrypted content to the digital/analog output device 2510.

A TFG 1810 is embedded within the first processing subsystem 2540 by means of an interlocking mechanism for generating and sending a flow of valid security tag vectors (STVs) 1840. In another embodiment, the TFG 1810 is embedded in selected ones of the components of the first processing subsystem 2540, e.g., it is embedded in at least one of: the content reader 2530, the content processing module 2550, and the encrypted content player 2570.

A smart card 2430 is coupled with the first subsystem 2560 for storing and providing needed information upon request for encrypting and decrypting and least one of the content transferred between the modules of the first processing subsystem 2540 and the stream of encrypted data packets 2330. In another embodiment, the smart card 2430 contains trusted flow parameters/codes 2420 needed to generate valid security tag vectors (STVs) 1840 sent to the second subsystem 2350.

The second subsystem 2350 comprises a second processing subsystem with processing logic for providing content and a transmission and encryption controller 2358 for regulating the transmission of the content within a stream of encrypted data packets 2330 conditioned to receive a flow of valid STVs 1840 from the first subsystem 2560. The transmission and encryption controller 2358 comprises a trusted tag checker (TTC) for validating the received STVs 1840. The content is at least one of, but not limited to: audio, video, electronic books, games.

Before the transmission of the stream of encrypted data packets 2330 can begin, user authentication and key management 2520 must be performed between the first subsystem 2560 and the second subsystem 2350. In another embodiment, user authentication and key management 2520 is necessary for the exchange of keys used for encrypting the stream of encrypted data packets 2330 from the second subsystem 2350 to the fist subsystem 2560. In another embodiment, user authentication and key management 2520 is performed by means of known and widespread techniques, e.g., those deployed by IPsec, SSL, TLS. In another embodiment, user authentication and key management 2520 is entrusted by means of STVs coupled to the exchanged messages. In another embodiment, user authentication and key management 2520 is performed only when the communication between the fist subsystem 2560 and the second subsystem 2350 begins. In another embodiment, user authentication and key management 2520 is periodically performed throughout the streaming of encrypted data packets 2330 from the second subsystem 2350 to the fist subsystem 2560. In another embodiment, user authentication and key management 2520 is based on information stored in the smart card 2430.

Another embodiment of the present invention comprises a first subsystem, as shown in FIG. 18 and FIG. 19, wherein each subsystem further contains a first processing subsystem providing first logic for processing of streaming data packets 1830, defined rules for processing streaming data packets and for generation and selectively sending of security tag vectors—STV 1840. A second subsystem, as shown in FIG. 18 and FIG. 19, comprises a second processing subsystem for sending the streaming data packets 1830 to at least one of the first subsystems for processing and for providing logic for validating the received security tag vectors—STV 1840 from the first subsystem responsive to a defined validation logic. A network, 1870 in FIGS. 18 and 1955 in FIG. 19, couples the first subsystem and the second subsystem. The second subsystem, as shown in FIG. 18 and FIG. 19, is further comprised of: a transmission controller for stopping the sending of the streaming data packets responsive to the defined validation logic of the selectively transmitted security tag vectors from the first subsystem, as shown in FIG. 18 and FIG. 19. The second subsystem is further comprised of: a forwarding controller, as shown in FIG. 19, for stopping the forwarding of the streaming data packets responsive to the defined validation logic of the selectively transmitted security tag vectors. The system, as shown in FIG. 18 and FIG. 19, further comprises: a defined sequence of decryption keys; wherein the defined sequence of decryption keys are sent from the second subsystem to first subsystem, responsive to the defined validation logic of the selectively transmitted security tag vectors.

The streaming data packets 1830 processing is further comprised of processing logic; wherein the processing logic, is part of the first subsystem 1860, and is further comprised of at least one of: a privileges table, a privileges decision-tree, a streaming data packet processing logic, a streaming data packet header processing privileges decision-tree, a security tag processing logic, a streaming data packet identification processing logic, a secure time-stamp processing logic, a processing of streaming data packets with secure time-stamps, watermarking information processing, fingerprinting information processing, digital signature information processing, and a processing of streaming data packets with secure time-stamps that is responsive to UTC (coordinated universal time). The streaming data packet 1830 processing is provided with codes and parameters 1820 in accordance with XrML (Extensible Rights Markup Language).

The first subsystem, as shown in FIG. 18 and FIG. 19, includes at least one of: first logic, defined rules and the security tag vector generation, which are further characterized as responsive to a at least one of: predefined schedule, secure time-stamp, renewable codes and parameters, and updated codes and parameters.

The first subsystem, as shown in FIG. 18 and FIG. 19, contains at least one of: selected parts of the first logic, selected parts of the defined rules, selected parts of the security tag vector generation, selected parts of the renewable codes and parameters, and selected parts of the updated codes and parameters are provided from an external storage medium. The external storage medium is at least one of: a smart card, a tamper-proof device, obfuscated storage, hidden storage, encrypted data storage, removable storage, a token card, and metro card.

The first subsystem, as shown in FIG. 18 and FIG. 19, includes at least one of: selected parts of the first logic, selected parts of the defined rules, and selected parts of the security tag vector generation define a plurality of logic modules that are interlocked for streaming data packet processing together with the security tag vector generation. The interlocking is further characterized by each respective one of the plurality of logic modules being associated with a respective one of a plurality of defined subtasks; wherein the combined plurality of defined subtasks defines the said selected parts of the first logic, said selected parts of the defined rules and said selected parts of the security tag vector generation. All of the logic modules are required to properly perform the respective defined subtask to provide the said selected parts of the first logic, said selected parts of the defined rules and said selected parts of the security tag vector generation.

The first subsystem, as shown in FIG. 24 and the first processing subsystem, as shown in FIG. 25, further includes a media player; wherein the media player is directly attached to at least one of: a video display, a TV display, a computer monitor, a handheld display, an audio speaker, a stereo audio system, a digital output system, an analog output system, and a media play buffer. The media player performs at least one of the following operations: delete streaming data packets after processing, delete streaming data packets within a predefined time interval after processing, delete streaming data packets after predefined number of times of processing, prevent copying streaming data packets, prevent printing streaming data packets, prevent sending of streaming data packets, encrypted video rendering of content received in streaming data packets, encrypted video rendering of content stored in the first subsystem. The media player operates in accordance with at least one of: XrML (Extensible Rights Markup Language) specifications, trusted computing specifications, trusted computing based principles, validation of watermarking information, IPSec (IP Security) functionality, TLS (Transport Layer Security) functionality, and SSL (Secure Sockets Layer) functionality.

Figure 29:
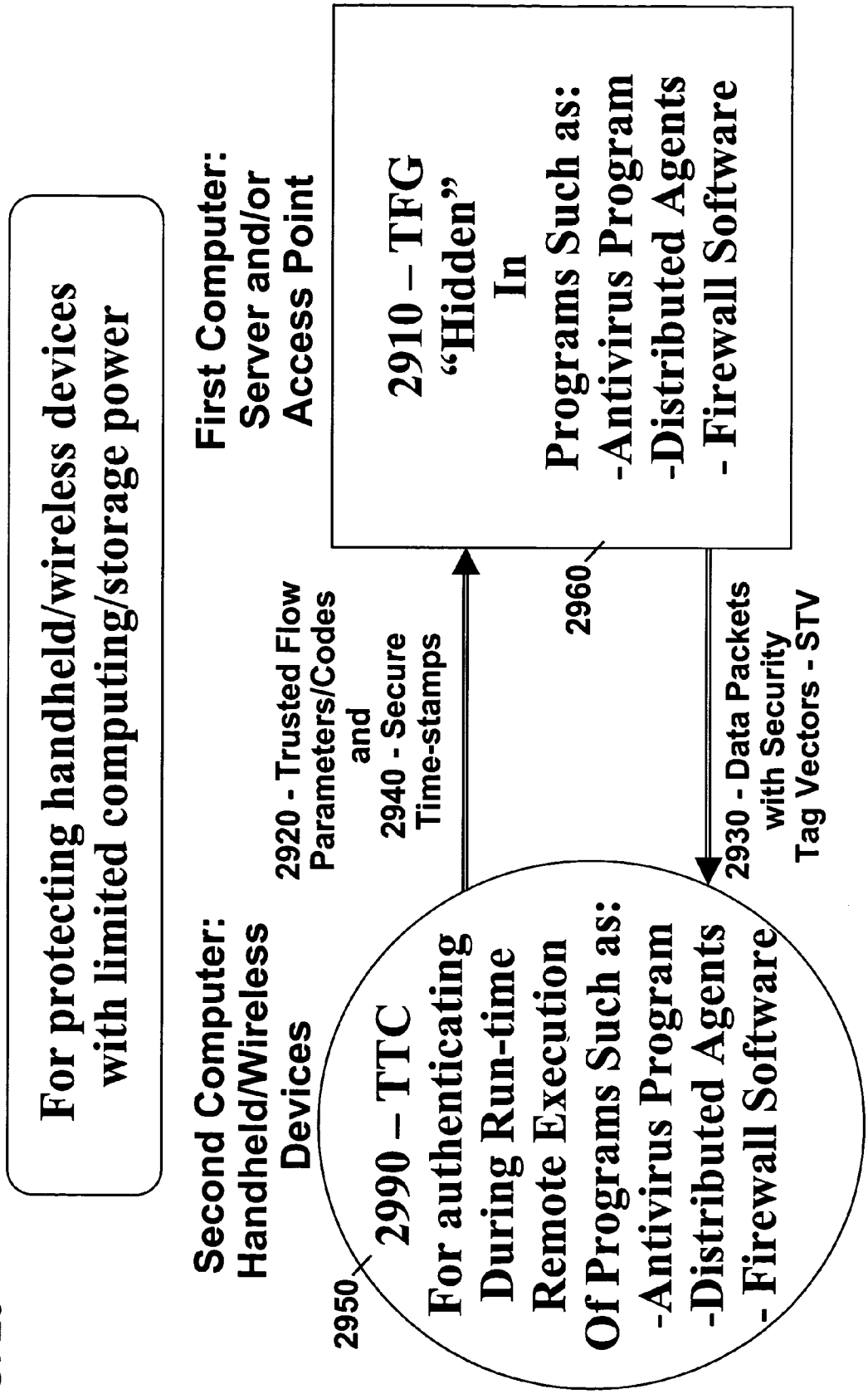
FIG. 29 is a functional description of a system for protecting a second computer that is, e.g., a device with limited computing and/or storage capability, e.g., a handheld device, by entrusting a first computer, running within an untrusted computing environment, to which processing and storage functionalities are delegated.
Figure 30:
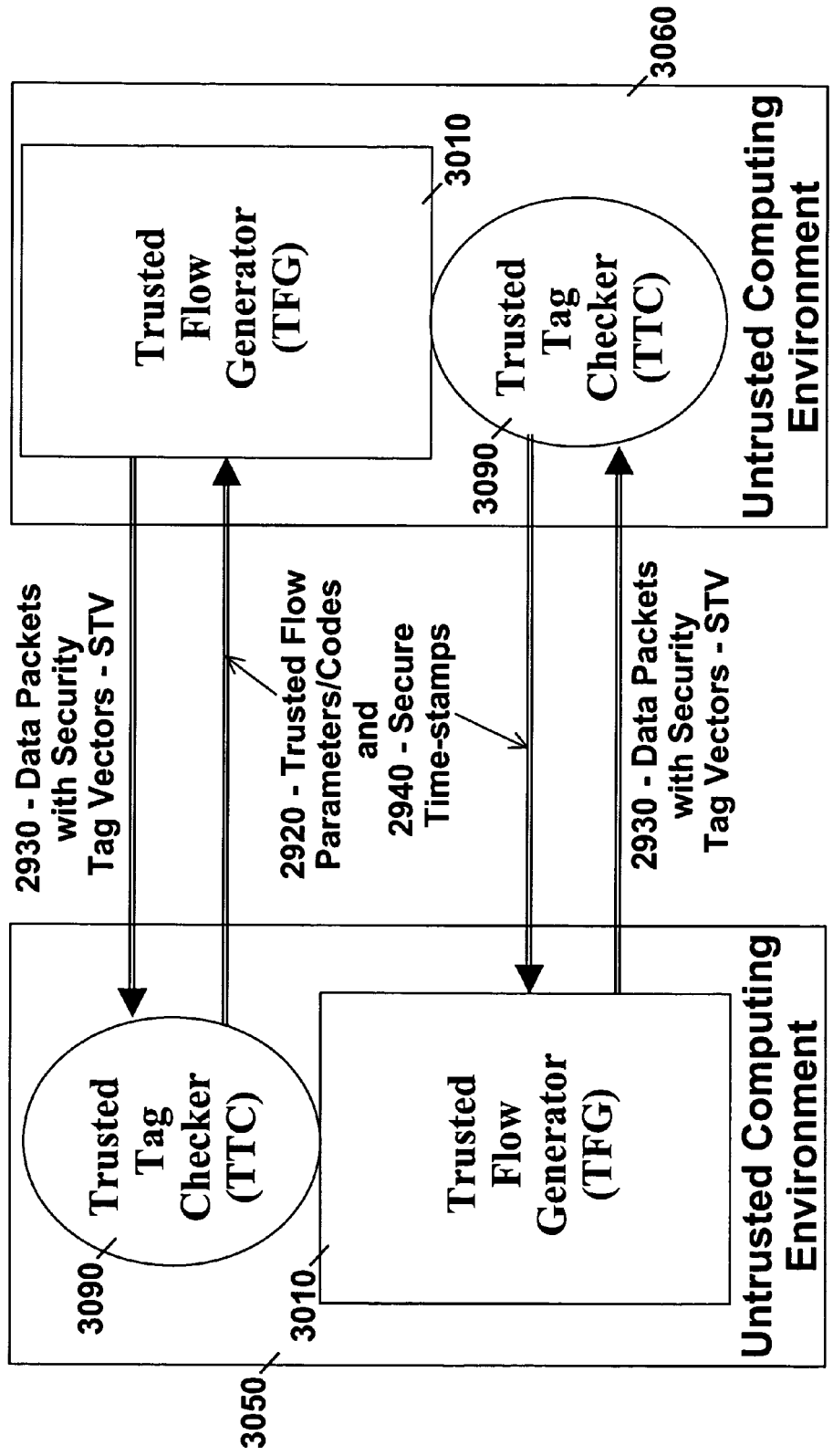
FIG. 30 is a functional description of a system for protecting devices, e.g., handheld devices or computers that are part of a grid or a peer-to-peer community, that delegate processing and storage functionalities to other devices or rely on other devices operating according to predefined rules, wherein the protection is achieved by entrusting other devices through the mutual exchange and verification of flows of security tag vectors (STVs).

The Reverse TrustedFlow for Mobile Users Protection: FIG. 29 and FIG. 30

FIG. 28 is a functional description of a system for protecting a second computer 2950 that delegates to a first computer 2960 part of at least one of, and not limited to, its processing tasks and storage needs. In another embodiment the first computer 2950 is at least one of, and not limited to, a handheld device, a wireless device, and a low-end personal computer. The second computer is at least one of, and not limited to, a server, an access point, an access device, a router, a switch, and a base station.

In another embodiment, the processing task delegated by the second computer 2950 to the first computer 2960 is at least one, and not limited to, an antivirus program, distributed agents, a firewall software, storage of information on local non-volatile memory, e.g.: a magnetic disk, a magnetic tape, an optical disk, a flash card. The first computer 2960 is an untrusted computing environment, but the second computer 2950 can be protected against possible misbehaviors of the processing components executed on the first computer 2960 by "hiding" a trusted flow generator (TFG) 2910 within the processing logic executed by the first computer 2960. The processing logic is implemented as at least one of software, hardware, and firmware. TFG hiding is performed by means on an interlocking mechanism that ensures that the TFG 2910 is able to generate valid STVs only if the processing logic in which it is hidden is operating according to its predefined behavior.

The TFG 2910 on the first computer generates STVs responsive to trusted flow parameters/code 2920 and secure time-stamps 2940 received from the second computer 2950. The first computer 2960 couples the STVs generated by the TFG to the data packets 2930 transmitted to the second computer 2950.

The second computer 2950 embeds a trusted tag checker (TTC) 2990 that verifies whether the STVs coupled with the received data packets 2930 are valid, e.g., whether they had been properly generated responsive to the trusted flow parameters/codes 2920 and secure time-stamps 2940 sent to the first computer 2960. The received data packets 2930 are accepted only if the TTC 2990 successfully verifies the STVs coupled to them.

FIG. 29 is a functional descriptive diagram of a system for mutually protecting devices 3050 and 2060 that are each an untrusted computing environment. Each device verifies that the other one is operating according to a defined behavior by checking the validity of STVs coupled to exchanged data packets 2930. The STVs are being generated according to trusted flows parameters/codes 2920 and secure time-stamps 2940 exchanged by the two devices 3050 and 2060—handheld devices or computers that are part of, e.g.: a grid or a peer-to-peer community, a client and a server, a wireless device and an access point, a network user device and an access server, an end system and an intermediate system, two routers, two switches, two firewalls, a firewall and an end system, two proxies, a proxy and an end system—either client or server—a computer and a storage array, a computer and a storage server, two storage servers, two remote disks.

Each device 3060 and 3050 has a trusted tag checker (TTC) 3090 and a trusted flow generator (TFG) 3010 hidden by means of an interlocking mechanism in relevant processing logic embedded in the device. The TTC 3090 sends trusted flow parameters/codes 2920 and secure time-stamps 2940 to the other device's TFG 3010. The TFG 3010 generates STVs responsive to the received trusted flow parameters/codes 2920 and secure time-stamps 2940. The generated STVs are coupled to the data packets 2930 sent to the other device; the TTC on each device checks the validity of the STVs coupled to received data packets 2930 responsive to the corresponding trusted flow parameters/codes 2920 and secure time-stamps 2940 that were previously sent out to the device from which the originated the data packets were received.

In another embodiment, the trusted flow parameters/codes 2920 and secure time-stamps 2940 are sent when the communication between two devices 3060 and 3050 begins. In another embodiment, the trusted flow parameters/codes 2920 and secure time-stamps 2940 are sent periodically throughout the duration of the communication between two devices 3060 and 3050.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A computing system, the system comprising:
a network coupling a first computing subsystem and a second computing subsystem;
wherein the second computing subsystem provides sending of streaming data packets containing digital media to the first computing subsystem;
wherein the first computing subsystem provides means for:
(a) receiving of the streaming data packets containing digital media from the second computing subsystem,
(b) utilizing an operational software module by the first computing subsystem for processing of the streaming data packets containing digital media, and
(c) utilizing the operational software module by the first computing subsystem for generating security tags responsive to said processing of streaming data packets and sending the security tags to the second subsystem; and
wherein the second computing subsystem provides means for:
(a) receiving the security tags from the first computing subsystem, and
(b) providing processing logic for validating as a successful validation that the operational software module was unchanged when utilized in generating the security tags at the first computing subsystem, and otherwise determining a failed validation if the operational software module was changed when utilized in generating the security tags at the first computing subsystem.

2. The system as in claim 1, wherein the second computing subsystem further comprises a transmission and forwarding controller responsive to the processing logic for validating, for performing at the following:
stopping the sending of the streaming data packets containing digital media to the first computing subsystem responsive to the determining of the respective failed validation.

3. The system as in claim 1, wherein the operational software module provides rules of processing that are defined by at least one of: a content management subsystem, a digital right management subsystem, and predefined policy rules associated with the content.

4. The system as in claim 1, further comprising: a defined sequence of decryption keys; and
wherein portions of the defined sequence of decryption keys are sent, one portion at a time, from the second computing subsystem to first computing subsystem, responsive to successful validation of the processing logic for validating the received security tags from the first computing subsystem.

5. The system as in claim 1, wherein the processing of streaming data packets on the first computing subsystem is further responsive to a at least one of: a privileges table, a privileges decision-tree, pseudo random rendering logic, a streaming data packet header processing privileges decision-tree, a security tag processing logic, a streaming data packet identification processing logic, a secure time-stamp processing logic, a time stamp representing execution time of at least one selected operation, a processing of streaming data packets with secure time-stamps, watermarking information processing, fingerprinting information processing, stenographic information processing, data embedding information processing, digital signature information processing, and a processing of streaming data packets with secure time-stamps that is responsive to UTC (coordinated universal time).

6. The system as in claim 1, wherein the processing of streaming data packets on the first computing subsystem utilizes codes and parameters defining and expressing at least one of: privileges, authorizations, access rights, and entitlements as expressed in XrML (Extensible Rights Markup Language).

7. The system as in claim 1, wherein at least one of: the processing of streaming data packets and the generating of security tags are further responsive to at least one of:
a predefined schedule, a secure time-stamp, a time stamps representing execution time of at least one selected operation, renewable codes and parameters, updated codes and parameters, a predefined schedule received from the second computing subsystem, a secure time-stamp received from the second computing subsystem, renewable codes and parameters received from the second computing subsystem, updated codes and parameters received from the second computing subsystem, replacement codes and parameters received from the second computing subsystem, a predefined schedule received from a third computing subsystem, a secure time-stamp received from a third computing subsystem, renewable codes and parameters received from a third computing subsystem, and updated codes and parameters received from a third computing subsystem.

8. The system as in claim 7, wherein at least one of: selected parts of the processing of the streaming data packets, selected parts of the generating of security tags, selected parts of the renewable codes and parameters, and selected parts of the updated codes and parameters, are provided from an external storage medium.

9. The system as in claim 8, wherein the external storage medium is at least one of: a smart card, a tamper-resistant device, an obfuscated storage, a hidden storage, an encrypted data storage, a removable storage device , a token card, a network interface, a wireless access point, a wireless base station, and a metro card.

10. The system as in claim 1, wherein selected parts of the processing of streaming data packets, and selected parts of the generating of security tags are defined as a plurality of logic modules that are interlocked to provide concurrent execution.

11. The system as in claim 1, wherein the display device is at least one of:
an analog display, a digital display, a television, a flat panel display, a screen, a movie screen, a liquid crystal display, a solid state display, a home video system, a computer display, a CRT display, a mobile phone display, a PDA display, a three-dimensional display, a holographic display, a computer monitor, a handheld display, a digital output system, an electronic book display, and an analog output system.

12. The system as in claim 1, further comprising: an update controller separate from the first computing subsystem, and providing at least one of: updated codes, updated parameters, update decryption codes, update decryption keys, update rendering codes, update playing codes, and updated secure time stamp to the first subsystem.

13. The system as in claim 12, further comprising: a security management server (SMS) for providing update information to the update controller.

14. The system as in claim 1,
wherein the utilizing an operational software module by the first computing subsystem for processing of the streaming data packets containing digital media provides at least one of audio playing on a sound device and a video playing on a display device, wherein the sound device is at least one of: a speaker, a plurality of speakers, a surrounding sound system, ear phones, loudspeakers, a high fidelity sound system, a stereo audio system, a digital output system, and an analog output system.

15. The system as in claim 1, wherein the first computing subsystem is further comprised of cryptographic modules; and
wherein the cryptographic modules provide for at least one of:
program authentication, user authentication, cryptographic authentication, application authentication, encryption, a secure time-stamp, a digital signature, watermarking information, IPSec (IP Security) functionality, TLS (Transport Layer Security) functionality, and SSL (Secure Sockets Layer) functionality.

16. The system as in claim 1, wherein the second computing subsystem is further comprised of validation modules; and
wherein the validation modules further provide at least one of:
program authentication, user authentication, cryptographic authentication, application authentication, encryption, a secure time-stamp, a digital signature, watermarking information, IPSec UP Security) functionality, TLS (Transport Layer Security) functionality, and SSL (Secure Sockets Layer) functionality.

17. The system as in claim 1,
wherein the utilizing an operational software module by the first computing subsystem for processing of the streaming data packers containing digital media provides at least one of audio playing on a sound device and a video playing on a display device, and
wherein the processing of the streaming data packets provides at least one of: the audio playing and the video playing, and further provides at least one of:
deleting streaming data packets after processing, deleting streaming data packets within a predefined time interval after processing, deleting streaming data packets after a defined number of times of processing, preventing copying of the streaming data packets, preventing printing of the streaming data packets, preventing sending of the streaming data packets, encrypting video rendering of content received in the streaming data packets, pseudo random video rendering of content received in the streaming data packets, and encrypted video rendering of content received in the streaming data packets.

18. The system as in claim 1,
wherein the utilizing an operational software module by the first computing subsystem for processing of the streaming data packets containing digital media provides at least one of audio playing on a sound device and a video playing on a display device, and
wherein at least one of: the audio playing and the video playing operate in accordance with logic based upon at least one of:
XrML (Extensible Rights Markup Language) specifications, trusted computing specifications, trusted computing based principles, validation of watermarking information, IPSec (IP Security) functionality, TLS (Transport Layer Security) functionality, and SSL (Secure Sockets Layer) functionality.

19. The system as in claim 1,
wherein the second computing subsystem further includes a media server.

20. The system as in claim 19, wherein there is a plurality of the first computing subsystems, each coupled to the network and receiving streaming data packets from the second computing subsystem, and wherein the media server regulates distribution of the streaming data packets to only a predefined number of the plurality of the first computing subsystems.

21. The system as in claim 1, wherein there is a plurality of the first computing subsystems, each coupled to the network and receiving streaming data packets from the second computing subsystem.

22. The system as in claim 21, wherein the second computing subsystem encodes the respective streaming data packets responsive to the respective successful validation of the respective received security tags from the respective one of the plurality of the first computing subsystems.

23. The system as in claim 22, wherein the streaming data packets are encoded such that any of the plurality of the first computing subsystems in which the validating of their security tags fail will not thereafter be able to further decode the streaming data packets.

24. The system as in claim 21, wherein the streaming data packets are encrypted by the second computing subsystem by using a group encryption scheme such that any of the first computing subsystems in which the validating of their security tags fail will not be able to further decode the streaming data packets.

25. The system as in claim 22, wherein the streaming data packets are sent using at least one of:
multicast, IP (Internet Protocol) multicast, Secure IP multicast, group key management architecture, multi-party non-repudiation protocol, group communications, and secure group communications.

26. The system as in claim 1, wherein there is a plurality of second computing subsystems coupled to the network, each sending a respective plurality of streaming data packets to the first computing subsystem.

27. The system as in claim 26, wherein the first computing subsystem sends security tags to the plurality of second computing subsystems for validation.

28. The system as in claim 1, wherein the first computing subsystem is at least one of:
a computer, a wireless device, a handheld device, a Wi-Fi device, a device operating in accordance with IEEE 802.11 family of standards, a device operating in accordance with IEEE 802.15, a device operating in accordance with IEEE 802.16, a 2.5G cellular telephone, a 3G cellular telephone, a 4G cellular telephone, a 5G cellular telephone, a personal computer, a set-top box, a device operating in accordance with UMTS (universal mobile telephone system), and a device operating in accordance to the IEEE 802 family of standards.

29. The system as in claim 1, wherein the second computing subsystem further comprises encryption logic for encrypting streaming data packets prior to sending the respective streaming data packets; and
wherein the first computing subsystem processing of streaming data packets further comprises logic for decrypting the streaming data packets.

30. The system as in claim 29, wherein the second computing subsystem provides a decryption key to the first computing subsystem processing logic.

31. The system as claim 30, wherein the encryption key is provided for at least one of: periodically, at random times, at predefined time intervals, responsive to validating the security tags, and at predefined times derived from coordinated universal time (UTC).

32. The system as in claim 29, wherein the first computing subsystem further comprises logic for generating and sending encryption keys to the second computing subsystem from at least one of the following: a smart card external device and a trusted platform module (TPM); and
wherein the second computing subsystem uses the encryption keys for encrypting the streaming data packets prior to sending them.

33. A method for authenticating, at a second computing subsystem, a software module utilized in operation at a first computing subsystem, the method comprising:
sending of data to the first computing subsystem from the second computing subsystem;
receiving the data in the first computing subsystem;
processing the data on the first computing subsystem responsive to an operational software module, and generating security tags responsive to an associated tag generation module concurrently executing with the operational software module;
concurrently executing the associated tag generation module responsive only to executing the respective operational software module in the first computing subsystem;
sending the security tags to the second computing subsystem from the first computing subsystem;
processing the security tags in the second computing subsystem to determine successful validation responsive to validating that the processing of the data in the first computing subsystem was processed by the operational software module operating concurrently with the generating the security tags by the associated tag generation, and otherwise determining a failed validation; and
adjusting communication of sending of the data responsive to one of the successful validation and the failed validation.

34. The method as in claim 33, further comprising:
providing a plurality of operational software modules and parameters operable stand-alone to provide a respective plurality of subtask functions
providing secure integration of the plurality of operational software modules and parameters to provide a combined functionality;
interlocking the plurality of operational software modules and parameters into a single logic program that is only operable to concurrently execute the plurality of operational software modules; and
providing the combined functionality responsive to the plurality of subtask functions concurrently executing responsive to the single logic program at the first computing element.

35. The method as in claim 33, wherein the generating security tags is at least one of: forms a pseudo-random sequence of security tags and a time stamp representing execution time of at least one selected operations.

36. The method as in claim 35, further comprising:
producing the pseudo-random sequence of security tags utilizing computation according to at least one of:
applying a pseudo-random generator, applying a pseudo-random function, applying a cryptographic function, applying an encryption function, applying a scrambling subroutine, applying an authentication function, applying a digital signing function, applying a cryptographic bash function, applying a subroutine, applying a computational logic module, applying a symmetric cryptography function, applying an asymmetric cryptography function, employing a cryptographic key, employing a cryptographic seed, employing an encrypted software, employing an obfuscated software, employing a hidden program, employing watermarking information, employing fingerprinting information, employing digital signature information, employing logic with a set of parameters, employing a hardware module, employing a trusted platform module (TPM), employing a smart card, employing a portable device, and employing a distributed protocol.

37. The method as in claim 34, further comprising:
an external smart card device that is part of the first computing element, and
wherein selected modules and parameters of the plurality of software logic modules and parameters reside on the external smart card device.

38. The method as in claim 34, wherein selected ones of the parameters are at least one of: an encryption key, a decryption key, and an authentication parameter.

39. The method as in claim 34, further comprising:
renewing selected ones of the plurality of operational software modules and parameters.

40. The method as in claim 34, further comprising:
replacing selected ones of the plurality of operational software modules and parameters.

41. The method as in claim 39, wherein the renewing is performed in at least one of:
periodically, at random times, at predefined times, at predefined times derived from coordinated universal time (UTC), responsive to receiving data by the first computing element, responsive to sending the security tags, and responsive to sending data by the second computing element.

42. The method as in claim 34, wherein the data is stored in a memory in the first computing element responsive to the receiving the data in the first computing element; the method further comprising:
erasing the data from the memory in the first computing element by the single logic program in the first computing element.

43. The method as in claim 42, wherein the memory is at least one of: a solid state device, random access memory, a main memory, a secondary memory, a magnetic storage device, and an optical storage device.

44. The method as in claim 42, wherein the erasing the data is performed at least one of:
after a predefined time, after the data has been output to an output device, and after the data has been output a predefined number of times to an output device.

45. The method as in claim 33, wherein the first computing element is comprised of at least one of:
a computer, a wireless device, a handheld device, a Wi-Fi device, a device operating in accordance with IEEE 802.11, a device operating in accordance with IEEE 802.15, a device operating in accordance with IEEE 802.16, 2.5G cellular telephone, a 3G cellular telephone, a 4G cellular telephone, a 5G cellular telephone, a personal computer, a computing subsystem, a set-top box, a device operating in accordance with UMTS (Universal Mobile Telephone System), and a device operating in accordance with IEEE 802.3 family of standards.

46. A method of protected communicating of streaming data packets, the method comprising:

receiving the streaming data packets containing content, in the first computing subsystem;

processing of the streaming data packets in the first computing subsystem according to defined rules for processing;

generating security tags responsive to execution of the defined rules for processing;

sending the security tags from the first computing subsystem to a second computing subsystem;

providing security tag validation logic in the second computing subsystem;

processing, in the second computing subsystem, the received security tags, responsive to the security tag validation logic to provide respective validated security tags; and processing in the second computing subsystem the validated security tags and the received security tags to determine whether the generating security tags in the first computing subsystem was properly generated responsive to execution of the defined rules for processing at the first computing subsystem so as to validate that the defined rules of processing were unchanged at the time of execution at the first computing subsystem.

47. The method as in claim 46, wherein the content is representative of at least one of: a movie, a book, a music piece, a concert, a 3D movie, a sport event, a text file, and a multimedia file;

wherein the content is divided into predefined number of parts, and wherein each of the parts is associated with a decryption key.

48. A method for authentication of integrity of software executed in generating of communicated data packets within a computer, the method comprising:

transmitting data packets from a second computing subsystem to a first computing subsystem;

receiving the streaming data packets for processing in the first computing subsystem;

providing operation software that provides for defining rules of processing for execution on the first computer subsystem;

generating security tags at the first computing subsystem responsive to the streaming data packets and responsive to the rules of processing;

sending respective ones of the security tags from the first computing subsystem to the second computing subsystem; and processing the received security tags in the second computing subsystem to validate that the operation software was unchanged when the operation software performed the processing in the first computing subsystem when operating according to the rules of processing.

49. The method as in claim 48, further comprising:

validating the received security tags in the second computing subsystem responsive to second rules of processing; and processing the received security tags in the second computing subsystem to validate execution of the operation software providing defining of the rules of processing in the first computing subsystem, to validate that the processing of the streaming data packets in the first computing subsystem is according to the respective defined rules for processing utilizing the respective unchanged operation software.

50. A computer system providing remote authentication on a first computing subsystem of processing of content at a remote computing subsystem, the system comprising:

a tag generator at the remote computing subsystem operating from an initial generator state to locally generate a sequence of security tags responsive to concurrent execution of an operational code module utilizing a sequence of content processing steps;

wherein the system provides transmission from the remote computing subsystem to the first computing subsystem of the sequence of security tags;

a tag verifier at the first computing subsystem, operating from an initial verification state to generate a sequence of comparison security tags for selective comparison to the sequence of the security tags; and wherein the system coordinates the initial generator state and the initial verifier state prior to the execution of the operational code module, wherein the tag verifier selectively provides valid comparison tags responsive to the means for coordinating, wherein the valid comparison tags are utilized to authenticate that the operation code module was unchanged during the execution at the remote computing subsystem for assuring integrity of the sequence of content processing steps.

51. The system as in claim 50, wherein the tag generator includes a sequence number as part of the security tags.

52. The system as in claim 51, wherein the tag verifier generates a comparison sequence number for selective comparison to the sequence number that is part of the security tags.

53. The system as in claim 51, wherein the sequence number is used for at least detecting a loss of a respective security tag.

54. The system as in claim 50, wherein the tag generator provides a secure time-stamp as part of each of the security tags.

55. The system as in claim 54, wherein the tag verifier generates a comparison secure time-stamp for selective comparison to the secure lime-stamp that is part of each of the security tags.

56. The system as in claim 50, wherein the system remotely downloads of codes and parameters for use with the tag generator and the sequence of content processing steps.

57. The system as in claim 56, wherein the codes and parameters are used to perform at least one of: processing to provide the sequence of content processing steps, and generating security tags.

58. A system for authenticating operation by providing secure integration of separate software logic modules to provide a combined functionality, the system comprising:

a plurality of software logic modules each operable standalone to provide a respective one of a plurality of subtask functions associated with operations on a first computing subsystem; and a transformation controller providing interlocking of the plurality of software logic modules, comprised at least of a first separate operational module and a second separate operational module, into a single logic program that provides a combined functionality;

wherein the combined functionality is only provided by the first computing subsystem when the plurality of subtask functions are executed concurrently responsive to the single logic program;

wherein the combined functionality provides for the first computing subsystem providing the subtask functions of:

(a) receiving of streaming data packet from a media server associated with the first computing subsystem responsive to the first separate operational module within the single logic program, and providing processing of the streaming data packets responsive to defined rules for processing of the streaming data packets, and (b) generation of security tags responsive to the second separate operational module within the single logic program and selectively sending of the security tags to said media server associated with the first computing subsystem, wherein the combined functionality assures that the first separate operational software module for receiving of data packets executes concurrently with the second separate software logic module generating security tags.

59. The system as in claim 58, wherein the single logic program is written to be immune to reverse generation.

60. The system as in claim 58, wherein one of the software logic modules provides a function for producing at least one of: pseudo-random sequence of security tags and time stamps representing the execution time of selected operations, at the first computing subsystem;

wherein at least one of: the pseudo-random sequence of security tags and the time stamps representing the execution time of selected operations, are sent to the second computing subsystem for verification of correct processing on the first computing subsystem; and wherein the streaming data packets are sent to the first computing subsystem from said media server, only upon successful verification that the combined functionality was executed on the first computing subsystem.

61. The system as in claim 60, wherein at least one of producing: the pseudo-random sequence of security tags and the time stamps representing the execution time of selected operations, utilizes computation by at least one of:

applying a pseudo-random generator, applying pseudo-random function, applying a cryptographic function, applying an encryption function, applying a scrambling subroutine, applying an authentication function, applying a digital signing function, applying a cryptographic hash function, applying a subroutine, applying a computational logic module, applying a symmetric cryptography function, applying an asymmetric cryptography function, employing a cryptographic key, employing a cryptographic seed, employing an encrypted software, employing an obfuscated software, employing a hidden program, employing logic with a set of parameters, employing a hardware module, employing a smart card, employing a portable device, employing local clock, employing universal time, and employing a distributed protocol.

62. The system as in claim 58, wherein one of the software logic modules provides logic to process content of the streaming data packets.

63. The system as in claim 62, wherein logic to process the content of the streaming data packets performs at least one of: video rendering of the content on a video display, playing the content via audio speakers, displaying the content on an e-book output device, outputting the content to an output device, and outputting the content to an analog output device.

64. The system as in claim 58, wherein one of the software logic modules provides rules of playing of audio and video content.

65. The system as in claim 64, wherein the rules of playing of audio and video content ensure at least one of:

the content is not printed; the content is not sent to a third party; the content is destroyed after being displayed on a video monitor; the content is being destroyed after being played via an audio speakers; the content is erased from all memory storage devices after being displayed on a video monitor; the content is erased from all memory storage devices after being played via an audio speakers; the content is erased from all memory storage devices after being used via an e-book output device; the content is erased from all memory storage devices after a predefined time interval; the content is erased from all memory storage devices at a time defined time by coordinated universal time (UTC); the content is used in accordance with rights defined using XrML (Extensible Rights Markup Language) specifications; the content is used in accordance with trusted computing specifications; the content is used in accordance with trusted computing based principles; and the content is used in accordance with at least one of the following: watermarking information, stenographic information, fingerprinting information, embedded data and digital signature information.

66. The system as in claim 64, wherein the rules of playing provide at least one of: content processing and determining a renewable software for content processing.

67. The system as in claim 66, wherein the renewable software for content processing is at least one of:

a number of times the content can be displayed, a number of times the content can be played, a time signal, a UTC time signal, a digitally signed time signal, a software element, a predefined task, a code for processing content signature, and a code for watermarking the content.

68. The system as in claim 66, wherein the renewable software for content processing is obtained from at least one of:

a second computing subsystem, a second computing element, predefined logic, an external rule controller, a security management system, via a network interface, a network appliance, a server, a network management system, a firewall, a local computing subsystem, a smart card device, a trusted platform module (TPM) device, and a portable device.

69. The system as in claim 58, wherein one of the software logic modules provides a cryptographic function for producing a pseudo-random sequence of security tags; and wherein one of the software logic modules provides logic to process and play audio and video content.

70. The system as in claim 58, wherein one of the software logic modules provides a cryptographic function for verifying at least one of: watermarking, embedded data and fingerprinting.

71. The system as in claim 58, further comprising:

a source of interlocking parameters, and wherein the transformation controller is further comprised of means for combining the software logic modules responsive to the interlocking parameters.

72. The system as in claim 71, wherein the source of interlocking parameters is generated by at least one of:
a random source, a cryptographic key, and a defined table and location in memory.

73. The system as in claim 71, wherein the transformation controller determines an intermixture of the subtask functions of the plurality of software logic modules into the single logic program to provide the combined functionality.

74. The system as in claim 73, wherein the intermixture of the subtask functions of the plurality of software logic modules into the single logic program to provide the combined functionality can be provided in a defined plurality of different ways; and
wherein each of the defined plurality of different ways provides a different version of the single logic program providing the combined functionality.

75. The system as in claim 74, wherein the intermixture of the subtask functions of the plurality of software logic modules into the single logic program to provide the combined functionality is further comprised of at least one of:
obfuscation, encryption, replication, adding dummy code, addition of redundant control, renaming of variables, splitting a procedure into multiple sub-procedure, dictionary transformation, compilation, interpretation, cryptographic transformation, digital signing, and scrambling.

76. The system as in claim 75, wherein the replication is comprised of repetitions of the software logic modules into an oversize program comprising the single logic program embedded therein.

77. The system as in claim 76, wherein each of the repetitions is made active separately to define an active single program within the oversize program which acts as the single logic program.

78. The system as in claim 58, wherein the transformation controller further generates external software modules for linked operation with the single logic program as required for the combined functionality.

79. The system as in claim 78,
wherein the system transmits the external software modules to a separate computing subsystem, and
wherein the external software modules are executed in at least one of the separate computing subsystems to provide at least one of: update information and renewable information coupled to the single logic program.

80. The system as in claim 79, wherein the system transmits utilizing at least one of: encryption, authentication, and digital signing.

81. The system as in claim 79, wherein the update information is at least one of: change data, change executable code, change pattern, change order and pseudo-change of dummy code.

82. The system as in claim 79, wherein the renewable information is at least one of:
renewable content processing, time signal, a UTC time signal, a digitally signed time signal, a digital cache for transmission of trusted content processing, and a cryptographic key for marking trusted content processing.

83. The system as in claim 58, wherein the system transmits the single logic program to a primary computing system.

84. The system as in claim 83, wherein the system transmits utilizing at least one of: encryption, authentication, and digital signing.

85. The system as in claim 58, wherein security verification information is generated by the transformation controller, for utilization by separate security tag verification logic in a separate subsystem which validates the security tags.

86. The system as in claim 58, wherein one of the software logic modules provides security services.

87. The system as in claim 86, wherein the security services provide for at least one of:
user authentication, user sign-on, data packet authentication, user login, applying a user's cryptographic key, applying an organization's cryptographic key, group encryption, watermarking validation, and digital signing.

88. The system as in claim 86, wherein the security services further provide for applying cryptographic transformations based on keys belonging to a primary computing system.

89. The system as in claim 88, wherein the primary computing system provides for execution of the single logic program.

90. A method of providing controlled signaling for validating execution on a remote computing subsystem, the method comprising:
receiving streaming data packets from a media server, at a first computing subsystem;
processing of the streaming data packets on the first computing subsystem, in accordance with defined rules in the first computing subsystem;
generating a security tag responsive to the processing in accordance with the defined rules in the first computing subsystem;
transmitting the security tag to a second computing subsystem;
validating the security tag on the second computing subsystem responsive to determining that the defined rules were unchanged when the security tag was generated in accordance with the processing of the streaming data packets on the first computing subsystem.

91. The method as in claim 90, further comprising:
receiving selected parts of the defined rules on the first computing subsystem from a separate rules controller.

92. The method as in claim 90, further comprising:
determining a renewable software module for at least one of: transmission, forwarding, and operation responsive to at least one of the defined rules on the first computing subsystem of at least one of: transmission, forwarding, and operation on the first computing subsystem.

93. The method as in claim 90, wherein the generating the security tag comprises at least one of:
applying a pseudo-random generator, applying a pseudo-random function, applying a cryptographic function, applying an encryption function, applying a scrambling subroutine, applying an authentication function, applying a digital signing function, applying a cryptographic hash function, applying a subroutine, applying a computational logic module, applying a symmetric cryptography function, applying an asymmetric cryptography function, employing a cryptographic key, employing a cryptographic seed, employing an encrypted software, employing an obfuscated software, employing a hidden program, employing logic with a set of parameters, employing a hardware module, employing a smart card, employing a portable device, and employing a distributed protocol.

94. The method as in claim 90, wherein the communications path couples a network interface with at least one of:
a computer, a wireless device, handheld device, a Wi-Fi device, a device operating in accordance with IEEE 802.11, a device operating in accordance with IEEE 802.15, a device operating in accordance with IEEE 802.16, a 2.5G cellular telephone, a 3G cellular telephone, a 4G cellular telephone, a 5G cellular telephone, a personal computer, a set-top box, a device operating in accordance with UMTS (Universal Mobile Telephone System), and a device operating in accordance to IEEE 802.3 family of standards.

95. The system as in claim 90, wherein the validating confirms that the first computing subsystem is operating in compliance with at least one of digital right management rules and content management system rules.

96. The system as in claim 90, wherein the communication path is comprised of defined communications of at least one of: a VPN, an ATM, a FR, a CPN, a content delivery network (CDN), an ISP, a shared media, a firewall, a local area network, an Internet, a metropolitan area network, a SAN, a link to application server, a link to web server, a link, to data base server, a link to Internet server, a link to network server, a public network, an enterprise network, and a carrier network.

97. The system as in claim 1, the system further comprising:
wherein a successful validation determines that the respective security tags were properly generated responsive to said processing of streaming data packets, and
wherein a failed validation determines that the respective security tags were improperly generated responsive to said processing of streaming data packets.

98. The method as in claim 33, wherein the processing provides playing that provides at least one of: an input to an audio device and an input to a video display.

99. The method as in claim 33, further comprising: stopping sending of further data to the first computing subsystem responsive to the failed validation.

100. The method as in claim 46, wherein the processing in the second computing subsystem further provides for protection of the content.

101. The method as in claim 48, wherein the processing in the first computer subsystem provides at least one of: an input to an audio device and an input to a video display.

* * * * *